(12) United States Patent
Wu et al.

(10) Patent No.: US 12,378,685 B2
(45) Date of Patent: Aug. 5, 2025

(54) SURFACE MODIFICATION OF METAL CATALYSTS WITH HYDROPHOBIC LIGANDS OR IONOMERS

(71) Applicant: Twelve Benefit Corporation, Berkeley, CA (US)

(72) Inventors: Yueshen Wu, Irvine, CA (US); Chengtian Shen, Irvine, CA (US); Benjamin Kash, Berkeley, CA (US); Shreeya Negi, Aptos, CA (US); Coline Boulanger, Saint-Vincent-de-Pertignas (FR)

(73) Assignee: Twelve Benefit Corporation, Berkeley, CA (US)

( * ) Notice: Subject to any disclaimer, the term of this patent is extended or adjusted under 35 U.S.C. 154(b) by 0 days.

(21) Appl. No.: 18/328,524

(22) Filed: Jun. 2, 2023

(65) Prior Publication Data

US 2024/0254641 A1  Aug. 1, 2024

Related U.S. Application Data

(60) Provisional application No. 63/476,722, filed on Dec. 22, 2022.

(51) Int. Cl.
| | | |
|---|---|---|
| C25B 11/095 | (2021.01) | |
| C25B 1/23 | (2021.01) | |
| C25B 3/26 | (2021.01) | |
| C25B 9/23 | (2021.01) | |
| C25B 11/054 | (2021.01) | |
| C25B 11/065 | (2021.01) | |

(52) U.S. Cl.
CPC ............. *C25B 11/095* (2021.01); *C25B 1/23* (2021.01); *C25B 3/26* (2021.01); *C25B 9/23* (2021.01); *C25B 11/054* (2021.01); *C25B 11/065* (2021.01)

(58) Field of Classification Search
None
See application file for complete search history.

(56) References Cited

U.S. PATENT DOCUMENTS

| | | |
|---|---|---|
| 4,042,496 A | 8/1977 | Tsushima et al. |
| 4,089,758 A | 5/1978 | McAloon |
| 4,116,889 A | 9/1978 | Chlanda et al. |

(Continued)

FOREIGN PATENT DOCUMENTS

| | | |
|---|---|---|
| CA | 1071143 A | 2/1980 |
| CA | 2960595 A1 | 3/2016 |

(Continued)

OTHER PUBLICATIONS

Gao et al. Chem. Commun., 2020, 56, 7021 (Year: 2020).*

(Continued)

*Primary Examiner* — Wojciech Haske
(74) *Attorney, Agent, or Firm* — Weaver Austin Villeneuve & Sampson LLP

(57) ABSTRACT

Provided herein are hydrophobically-modified metal nanoparticle cathode catalysts for electrochemical reactions. The hydrophobic modifications may be incorporated onto the nanoparticles by either directly binding ligands or ionomers to the nanoparticles, or by indirectly binding an ionomer to the nanoparticle through a linker. The hydrophobically-modified metal nanoparticles may be hydrophobically-modified gold nanoparticles.

19 Claims, 6 Drawing Sheets

(56) References Cited

U.S. PATENT DOCUMENTS

| | | |
|---|---|---|
| 4,176,215 A | 11/1979 | Molnar et al. |
| 4,253,900 A | 3/1981 | Dege et al. |
| 4,355,116 A | 10/1982 | Lee et al. |
| 4,655,886 A | 4/1987 | Oda et al. |
| 4,766,161 A | 8/1988 | Chlanda et al. |
| 4,828,941 A | 5/1989 | Sterzel |
| 5,039,389 A | 8/1991 | McMichael |
| 6,358,651 B1 | 3/2002 | Chen et al. |
| 7,704,369 B2 | 4/2010 | Olah et al. |
| 7,883,817 B2 | 2/2011 | Hori et al. |
| 8,137,859 B2 | 3/2012 | Shin et al. |
| 8,268,026 B2 | 9/2012 | Norbeck et al. |
| 8,277,631 B2 | 10/2012 | Eastman et al. |
| 8,652,104 B2 | 2/2014 | Goral et al. |
| 8,652,704 B2 | 2/2014 | Sano et al. |
| 8,697,129 B2 | 4/2014 | Qian et al. |
| 9,012,345 B2 | 4/2015 | Masel et al. |
| 9,486,480 B2 | 11/2016 | Ayoub et al. |
| 9,587,071 B2 | 3/2017 | Sun et al. |
| 10,092,661 B2 | 10/2018 | Qian et al. |
| 10,648,091 B2 | 5/2020 | Kuhl et al. |
| 10,822,709 B2 | 11/2020 | Kuhl et al. |
| 10,975,480 B2 | 4/2021 | Masel |
| 10,975,481 B2 | 4/2021 | Guo et al. |
| 11,011,756 B2 | 5/2021 | Pintauro et al. |
| 11,124,886 B2 | 9/2021 | Kuhl et al. |
| 11,221,330 B2 | 1/2022 | Alocilja et al. |
| 11,268,200 B2 | 3/2022 | Oener et al. |
| 11,271,220 B2 | 3/2022 | Morin et al. |
| 11,299,810 B2 | 4/2022 | Suchsland et al. |
| 11,578,415 B2 | 2/2023 | Cave et al. |
| 11,680,327 B2 | 6/2023 | Kuhl et al. |
| 11,680,328 B2 | 6/2023 | Huo et al. |
| 12,043,912 B2 | 7/2024 | Cave et al. |
| 2003/0059658 A1 | 3/2003 | Kohler et al. |
| 2004/0028992 A1 | 2/2004 | Jaouen |
| 2005/0147859 A1 | 7/2005 | Kiefer et al. |
| 2005/0239912 A1 | 10/2005 | Arcella et al. |
| 2006/0016685 A1 | 1/2006 | Hawkins et al. |
| 2008/0045401 A1 | 2/2008 | Zhou et al. |
| 2008/0318093 A1 | 12/2008 | Lee et al. |
| 2009/0117436 A1 | 5/2009 | Choi et al. |
| 2009/0155102 A1 | 6/2009 | Park et al. |
| 2010/0028736 A1 | 2/2010 | Unlu et al. |
| 2010/0142123 A1 | 6/2010 | Smith et al. |
| 2010/0159347 A1 | 6/2010 | Choi et al. |
| 2010/0193370 A1 | 8/2010 | Olah et al. |
| 2010/0273087 A1 | 10/2010 | Choi et al. |
| 2011/0237830 A1 | 9/2011 | Masel |
| 2012/0171583 A1 | 7/2012 | Bocarsly et al. |
| 2012/0252091 A1 | 10/2012 | Rasmussen et al. |
| 2012/0328942 A1 | 12/2012 | Thomas-Alyea et al. |
| 2013/0098772 A1 | 4/2013 | Bocarsly et al. |
| 2013/0105304 A1 | 5/2013 | Kaczur et al. |
| 2013/0118911 A1 | 5/2013 | Sivasankar et al. |
| 2013/0345325 A1 | 12/2013 | Lecomte et al. |
| 2014/0093799 A1 | 4/2014 | Masel et al. |
| 2014/0202875 A1 | 7/2014 | Mofakhami |
| 2014/0206894 A1 | 7/2014 | Cole et al. |
| 2014/0287347 A1 | 9/2014 | Vincent et al. |
| 2014/0291163 A1 | 10/2014 | Kanan et al. |
| 2015/0010804 A1 | 1/2015 | Laramie et al. |
| 2015/0030888 A1 | 1/2015 | Popat et al. |
| 2015/0064602 A1 | 3/2015 | Lee et al. |
| 2015/0068915 A1 | 3/2015 | Hoch et al. |
| 2015/0136613 A1 | 5/2015 | Li et al. |
| 2016/0107154 A1 | 4/2016 | Masel et al. |
| 2016/0151739 A1 | 6/2016 | Jakobsson et al. |
| 2016/0161869 A1 | 6/2016 | Avneri et al. |
| 2016/0194766 A1 | 7/2016 | Eastman et al. |
| 2016/0369415 A1 | 12/2016 | Masel et al. |
| 2017/0183789 A1 | 6/2017 | Matthews et al. |
| 2017/0259206 A1 | 9/2017 | Masel et al. |
| 2017/0321333 A1 | 11/2017 | Kuhl et al. |
| 2017/0321334 A1 | 11/2017 | Kuhl et al. |
| 2018/0111083 A1 | 4/2018 | Masel |
| 2018/0151890 A1 | 5/2018 | Ishida et al. |
| 2018/0265440 A1 | 9/2018 | Kudo et al. |
| 2018/0274109 A1 | 9/2018 | Kudo et al. |
| 2019/0036143 A1 | 1/2019 | Yan et al. |
| 2019/0062931 A1 | 2/2019 | Stark et al. |
| 2019/0127865 A1 | 5/2019 | Li et al. |
| 2019/0134570 A1 | 5/2019 | Pintauro et al. |
| 2019/0211463 A1 | 7/2019 | Masel |
| 2020/0080211 A1 | 3/2020 | Schmid et al. |
| 2020/0087805 A1 | 3/2020 | Ono et al. |
| 2020/0216968 A1 | 7/2020 | Hunegnaw et al. |
| 2020/0220185 A1 | 7/2020 | Ma et al. |
| 2020/0240023 A1 | 7/2020 | Cave et al. |
| 2020/0270756 A1 | 8/2020 | Kofuji et al. |
| 2020/0308718 A1 | 10/2020 | Patru et al. |
| 2020/0318247 A1 | 10/2020 | Fernandez Sanchis et al. |
| 2020/0325587 A1 | 10/2020 | Fernandez Sanchis et al. |
| 2020/0354843 A1 | 11/2020 | Kuhl et al. |
| 2020/0370188 A1 | 11/2020 | Oener et al. |
| 2020/0376479 A1 | 12/2020 | Masel |
| 2021/0002775 A1 | 1/2021 | Matsumoto et al. |
| 2021/0079537 A1 | 3/2021 | Spurgeon |
| 2021/0164116 A1 | 6/2021 | Kuhl et al. |
| 2021/0207275 A1* | 7/2021 | Huo .................. C25B 9/23 |
| 2021/0292924 A1 | 9/2021 | Sargent et al. |
| 2021/0381116 A1 | 12/2021 | Kashi et al. |
| 2021/0387139 A1 | 12/2021 | Voskian et al. |
| 2021/0395908 A1 | 12/2021 | Kuhl et al. |
| 2022/0010437 A1 | 1/2022 | Kuhl et al. |
| 2022/0119636 A1 | 4/2022 | Wang et al. |
| 2022/0119641 A1 | 4/2022 | Wang et al. |
| 2022/0136119 A1 | 5/2022 | Flanders et al. |
| 2022/0267916 A1 | 8/2022 | Zhao et al. |
| 2023/0136397 A1 | 5/2023 | Cave et al. |
| 2023/0155153 A1 | 5/2023 | Huo et al. |
| 2023/0175146 A1 | 6/2023 | Kashi et al. |
| 2023/0264148 A1 | 8/2023 | Boettcher et al. |
| 2023/0265568 A1 | 8/2023 | Kuhl et al. |
| 2023/0366110 A1 | 11/2023 | Kuhl et al. |
| 2024/0133058 A1 | 4/2024 | Huo et al. |
| 2024/0141514 A1 | 5/2024 | Zhao et al. |
| 2024/0327999 A1 | 10/2024 | Cave et al. |

FOREIGN PATENT DOCUMENTS

| | | |
|---|---|---|
| CN | 1471740 A | 1/2004 |
| CN | 102576902 A | 7/2012 |
| CN | 102912374 A | 2/2013 |
| CN | 104247118 A | 12/2014 |
| CN | 104619886 A | 5/2015 |
| CN | 104919088 A | 9/2015 |
| CN | 106715760 A | 5/2017 |
| CN | 107735512 A | 2/2018 |
| DE | 102018210303 A1 | 1/2020 |
| EP | 1261058 A2 | 11/2002 |
| EP | 3378968 A1 | 9/2018 |
| JP | H01502673 A | 9/1989 |
| JP | H02166128 A | 6/1990 |
| JP | H04228591 A | 8/1992 |
| JP | H0625444 A | 2/1994 |
| JP | H06145379 A | 5/1994 |
| JP | H10507305 A | 7/1998 |
| JP | 2000251906 A | 9/2000 |
| JP | 2002306975 A | 10/2002 |
| JP | 2002352810 A | 12/2002 |
| JP | 2013520779 A | 6/2013 |
| JP | 2014022249 A | 2/2014 |
| JP | 2014504424 A | 2/2014 |
| JP | 2014525115 A | 9/2014 |
| JP | 2014194079 A | 10/2014 |
| JP | 2015533944 A | 11/2015 |
| JP | 2017527701 A | 9/2017 |
| JP | 2018003059 A | 1/2018 |
| JP | 2019515142 A | 6/2019 |
| JP | 2021059788 A | 4/2021 |
| KR | 100962903 B1 | 6/2010 |
| KR | 20140142185 A | 12/2014 |
| KR | 20150073651 A | 7/2015 |

(56) References Cited

FOREIGN PATENT DOCUMENTS

| | | |
|---|---|---|
| WO | WO-9611507 A1 | 4/1996 |
| WO | WO-2011104542 A1 | 9/2011 |
| WO | WO-2011136296 A1 | 11/2011 |
| WO | WO-2012174463 A1 | 12/2012 |
| WO | WO-2016039999 A1 | 3/2016 |
| WO | WO-2016108603 A1 | 7/2016 |
| WO | WO-2017144395 A1 | 8/2017 |
| WO | WO-2017169682 A1 | 10/2017 |
| WO | WO-2017176306 A1 | 10/2017 |
| WO | WO-2017192787 A1 | 11/2017 |
| WO | WO-2018195045 A1 | 10/2018 |
| WO | WO-2019020239 A1 | 1/2019 |
| WO | WO-2019120812 A1 | 6/2019 |
| WO | WO-2019136018 A2 | 7/2019 |
| WO | WO-2019206882 A1 | 10/2019 |
| WO | WO-2020020691 A1 | 1/2020 |
| WO | 2020112919 A1 | 6/2020 |
| WO | WO-2020212139 A1 | 10/2020 |
| WO | WO-2021007508 A1 | 1/2021 |
| WO | WO-2021252535 A2 | 12/2021 |

OTHER PUBLICATIONS

Rucareanu et al. Chem. Mater. 2006, 18, 4674-4680 (Year: 2006).*
Nakashima et al. (Polymer Journal '2015' 47, 171-176) (Year: 2015).*
Aeshala, L.M. et al., "Effect of Cationic and Anionic Solid Polymer Electrolyte on Direct Electrochemical Reduction of Gaseous $CO_2$ to Fuel", Journal of $CO_2$ Utilization, Dec. 1, 2013, vol. 3-4, pp. 49-55.
Aeshala, L.M. et al., "Effect of solid polymer electrolyte on electrochemical reduction of CO2, Separation and Purification Technology," 94, (2012), pp. 131-137.
Ahlfield J., et al., "PEM/AEM Junction Design for Bipolar Membrane Fuel Cells," Journal of the Electrochemical Society, 2017, vol. 164 (12), pp. F1165-F1171.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Bakshi M., et al., "How Surfactants Control Crystal Growth of Nanomaterials," ACS Crystal Growth & Design, 2016, vol. 16, pp. 1104-1133.
Balster, J. et al., "Tailoring the Interface Layer of the Bipolar Membrane", Journal of Membrane Science, vol. 365, No. 1-2, Dec. 2010, pp. 389-398.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
CA First Office Action issued on Oct. 15, 2019, in Application No. 3,022,807.
CA First Office Action issued on Sep. 30, 2019, in Application No. 3,022,812.
CA Office Action dated Jan. 9, 2023 in Application No. CA20173022812.
CA Office Action dated Jun. 21, 2023, in Application No. CA20173124239.
CA Office Action dated May 3, 2022 in Application No. CA20173124239.
CA Second Office Action issued on Aug. 28, 2020, in Application No. 3,022,812.
CA Second Office Action issued on Oct. 14, 2020, in Application No. 3,022,807.
Choo et al. Modulated Ionomer Distribution in the Catalyst Layer of Polymer Electrolyte Membrane Fuel Cells for High Temperature Operation, Chemsuschem, vol. 7, Issue 8, Aug. 2014, pp. 2335-2341.
CN First Office Action issued on Jul. 28, 2021, in Application No. 201780036099.2.
CN First Office Action issued on Jul. 7, 2021, in Application No. 201780035746.8.
CN Office Action dated Feb. 7, 2022, in Application No. CN2017800357468.
CN Office Action dated Jul. 5, 2022 in Application No. CN20178035746 With English translation.
Delacourt, C., "Electrochemical reduction of carbon dioxide and water to syngas (CO+H2) at room temperature," Manuscript, Environmental Energy Technologies Division, Lawrence Berkeley National Laboratory and Department of Chemical Engineering, University of California Berkeley, 2006-2007, 171 pages.
Delacourt et al., "Design of an Electrochemical Cell Making Syngas (CO+H2) from CO2 and H2O Reduction at Room Temperature," Journal of the Electrochemical Society, 155 (1), (2008), pp. B42-B49.
Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.
EP office action dated May 23, 2023, in application No. EP21152137.2.
EP Office Action issued on Sep. 4, 2020, in Application No. 17793299.3.
EP Search Report issued on Apr. 20, 2021, in Application No. 21152137.2.
EP Search Report issued on Dec. 2, 2019, in Application No. 17793299.3.
EP Search Report issued on Dec. 4, 2019, in Application No. 17793300.9.
Extended European search report dated May 27, 2022, in Application No. EP21181985.9.
Final Office Action issued in issued on Apr. 2, 2019, in U.S. Appl. No. 15/586,182.
Final Office Action issued in issued on Jan. 8, 2020, in U.S. Appl. No. 15/586,173.
Gangeri, M et al., "Fe and Pt Carbon Nanotubes for the Electrocatalytic Conversion of Carbon Dioxide to Oxygenates", Catalysis Today, May 2009, vol. 143, pp. 57-63.
Haesuwannakij, S., et al., "The Impact of the Polymer Chain Length on the Catalytic Activity of Poly(N-vinyl-2-pyrrolidone)-supported Gold Nanoclusters," Scientific Reports, 2017, vol. 7(1), pp. 1-8.
Hao, J.H. et al., "Preparation of Solvent-resistant Anion-exchange Membranes", Desalination, Jun. 2000, vol. 129, No. 1, pp. 15-22.
Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.
Hori, Y., et al., "Electroreduction of CO to CH4 and C2H4 at a Copper Electrode in Aqueous Solutions at Ambient Temperature and Pressure", Journal of the American Chemical Society, Aug. 5, 1987, vol. 109, pp. 5022-5023.
Hori, Y et al., "Silver-coated Ion Exchange Membrane Electrode Applied to Electrochemical Reduction of Carbon Dioxide", Electrochimica Acta, Aug. 2003, vol. 48, pp. 2651-2657.
IN Office Action dated Feb. 2, 2022 in Application No. IN202118009885.
IN Office Action dated Feb. 7, 2022 in Application No. IN202118007175.
IN Office Action issued on Aug. 10, 2020, in Application No. 201817041221.
IN Office Action issued on Aug. 19, 2020, in Application No. 201817041222.
International Preliminary Report on Patentability and Written opinion dated Jun. 9, 2022 in Application No. PCT/US2020/062080.
International Preliminary Report on Patentability dated Dec. 22, 2022, in PCT Application No. PCT/US2021/036475.
International Search Report and Written Opinion dated Feb. 23, 2022, in Application No. PCT/US2021/55902.
International Preliminary Report on Patentability issued on Jun. 10, 2021, in PCT Application No. PCT/US2019/063471.
International Preliminary Report on Patentability issued on Nov. 15, 2018, in PCT Application No. PCT/US2017/030935.

(56) References Cited

OTHER PUBLICATIONS

International Search Report and Written Opinion dated Feb. 24, 2022, in Application No. PCT/US2021/055900.
International Search Report and Written Opinion dated Jan. 10, 2022, in Application No. PCT/US2021/036475.
International Search Report and Written Opinion dated Mar. 10, 2023 in PCT Application No. PCT/US2022/079570.
International Search Report and Written Opinion issued in PCT Application No. PCT/US2020/062080 on Mar. 16, 2021.
International Search Report and Written Opinion issued on Aug. 7, 2017, in PCT Application No. PCT/US2017/030935.
International Search Report and Written Opinion issued on Sep. 13, 2017, in PCT Application No. PCT/US2017/030936.
James, B.D., et al. 2017 DOE Hydrogen and Fuel Cells Program Review, Fuel Cell Systems Analysis, Strategic Analysis, Project IDI FC163, Jun. 8, 2017, 34 pages.
JP Office Action dated Dec. 7, 2021, in Application No. JP2020-213422 with English translation.
JP Office Action issued on Jan. 28, 2020, in Application No. 2018-558130.
JP Office Action issued on Jan. 28, 2020, in Application No. 2018-558138.
Kortlever R., et al., "Catalysts and Reaction Pathways for the Electrochemical Reduction of Carbon Dioxide ," The Journal of Physical Chemistry Letters, 2015, vol. 6(20), pp. 4073-4082.
Li, D., et al., "Fabrication of pH-Responsive Nanocomposites of Gold Nanoparticles/Poly(4-vinylpyridine)," Chem. Mater, 2007, vol. 19, pp. 412-417.
Li, et al., "Electrolysis of Co2 to Syngas in Bipolar Membrane-Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Li, W., "Electrocatalytic Reduction of $CO_2$ to Small Organic Molecule Fuels on Metal Catalysts," Chapter 5, Department of Chemical Engineering, Michigan Technological University, American Chemical Society, 2010, pp. 55-76.
Li, Y., et al., "Electronic Structure of Thiolate-Covered Gold Nanoparticles: $Au_{102}(MBA)_{44}$," Chem. Mater, 2008, vol. 2(9), pp. 1896-1902.
Lin, B. et al., "Alkaline Stable C2-Substituted Imidazolium-Based Anion-Exchange Membranes," Chemistry of Material, 2013, vol. 25, pp. 1858-1867.
Liu C., et al., "Constructing a Multifunctional Interface Between Membrane and Porous Transport Layer for Water Electrolyzers," ACS Applied Materials & Interfaces, 2021, vol. 13, pp. 16182-16196.
Lobato, J. et al., "Study of the influence of the amount of PBI-H3PO4 in the catalytic layer of a high temperature PEMFC", International Journal of Hydrogen Energy, 2010, vol. 35, pp. 1347-1355.
Lu et al. "A selective and efficient electrocatalyst for carbon dioxide reduction," Nature communication, Jan. 30, 2014.
Ma, L., et al., "Polyvinyl Alcohol-modified Gold Nanoparticles with Record-high Activity for Electrochemical Reduction of $Co_2$ to Co," Journal of $CO_2$ Utilization, 2019, vol. 34, pp. 108-114.
Ma, M., et al., "Insights into the Carbon Balance for C02 Electroreduction on Cu using Gas Diffusion Electrode Reactor Designs", Energy & Environmental Science, Feb. 12, 2020, vol. 13, pp. 977-985.
Machine translation of Kang et al KR20150073651A, 2015.
Machine translation of Shin et al WO2016108603A1, 2016.
Maheswari, S. et al., "Oxygen Reduction Catalysts for Alkaline Polymer Electrolyte Fuel Cells", ECS Transactions, 2010, vol. 33, No. 1, pp. 1795-1807.
Mandal M., et al., "Improved Polymer Electrolyte Membrane Water Electrolyzer Performance by Using Carbon Black as a Pore Former in the Anode Catalyst Layer," Journal of Power Sources, 2022, vol. 541, pp. 1-13.
Mayerhofer B., et al., "Bipolar Membrane Electrode Assemblies for Water Electrolysis," ACS Applied Energy Materials, 2020, vol. 3, pp. 9635-9644.
McDonald M., et al., "Graphene Oxide as a Water Dissociation Catalyst in the Bipolar Membrane Interfacial Layer," ACS Applied Materials & Interfaces, 2014, vol. 6, pp. 13790-13797.
Morsy S., et al., "Role of Surfactants in Nanotechnology and Their Applications," International Journal of current Microbiology and Applied Sciences, 2014, vol. 3(5), pp. 237-260.
Mourdikoudis, S., et al., "Oleylamine in Nanoparticle Synthesis," American Chemical Society, Chemistry of Materials, 2013, vol. 25, pp. 1465-1476.
Narayanan, S.R., et al., "Electrochemical Conversion of Carbon Dioxide to Formate in Alkaline Polymer Electrolyte Membrane Cells," Journal of the Electrochemical Society, 2011, vol. 158, No. 2, pp. A167-A173.
Notice of Allowance dated Aug. 16, 2021, in U.S. Appl. No. 16/842,659.
Notice of Allowance issued in issued on Apr. 13, 2021, in U.S. Appl. No. 16/842,659.
Notice of Allowance issued in issued on Jan. 29, 2020, in U.S. Appl. No. 15/586,173.
Notice of Allowance issued on Sep. 16, 2020, in U.S. Appl. No. 15/586,182.
O'Brien, C.P. et al., Single Pass CO2 Conversion exceeding 85% in the Electrosynthesis of Multicarbon Products via Local CO2 Regeneration, ACS Energy Let., 2021, vol. 6, 21 pages.
Office Action issued in issued on Apr. 2, 2019, in U.S. Appl. No. 15/586,173.
Office Action issued in issued on Nov. 1, 2018, in U.S. Appl. No. 15/586,173.
Office Action issued in issued on Nov. 1, 2018, in U.S. Appl. No. 15/586,182.
Office Action issued in issued on Sep. 16, 2020, in U.S. Appl. No. 16/842,659.
Office Action issued on Dec. 30, 2019, in U.S. Appl. No. 15/586,182.
Office Action issued on Jul. 2, 2020, in U.S. Appl. No. 15/586,182.
Parrondo, J. et al., "Degradation of Anion Exchange Membranes Used for Hydrogen Production by Ultrapure Water Electrolysis," Including Supplemental Material, RSC Advances, 2014, vol. 4, 17 Pages.
Patru, A., et al., "Design Principles of Bipolar Electrochemical Co-Electrolysis Cells for Efficient Reduction of Carbon Dioxide from Gas Phase at Low Temperature," Journal of the Electrochemical Society, 166 (2), (2019), pp. F34-F43.
Phan C., et al., "Role of Capping Agent in Wet Synthesis of Nanoparticles," The Journal of Physical Chemistry A, 2017, vol. 121, pp. 3213-3219.
Pickup, P. et al., "Electronically Conducting Cation-exchange Polymer Powders: Synthesis, Characterization and Applications in PEM Fuel Cells and Supercapacitors", Journal of New Materials for Electrochemical Systems, 2000, vol. 3. pp. 21-26.
Preliminary Report on Patentability issued on Nov. 6, 2018, in PCT Application No. PCT/US2017/030936.
SA Office Action dated Sep. 26, 2023, in application No. SA522441684 with English Translation.
Shang, H., et al., "Effect of Surface Ligands on Gold Nanocatalysts for CO2 Reduction," The Royal Society of Chemistry, 2020, vol. 11, pp. 12298-12306.
Sharma, et al., "Electrocatalytic conversion of carbon dioxide to fuels: a review on the interaction between CO2 and the liquid electrolyte," Wires Energy Environ 2017, 6:e239. doi: 10.1002/wene.239, pp. 1-21.
Shi, L. et al., "A shorted membrane electrochemical cell powered by hydrogen to remove $CO_2$ from the air feed of hydroxide exchange membrane fuel cells", Nature Energy, Mar. 2022, vol. 7, 36 pages.
Shironita S., et al., "Methanol Generation by Co2 Reduction at a Pt-ru/c Electrocatalyst Using a Membrane Electrode Assembly," Journal of Power Sources, Oct. 2013, vol. 240(15), pp. 404-410.
U.S. Final Office Action dated Aug. 30, 2023, in U.S. Appl. No. 17/342,406.
U.S. Final office Action dated Nov. 21, 2022 in U.S. Appl. No. 17/247,036.

(56) References Cited

OTHER PUBLICATIONS

U.S. Non-Final office Action dated Jan. 20, 2023 in U.S. Appl. No. 16/949,538.
U.S. Non-Final Office Action dated Mar. 14, 2023 in U.S. Appl. No. 17/342,406.
U.S. Non-Final Office Action dated May 24, 2022, in U.S. Appl. No. 17/247,036.
U.S. Non-Final Office Action dated Sep. 22, 2023, in U.S. Appl. No. 18/327,835.
U.S. Notice of Allowance dated Feb. 10, 2023 in U.S. Appl. No. 17/247,036.
U.S. Notice of Allowance dated Mar. 2, 2023 in U.S. Appl. No. 17/247,036.
U.S. Notice of Allowance dated Mar. 8, 2023 in U.S. Appl. No. 16/949,538.
U.S. Notice of Allowance dated May 22, 2023 in U.S. Appl. No. 16/949,538.
U.S. Appl. No. 17/030,172, inventors Kuhl et al., filed Sep. 23, 2020.
U.S. Appl. No. 18/053,945, inventors Huo et al., filed Nov. 9, 2022.
U.S. Appl. No. 18/299,672, inventors Kuhl et al., filed Apr. 12, 2023.
U.S. Appl. No. 18/300,380, inventors Ziyang Huo et al., filed Apr. 13, 2023.
U.S. Appl. No. 18/306,928, inventors Kendra P. Kuhl et al., filed Apr. 25, 2023.
U.S. Appl. No. 18/327,835, inventors Zhao S, et al., filed Jun. 1, 2023.
Varcoe, J.R., "Anion-exchange Membranes in Electrochemical Energy Systems," Energy & Environmental Science, 2014, vol. 7, pp. 3135-3191.
Verma, et al., "The effect of electrolyte composition on the electroreduction of CO2 to CO on Ag based gas diffusion electrodes," Phys. Chem. Chem. Phys., 2016, 18, pp. 7075-7084.
Voskian, S. et al., "Faradaic electro-swing reactive adsorption for $CO_2$ capture", Energy & Environmental Science, 2019, vol. 12, pp. 3530-3547.
Wang, et al., "Approaches for the preparation of non-linear amphiphilic polymers and their applications to drug delivery", Advanced Drug Delivery Reviews, 2012, vol. 64, pp. 852-865.
Xia, Chuan, et al., "Continuous production of pure liquid fuel solutions via electrocatalytic CO2 reduction using solid electrolyte devices," Nature Energy, http://www.nature.com/natureenergy; https://doi.org/10.1038/s41560-019-0451-x.
Xu, C. et al., Preparation of PVA-GA-CS/PVA-Fe-SA Bipolar Membrane and Its Application in Electro-generation of 2,2-dimethyl-3-hydroxypropionic Acid, Journal of Membrane Science, vol. 307, No. 2, Jan. 2008, pp. 218-224.
Yang, B. et al., "Preparation of a Bipolar Membrane by Photografting Polymerization", Frontiers of Chemistry in China, vol. 3, No. 1, Jan. 2008, pp. 10-13.
Zhan, et al., "Multiarm Star Poly(epsilon-caprolactone) with Hyperbranched Polyamidoamine as Core Capable of Selective Accommodating Cationic or Anionic Guests", Chinese Journal of Polymer Science, 2015. vol. 33, No. 6, pp. 920-930.
Zhang, L., et al., "A Polymer Solution to Prevent Nanoclustering and Improve the Selectivity of Metal Nanoparticles for Electrocatalytic $CO_2$ Reduction," Angewandte Chemie, 2019, vol. 131, pp. 15981-15987.
Zhao, Y., et al., "Engineering Surface Amine Modifiers of Ultrasmall Gold Nanoparticles Supported on Reduced Graphene Oxide for Improved Electrochemical CO2 Reduction," Advanced Energy Materials, 2018, pp. 1-9.
Zheng, et al., "Hyperbranched polymers: advances from synthesis to applications", Chemical Society Reviews, 2015, vol. 44, pp. 4091-4130.
Zhu, Q., et al., "Opportunities for Electrocatalytic $CO_2$ Reduction Enabled by Surface Ligands," Journal of American Chemical Society, 2022, vol. 144, pp. 2829-2840.
Zhu, Wenlei et al., "Active and Selective Conversion of CO2 to CO on Ultrathin Au Nanowires," Journal of American Chemical Society, 2014, 136, pp. 16132-16135.
CN Office Action dated Feb. 13, 2025 in CN Application No. 201980086718.8, with English Translation.
JP Office Action dated Jan. 28, 2025 in JP Application No. 2022-530995, with English Translation.
U.S. Corrected Notice of Allowance dated Dec. 16, 2024 in U.S. Appl. No. 17/303,329.
U.S. Final Office Action dated Mar. 17, 2025 in U.S. Appl. No. 17/369,952.
U.S. Notice of Allowance dated Jan. 15, 2025 in U.S. Appl. No. 18/299,672.
U.S. Notice of Allowance dated Jan. 23, 2025 in U.S. Appl. No. 18/327,835.
U.S. Notice of Allowance dated Mar. 13, 2025 in U.S. Appl. No. 17/303,329.
U.S. Notice of Allowance dated Mar. 19, 2025 in U.S. Appl. No. 18/300,380.
BR Office Action dated Aug. 15, 2023, in Application No. BR1120210103686 with English translation.
CA Office Action dated Feb. 28, 2024 in CA Application No. 3120748.
Chen L., et al., "Design Principles for Water Dissociation Catalysts in High-performance Bipolar Membranes," Nature Communications, 2022, vol. 13 Article No. 3846, pp. 1-10.
IN Office Action dated Jan. 31, 2023 in Application No. IN202117028812.
International Preliminary Report on Patentability and Written Opinion dated May 23, 2024 in PCT Application No. PCT/US2022/079570.
International Preliminary Report on Patentability dated Jun. 10, 2021 in Application No. PCT/US2019/063471.
International Search Report and Written Opinion dated Apr. 26, 2024 in PCT Application No. PCT/US2023/075864.
International Search Report and Written Opinion dated May 6, 2024 in PCT Application No. PCT/US2022/081209.
International Search Report and Written Opinion issued on Mar. 19, 2020, in PCT Application No. PCT/US2019/063471.
Invitation to Pay Additional Fees dated May 28, 2024 in PCT Application No. PCT/US2023/085244.
JP Office Action dated Dec. 5, 2023 in JP Application No. 2021-528976 with English translation.
JP Office Action dated Feb. 6, 2024 in JP Application No. 2022-187975, with English Translation.
JP Office Action dated Sep. 5, 2023, in Application No. JP2021-528976 with English translation.
Pappijn, C., et al., "Challenges and Opportunities of Carbon Capture and Utilization: Electrochemical Conversion of CO2 to Ethylene," Original research, 2020, vol. 8, pp. 1-12.
SA Examination Report dated Aug. 8, 2023, in Application No. 521422124 with English Translation.
SA Examination Report dated Feb. 6, 2024, in SA Application No. 521422124, with English Translation.
Seo M.H., et al., "Synthesis, Characterization, and Electrocatalytic Properties of a Polypyrrole-composited Pd/C Catalyst," International Journal of Hydrogen Energy, 2011, vol. 36(18), pp. 11545-11553.
Sturman, M., et al., "Process Parameters in the Electrochemical Reduction of Carbon Dioxide to Ethylene," ChemBioEng, 2021, vol. 8(3), pp. 149-188.
U.S. Corrected Notice of Allowance dated Jan. 9, 2023 in U.S. Appl. No. 16/697,066.
U.S. Corrected Notice of Allowance dated Mar. 19, 2024 in U.S. Appl. No. 18/145,702.
U.S. Final Office Action dated Feb. 8, 2024 in U.S. Appl. No. 18/327,835.
U.S. Final Office Action dated Jul. 2, 2024 in U.S. Appl. No. 18/327,835.
U.S. Final Office Action dated Mar. 21, 2024 in U.S. Appl. No. 18/300,380.
U.S. Non Final Office Action dated Feb. 23, 2022 in U.S. Appl. No. 16/697,066.

(56) References Cited

OTHER PUBLICATIONS

U.S. Non-Final Office Action dated Jan. 19, 2024 in U.S. Appl. No. 17/303,329.
U.S. Non-Final Office Action dated Jan. 19, 2024 in U.S. Appl. No. 18/306,928.
U.S. Non-Final Office Action dated Jan. 22, 2024 in U.S. Appl. No. 17/369,952.
U.S. Non-Final Office Action dated Jan. 23, 2024 in U.S. Appl. No. 18/299,672.
U.S. Non-Final Office Action dated Jul. 5, 2024 in U.S. Appl. No. 17/369,952.
U.S. Non-Final Office Action dated Jun. 17, 2024 in U.S. Appl. No. 17/342,406.
U.S. Non-Final Office Action dated Nov. 8, 2023 in U.S. Appl. No. 18/145,702.
U.S. Notice of Allowance dated Mar. 6, 2024 in U.S. Appl. No. 18/145,702.
U.S. Notice of Allowance dated Sep. 29, 2022 in U.S. Appl. No. 16/697,066.
U.S. Restriction Requirement dated Oct. 29, 2021, in U.S. Appl. No. 16/697,066.
Xie K., et al., "Bipolar Membrane Electrolyzers Enable High Single Pass $CO_2$ Electroreduction to Multicarbon Products," Nature Communications 2022, vol. 13 (1), pp. 1-13.
International Preliminary Report on Patentability and Written Opinion dated Jun. 20, 2024 in PCT Application No. PCT/US2022/081209.
International Search Report and Written Opinion dated Jul. 19, 2024 in PCT Application No. PCT/US2023/085244.
AE Search Report and Examination Report dated Jun. 20, 2024 in AE Application No. P6000880 /2021.
Australian Examination Report dated Oct. 22, 2024, in AU Application No. 2019386085.
BR Office Action and Search Report dated Sep. 11, 2024 in BR Application No. 112022010144-9, with English Translation.
CN Office Action dated Jun. 27, 2024 in CN Application No. 201980086718.8 with English translation.
JP Office Action dated Oct. 29, 2024 in JP Application No. 2022-187975 with English translation.
KR Office Action dated Oct. 16, 2024 in KR Application No. 10-2021-7019873 with English Translation.
SA Office Action dated Sep. 16, 2024 in SA Application No. 524452150 with English translation.
U.S. Final Office Action dated Jul. 17, 2024 in U.S. Appl. No. 17/303,329.
U.S. Final Office Action dated Jul. 18, 2024 in U.S. Appl. No. 18/306,928.
U.S. Final Office Action dated Sep. 10, 2024 in U.S. Appl. No. 18/299,672.
U.S. Non-Final Office Action dated Dec. 11, 2024 in U.S. Appl. No. 17/342,406.
U.S. Non-Final Office Action dated Oct. 31, 2024 in U.S. Appl. No. 18/300,380.
U.S. Notice of Allowance dated Nov. 14, 2024 in U.S. Appl. No. 17/303,329.

* cited by examiner

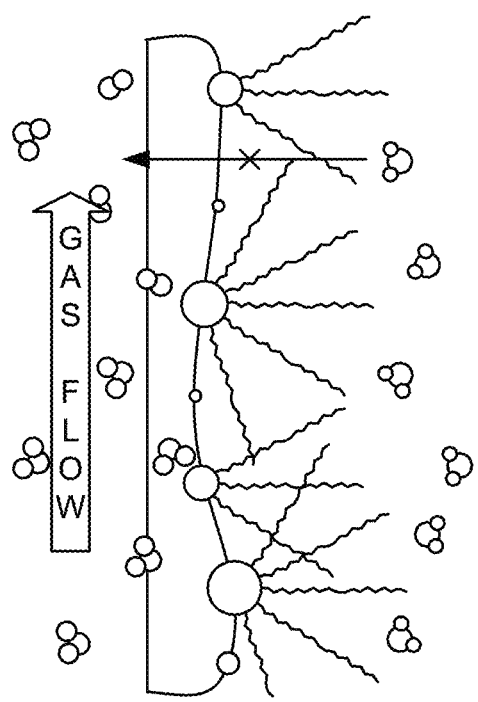
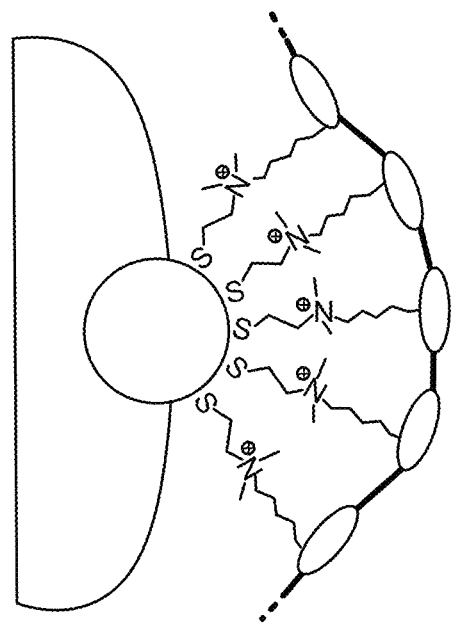
FIG. 2A  FIG. 2B
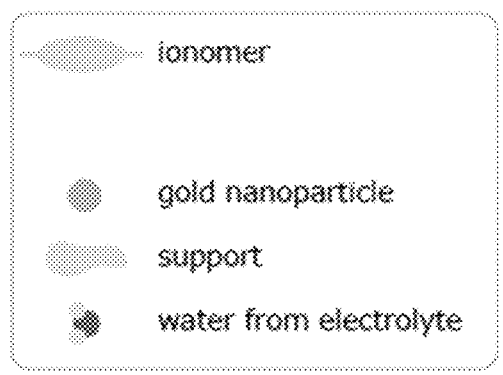

SURFACE MODIFICATION OF METAL CATALYSTS WITH HYDROPHOBIC LIGANDS OR IONOMERS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

BACKGROUND

Anthropogenic carbon dioxide emissions have been linked to climate change. In response to increasing concerns about global greenhouse gas emissions, technologies that can recycle $CO_2$ into high-value products have received growing interest.

Electrochemical reduction of $CO_x$ (where x is 1 or 2, such as for $CO_2$, $CO_2$, or combinations thereof) combines just three inputs: $CO_x$, a source of protons and electricity. These inputs are converted into fuels, chemicals and other products such as methanol, ethanol, carbon monoxide and acetic acid. However, industrial scale electrochemical reactions have been difficult to achieve, in part due to lack of suitable reactors. Issues to be addressed in the quest to scale up electrochemical reactions include the durability and length of the lifespan of the catalysts utilized, which are affected by the stability of the catalyst selected. Periodic maintenance such as cleaning and/or replacement is necessitated as the catalyst is consumed during use. A robust electrochemical reactor having a more stable catalyst may therefore be cost-effective; and advantageously minimize system downtime while at the same time maximizing efficiency.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Hydrophobic ally-modified metal nanoparticle cathode catalysts for electrochemical reactions are described. The hydrophobic modification of a catalyst may encompass either directly binding a ligand or ionomer having hydrophobic character to a metal catalyst surface, or indirectly binding an ionomer having hydrophobic character to a metal catalyst surface through a linking group. According to various embodiments, the hydrophobically-modified nanoparticles may be gold nanoparticles. Methods to improve gold nanoparticle cathode catalyst efficiency with the hydrophobic ally-modified nanoparticles which address challenges such as mitigating gold migration and catalyst layer flooding; membrane electrode assemblies; and $CO_x$ reduction reactors including the hydrophobic ally-modified nanoparticles are also described.

Accordingly, in a first aspect, the present disclosure encompasses a method of making a hydrophobic ally-modified metal nanoparticle cathode catalyst for electrochemical reactions. In some embodiments, the method includes providing metal nanoparticles having surfaces, the metal nanoparticles having surfaces immobilized on a carbon-containing support material; and reacting the surfaces of the metal nanoparticles immobilized on a carbon-containing support material with at least one hydrophobic moiety to form a hydrophobic ally-modified metal nanoparticle cathode catalyst; where the hydrophobic moiety is a ligand, an ionomer, or a combination thereof, and where the ligand or the ionomer is directly bonded to the surfaces of the metal nanoparticles or bonded to the surfaces of the metal nanoparticles through a linker.

In some embodiments, the metal nanoparticles are gold, silver, palladium, copper nanoparticles or a combination thereof.

In some embodiments, the metal nanoparticles are gold nanoparticles.

In some embodiments, the ligand is an amine.

In some embodiments, the amine is oleylamine, 2-(dimethylamino)ethanethiol or a salt thereof.

In some embodiments, the ionomer is a homopolymer or a copolymer, and the homopolymer or copolymer has an aromatic backbone.

In some embodiments, the hydrophobic moiety is an ionomer and the ionomer is bonded to the surfaces of the metal nanoparticles through a linker.

In some embodiments, the ionomer includes structures of formula

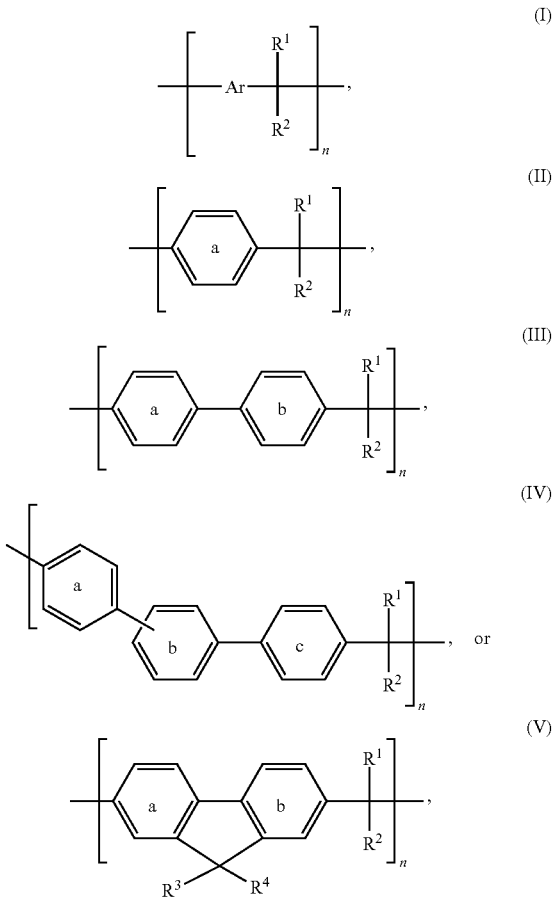

or a salt thereof, wherein $R^1$ and $R^2$ each independently may be an electron-withdrawing moiety, hydrogen (H), optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^1$ and $R^2$ can be taken together to form an optionally substituted cyclic group and wherein at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^3$ and $R^4$ can be taken together to form an optionally substituted cyclic group; Ar includes or is an optionally substituted aromatic or optionally substituted arylene; n is an integer of 1 or more; and each of ring a, ring b, and ring c may independently be optionally substituted; and where at least one of rings a-c, $R^1$, $R^2$, $R^3$, and $R^4$ is or includes an ionizable moiety or an ionic moiety.

In some embodiments, the ionomer includes structures of formula

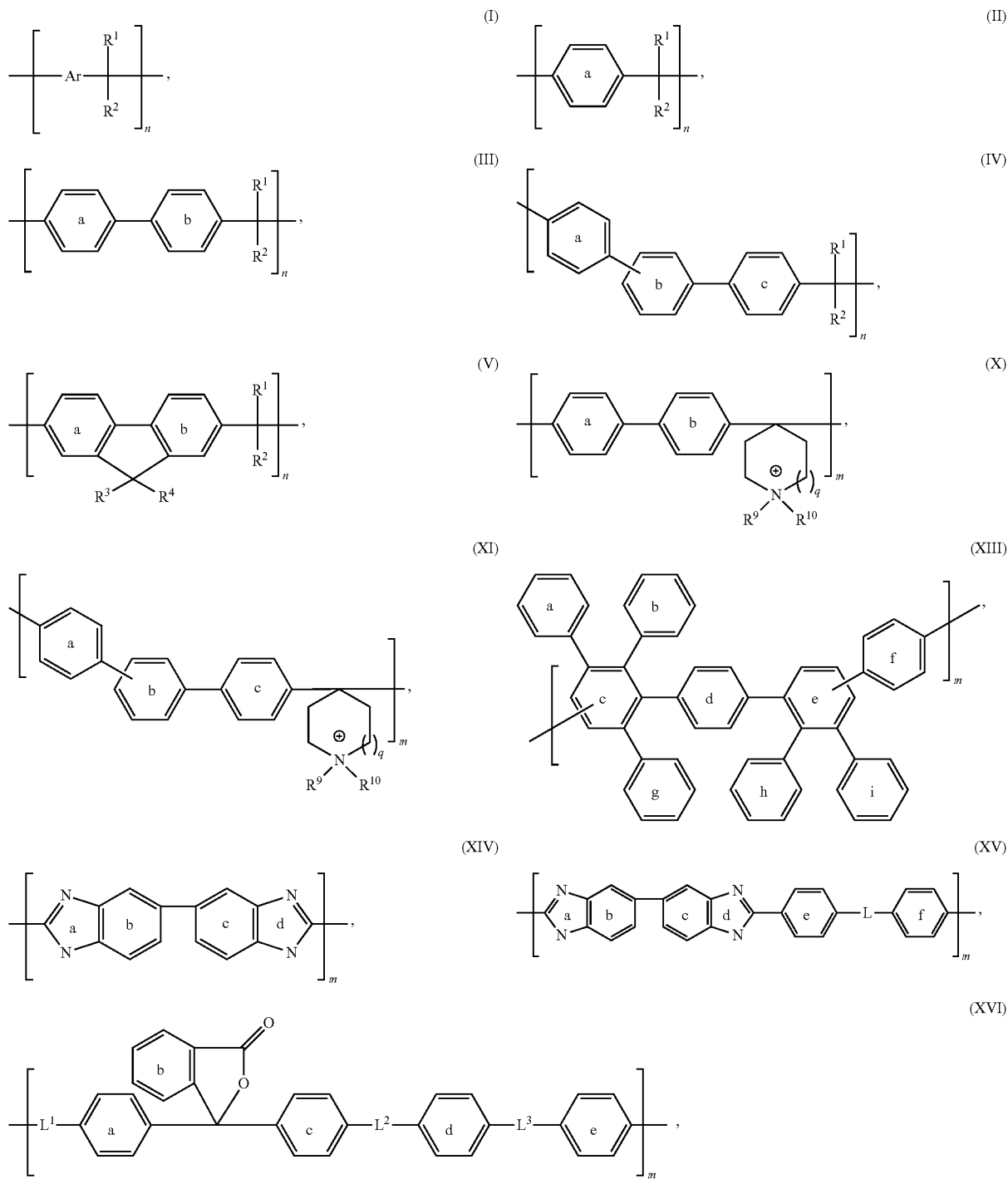

-continued (XVII)
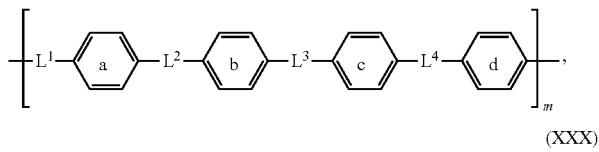

(XVIII)
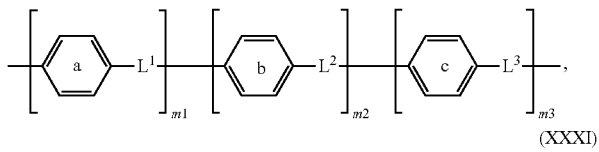

(XXX)
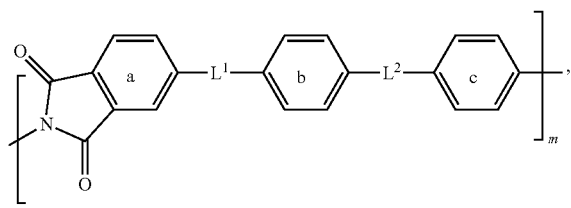

(XXXI)
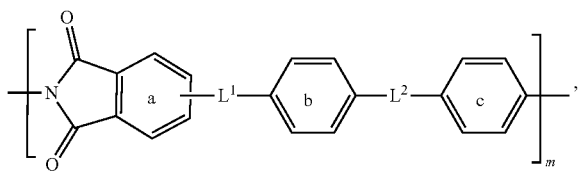

(XXXII)
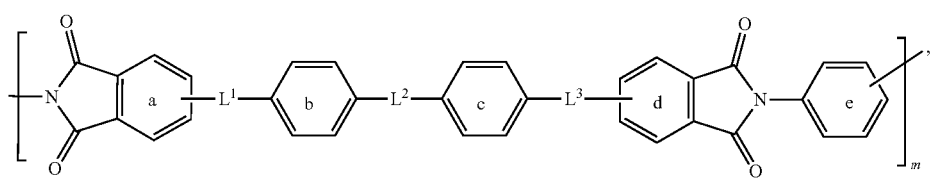

or a salt thereof, where $R^1$ and $R^2$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^1$ and $R^2$ can be taken together to form an optionally substituted cyclic group and where at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^3$ and $R^4$ can be taken together to form an optionally substituted cyclic group; $R^9$ and $R^{10}$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene, wherein $R^9$ and $R^{10}$ can be taken together to form an optionally substituted cyclic group; each of $L^1$, $L^2$, $L^3$, and $L^4$ is independently a linking moiety; Ar includes or is an optionally substituted aromatic or optionally substituted arylene; n is an integer of 1 or more; each of m, m1, m2, and m3 is independently an integer of 1 or more; q is an integer of 0, 1, or 2; and each of rings a-i may independently be optionally substituted; and where at least one of rings a-i, $R^1$, $R^2$, $R^3$, $R^4$, $R^9$ and $R^{10}$ is or includes an ionizable moiety or an ionic moiety.

In some embodiments, the ionomer has a structure of formula (IV)
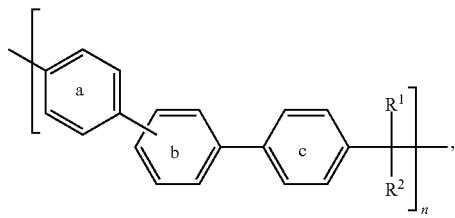

and $R^1$ is haloalkyl.

In some embodiments, $R^1$ is trifluoromethyl and $R^2$ has a structure of formula $-(C(R^{11})_2)_rR^{12}$ (XXXIII), wherein each $R^{11}$ independently may be H, aliphatic, aralkyl, aryl, heteroaryl, alkoxy, aryloxy, thioalkyl, thioaralkyl, thioaryl, aminoalkyl, amino, aminoaryl, halo or hydroxyl; $R^{12}$ comprises amino, aryl, heterocyclyl, hydroxyl, dihydroxyl, sulfhydryl, sulfide, disulfide, sulfo, or thioester; and r is an integer of 1 to 30.

In some embodiments, $R^1$ is trifluoromethyl and $R^2$ has a structure of formula (XXXIV)
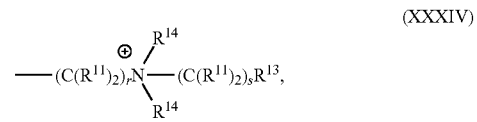

where each $R^{11}$ independently may be H, alkyl, aralkyl, aryl, heteroaryl, alkoxy, aryloxy, thioalkyl, thioaralkyl, thioaryl, aminoalkyl, amino, aminoaryl, halo or hydroxyl; $R^{13}$ comprises amino, aryl, heterocyclyl, hydroxyl, dihydroxyl, sulfhydryl, sulfide, disulfide, sulfo, or thioester; each $R^{14}$ is independently H or aliphatic; r is an integer of 1 to 30; and s is an integer of 1 to 10.

In some embodiments, the linker is polyethylenimine, 2-(dimethylamino)ethanethiol or a salt thereof.

In some embodiments, the metal nanoparticles on the carbon-containing support material have from about 10 percent to 50 percent by weight of metal.

In some embodiments, the metal nanoparticles have a particle size of from about 1 nm to 50 nm.

In some embodiments, the metal nanoparticles have a particle size of from about 5 nm to 10 nm.

In some embodiments, a ratio of the hydrophobic moiety to the metal nanoparticles on the carbon-containing support material is from about 0.1:1 to 8:1.

In a second aspect, the present disclosure encompasses a method of improving gold nanoparticle cathode catalyst efficiency for electrochemical reactions. In some embodiments, the method includes providing a $CO_x$ reduction reactor with a gold nanoparticle cathode catalyst of gold nanoparticles having surfaces, the surfaces modified with a hydrophobic moiety on a carbon-containing support material; where the hydrophobic moiety is a ligand, an ionomer or a combination thereof, and where the ligand or the ionomer is directly bonded to the surfaces of the gold nanoparticles or bonded to the surfaces of the gold nanoparticles through a linker.

In some embodiments, the ligand is an amine.

In some embodiments, the amine is oleylamine, 2-(dimethylamino)ethanethiol or a salt thereof.

In some embodiments, the ionomer is a homopolymer or a copolymer, and the homopolymer or copolymer has an aromatic backbone.

In some embodiments, the hydrophobic moiety is an ionomer and the ionomer is bonded to the surfaces of the gold nanoparticles through a linker.

In some embodiments, the ionomer includes structures of formula

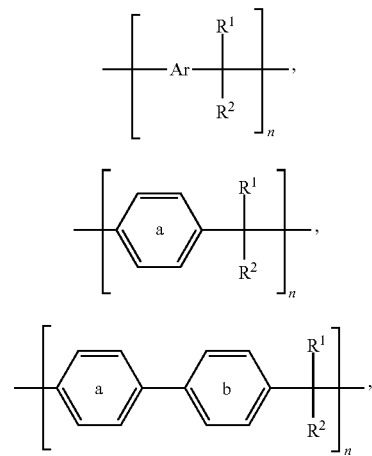

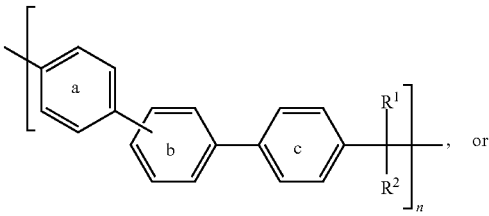

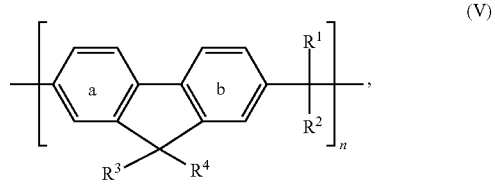

or a salt thereof, wherein $R^1$ and $R^2$ each independently may be an electron-withdrawing moiety, hydrogen (H), optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^1$ and $R^2$ can be taken together to form an optionally substituted cyclic group and wherein at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^3$ and $R^4$ can be taken together to form an optionally substituted cyclic group; Ar includes or is an optionally substituted aromatic or optionally substituted arylene; n is an integer of 1 or more; and each of ring a, ring b, and ring c may independently be optionally substituted; and where at least one of rings a-c, $R^1$, $R^2$, $R^3$, and $R^4$ is or includes an ionizable moiety or an ionic moiety.

In some embodiments, the ionomer includes structures of formula

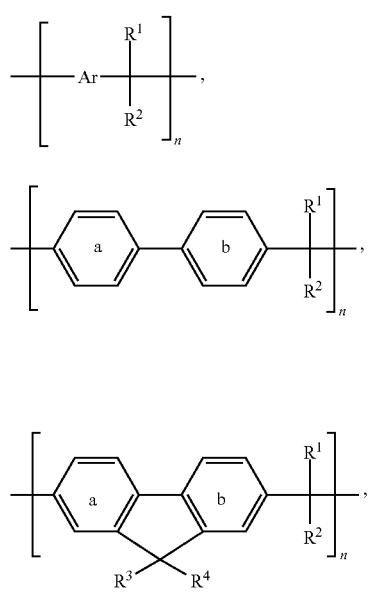

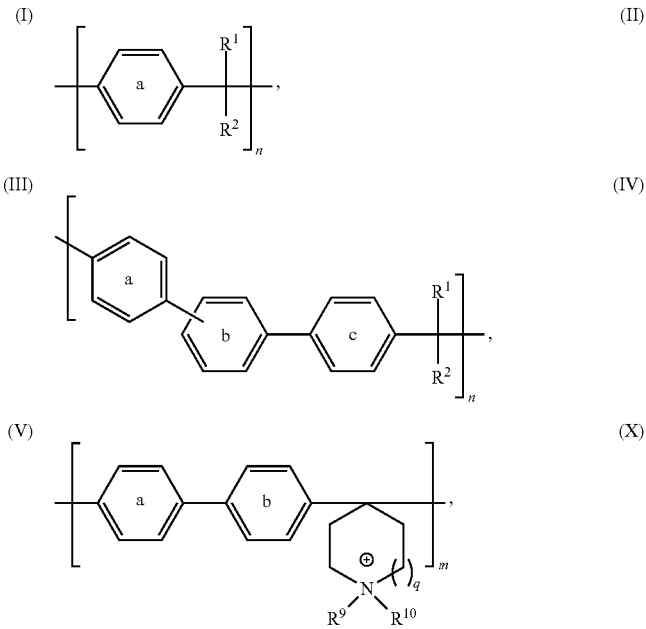

-continued

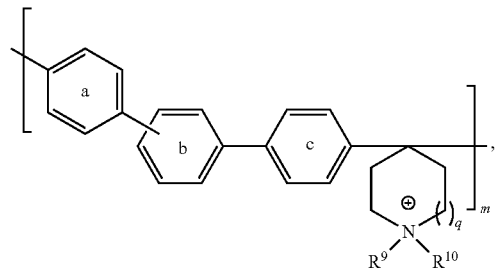
(XI)

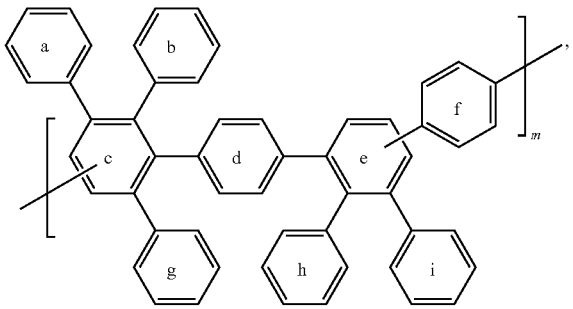
(XIII)

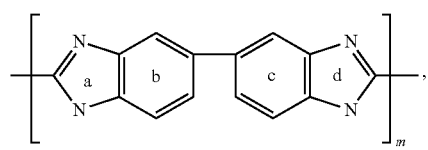
(XIV)

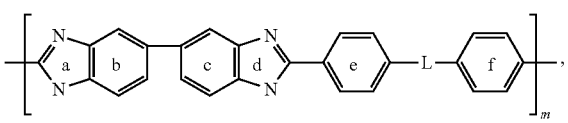
(XV)

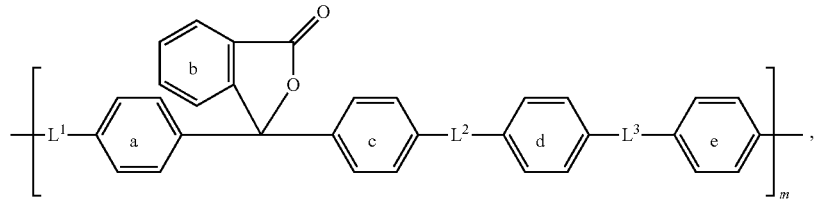
(XVI)

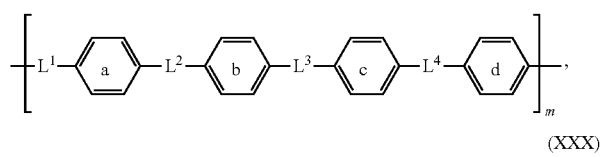
(XVII)

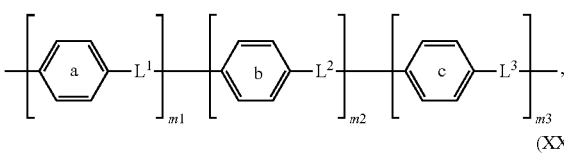
(XVIII)

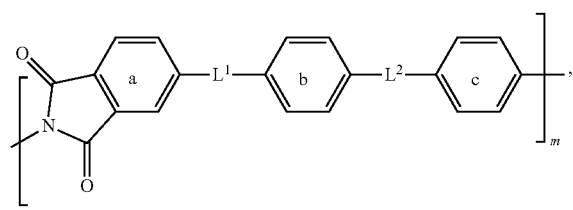
(XXX)

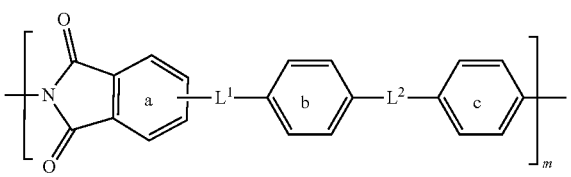
(XXXI)

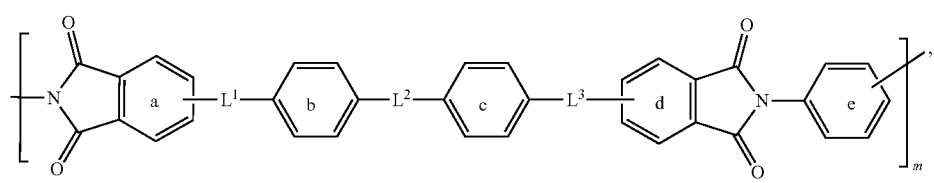
(XXXII)

or a salt thereof, where $R^1$ and $R^2$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^1$ and $R^2$ can be taken together to form an optionally substituted cyclic group and where at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^3$ and $R^4$ can be taken together to form an optionally substituted cyclic group; $R^9$ and $R^{10}$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene, wherein $R^9$ and $R^{10}$ can be taken together to form an optionally substituted cyclic group; each of $L^1$, $L^2$, $L^3$, and $L^4$ is independently a linking moiety; Ar includes or is an optionally substituted aromatic or optionally substituted arylene; n is an integer of 1 or more; each of m, m1, m2, and m3 is independently an integer of 1 or more;

q is an integer of 0, 1, or 2; and each of rings a-i may independently be optionally substituted; and where at least one of rings a-i, $R^1$, $R^2$, $R^3$, $R^4$, $R^9$ and $R^{10}$ is or includes an ionizable moiety or an ionic moiety.

In some embodiments, the ionomer has a structure of formula

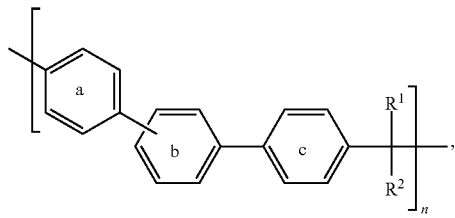
(IV)

and $R^1$ is haloalkyl.

In some embodiments, $R^1$ is trifluoromethyl and $R^2$ has a structure of formula —$(C(R^{11})_2)_r R^{12}$ (XXXIII), wherein each $R^{11}$ independently may be H, aliphatic, aralkyl, aryl, heteroaryl, alkoxy, aryloxy, thioalkyl, thioaralkyl, thioaryl, aminoalkyl, amino, aminoaryl, halo or hydroxyl; $R^{12}$ comprises amino, aryl, heterocyclyl, hydroxyl, dihydroxyl, sulfhydryl, sulfide, disulfide, sulfo, or thioester; and r is an integer of 1 to 30.

In some embodiments, $R^1$ is trifluoromethyl and $R^2$ has a structure of formula

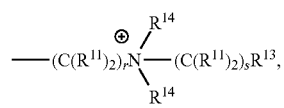
(XXXIV)

where each $R^{11}$ independently may be H, alkyl, aralkyl, aryl, heteroaryl, alkoxy, aryloxy, thioalkyl, thioaralkyl, thioaryl, aminoalkyl, amino, aminoaryl, halo or hydroxyl; $R^{13}$ comprises amino, aryl, heterocyclyl, hydroxyl, dihydroxyl, sulfhydryl, sulfide, disulfide, sulfo, or thioester; each $R^{14}$ is independently H or aliphatic; r is an integer of 1 to 30; and s is an integer of 1 to 10.

In some embodiments, the linker is polyethylenimine, 2-(dimethylamino)ethanethiol or a salt thereof.

In some embodiments, the gold nanoparticles on the carbon-containing support material include from about 10 percent to 50 percent by weight of gold.

In some embodiments, the gold nanoparticles have a particle size of from about 1 nm to 50 nm.

In some embodiments, the gold nanoparticles have a particle size of from about 5 nm to 10 nm.

In some embodiments, a ratio of the hydrophobic moiety to the gold nanoparticles on the carbon-containing support material is from about 0.1:1 to 8:1.

In a third aspect, the present disclosure encompasses a membrane electrode assembly. In some embodiments, the membrane electrode assembly includes a cathode catalyst layer, the cathode catalyst layer including metal nanoparticles having surfaces, the metal nanoparticles immobilized on a carbon-containing support material; and an anode catalyst layer; and where the metal nanoparticles having surfaces are modified with at least one hydrophobic moiety, the hydrophobic moiety is a ligand, an ionomer or a combination thereof, and where the ligand or the ionomer is directly bonded to the surfaces of the metal nanoparticles or bonded to the surfaces of the metal nanoparticles through a linker.

In some embodiments, the metal nanoparticles may be gold, silver, palladium, copper or a combination thereof.

In some embodiments, the metal nanoparticles may be gold.

In some embodiments, the ligand is an amine.

In some embodiments, the amine is oleylamine, 2-(dimethylamino)ethanethiol or a salt thereof.

In some embodiments, the ionomer is a homopolymer or a copolymer, and the homopolymer or copolymer has an aromatic backbone.

In some embodiments, the hydrophobic moiety is an ionomer and the ionomer is bonded to the surfaces of the metal nanoparticles through a linker.

In some embodiments, the ionomer includes structures of formula

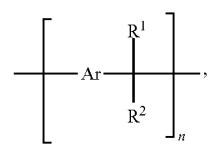
(I)

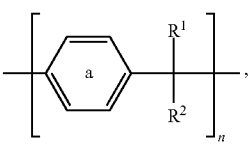
(II)

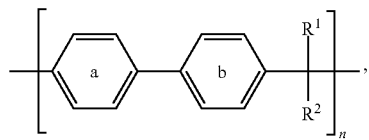
(III)

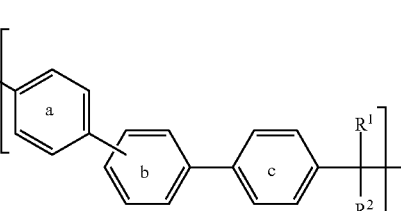
(IV)

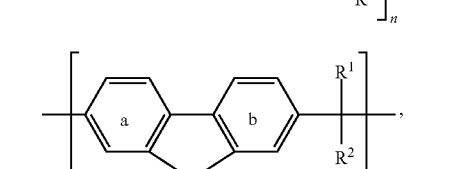
(V)

or a salt thereof, wherein $R^1$ and $R^2$ each independently may be an electron-withdrawing moiety, hydrogen (H), optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^1$ and $R^2$ can be taken together to form an optionally substituted cyclic group and wherein at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^3$ and $R^4$ can be taken together to form an optionally substituted cyclic group; Ar includes or is an optionally substituted aromatic or optionally substituted arylene; n is an integer of 1 or more; and each of ring a, ring b, and ring c may independently be optionally substituted; and where at least one of rings a-c, $R^1$, $R^2$, $R^3$, and $R^4$ is or includes an ionizable moiety or an ionic moiety.

In some embodiments, the ionomer includes structures of formula

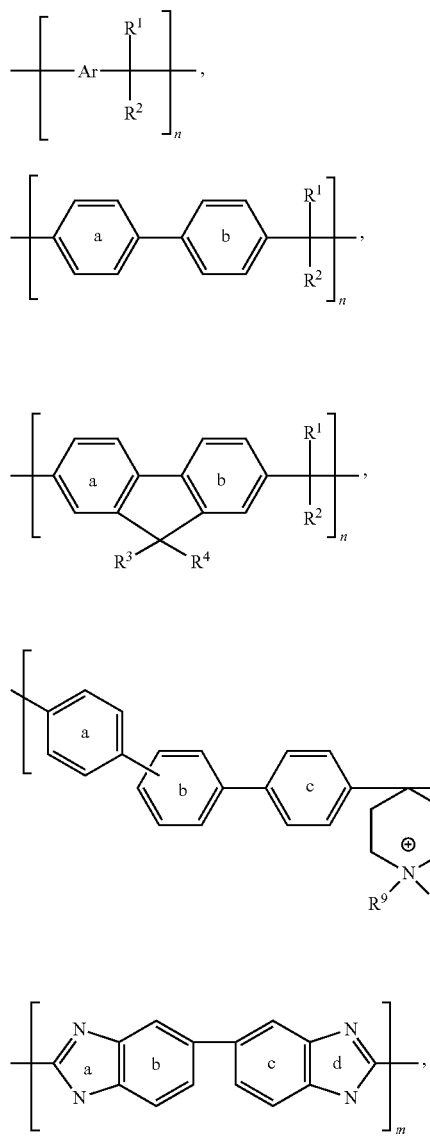

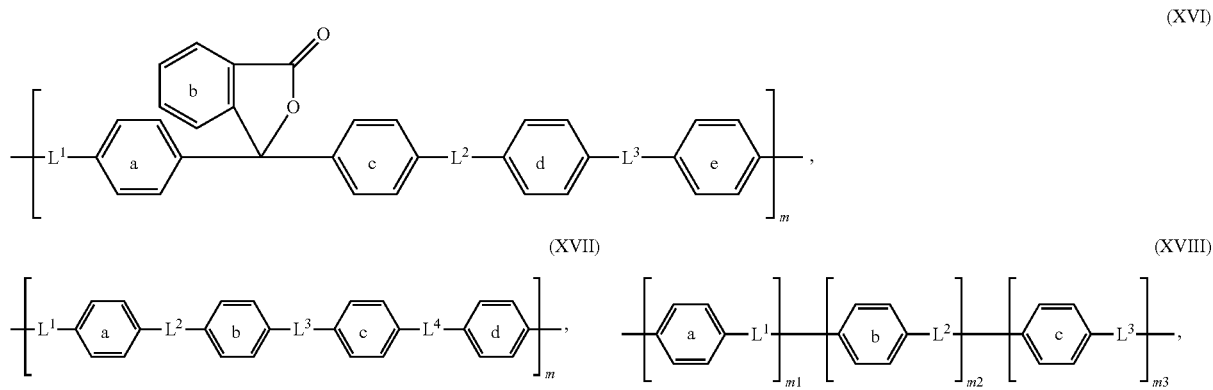

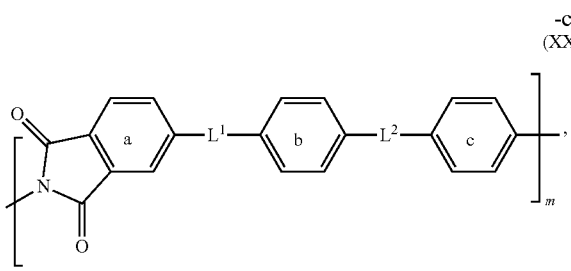
(XXX)

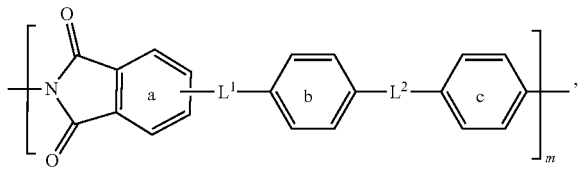
(XXXI)

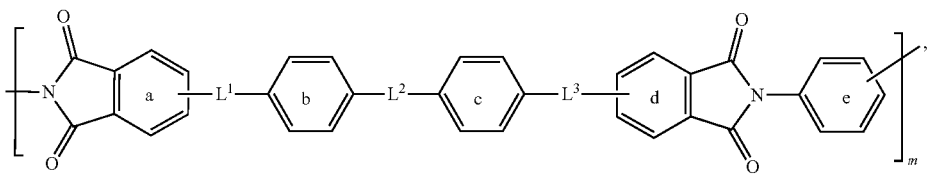
(XXXII)

or a salt thereof, where $R^1$ and $R^2$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^1$ and $R^2$ can be taken together to form an optionally substituted cyclic group and where at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^3$ and $R^4$ can be taken together to form an optionally substituted cyclic group; $R^9$ and $R^{10}$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene, wherein $R^9$ and $R^{10}$ can be taken together to form an optionally substituted cyclic group; each of $L^1$, $L^2$, $L^3$, and $L^4$ is independently a linking moiety; Ar includes or is an optionally substituted aromatic or optionally substituted arylene; n is an integer of 1 or more; each of m, m1, m2, and m3 is independently an integer of 1 or more; q is an integer of 0, 1, or 2; and each of rings a-i may independently be optionally substituted; and where at least one of rings a-i, $R^1$, $R^2$, $R^3$, $R^4$, $R^9$ and $R^{10}$ is or includes an ionizable moiety or an ionic moiety.

In some embodiment, the ionomer has a structure of formula

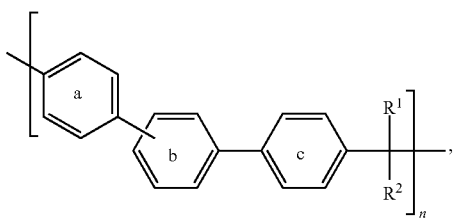
(IV)

and $R^1$ is haloalkyl.

In some embodiments, $R^1$ is trifluoromethyl and $R^2$ has a structure of formula —$(C(R^{11})_2)_rR^{12}$ (XXXIII), wherein each $R^{11}$ independently may be H, aliphatic, aralkyl, aryl, heteroaryl, alkoxy, aryloxy, thioalkyl, thioaralkyl, thioaryl, aminoalkyl, amino, aminoaryl, halo or hydroxyl; $R^{12}$ comprises amino, aryl, heterocyclyl, hydroxyl, dihydroxyl, sulfhydryl, sulfide, disulfide, sulfo, or thioester; and r is an integer of 1 to 30.

In some embodiments, $R^1$ is trifluoromethyl and $R^2$ has a structure of formula

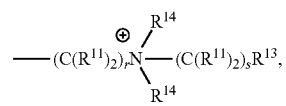
(XXXIV)

where each $R^{11}$ independently may be H, alkyl, aralkyl, aryl, heteroaryl, alkoxy, aryloxy, thioalkyl, thioaralkkyl, thioaryl, aminoalkyl, amino, aminoaryl, halo or hydroxyl; $R^{13}$ comprises amino, aryl, heterocyclyl, hydroxyl, dihydroxyl, sulfhydryl, sulfide, disulfide, sulfo, or thioester; each $R^{14}$ is independently H or aliphatic; r is an integer of 1 to 30; and s is an integer of 1 to 10.

In some embodiments, the linker is polyethylenimine, 2-(dimethylamino)ethanethiol or a salt thereof.

In some embodiments, the metal nanoparticles on the carbon-containing support material have from about 10 percent to 50 percent by weight of metal.

In some embodiments, the metal nanoparticles have a particle size of from about 1 nm to 50 nm.

In some embodiments, the metal nanoparticles have a particle size of from about 5 nm to 10 nm.

In some embodiments, a ratio of the hydrophobic moiety to the metal nanoparticles on the carbon-containing support material is from about 0.1:1 to 8:1.

In a fourth aspect, the present disclosure encompasses a $CO_x$ reduction reactor. In some embodiments, the reactor includes a membrane electrode assembly comprising: a cathode catalyst layer, the cathode catalyst layer comprising metal nanoparticles having surfaces, the metal nanoparticles immobilized on a carbon-containing support material; an anode catalyst layer; and a membrane disposed between the cathode catalyst layer and the anode catalyst layer; wherein the metal nanoparticles are modified with at least one hydrophobic moiety, the hydrophobic moiety comprising a ligand, an ionomer or a combination thereof, and wherein the ligand or the ionomer is directly bonded to the surfaces of the metal nanoparticles or bonded to the surfaces of the metal nanoparticles through a linker.

In some embodiments, the membrane is a bipolar membrane or an anion exchange membrane.

In some embodiments, the metal nanoparticles are gold, silver, palladium, copper nanoparticles or a combination thereof.

In some embodiments, the metal nanoparticles are gold nanoparticles.

In some embodiments, the ligand is an amine.

In some embodiments, the amine is oleylamine, 2-(dimethylamino)ethanethiol or a salt thereof.

In some embodiments, the ionomer is a homopolymer or a copolymer, and the homopolymer or copolymer has an aromatic backbone.

In some embodiments, the hydrophobic moiety is an ionomer and the ionomer is bonded to the surfaces of the metal nanoparticles through a linker.

In some embodiments, the ionomer includes structures of formula

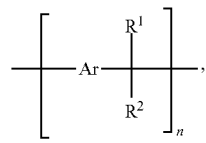
(I)

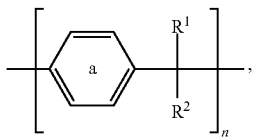
(II)

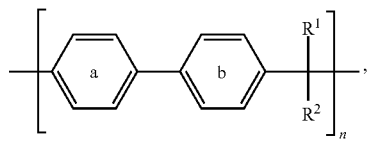
(III)

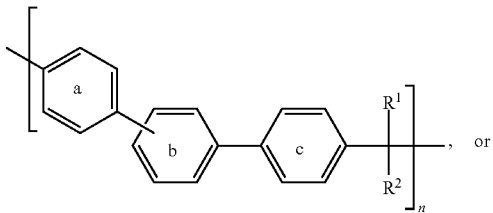
(IV)

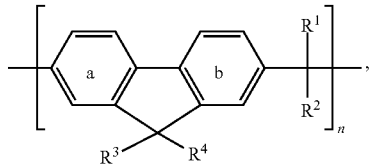
(V)

or a salt thereof, wherein $R^1$ and $R^2$ each independently may be an electron-withdrawing moiety, hydrogen (H), optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^1$ and $R^2$ can be taken together to form an optionally substituted cyclic group and wherein at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^3$ and $R^4$ can be taken together to form an optionally substituted cyclic group; Ar includes or is an optionally substituted aromatic or optionally substituted arylene; n is an integer of 1 or more; and each of ring a, ring b, and ring c may independently be optionally substituted; and where at least one of rings a-c, $R^1$, $R^2$, $R^3$, and $R^4$ is or includes an ionizable moiety or an ionic moiety.

In some embodiments, the ionomer includes structures of formula

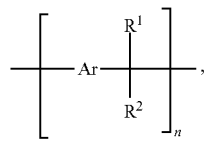
(I)

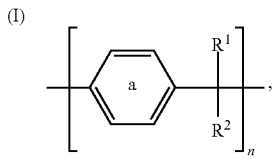
(II)

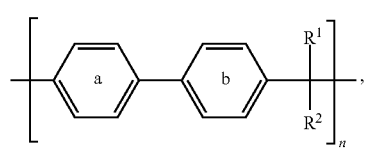
(III)

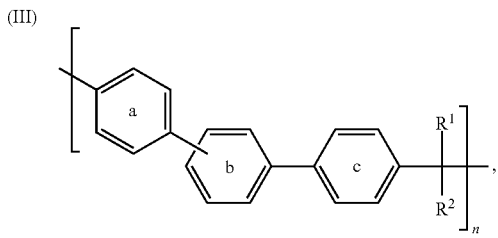
(IV)

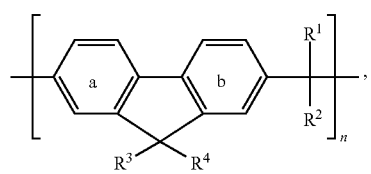
(V)

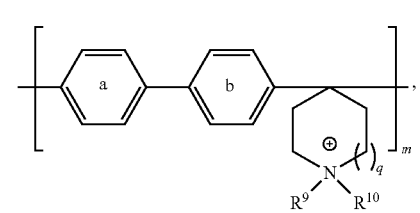
(X)

-continued

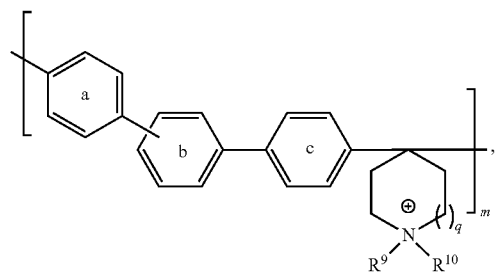
(XI)

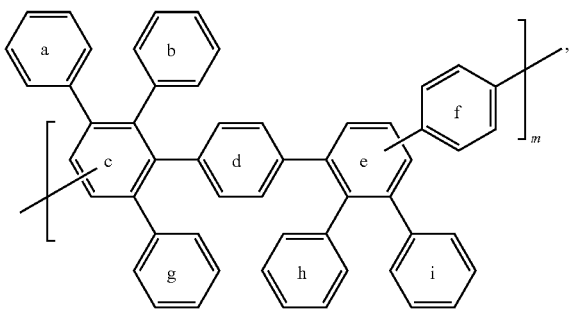
(XIII)

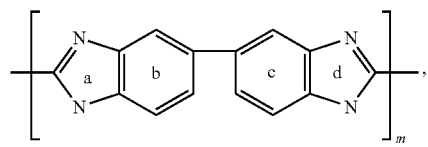
(XIV)

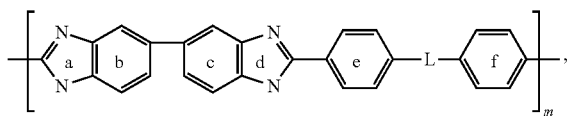
(XV)

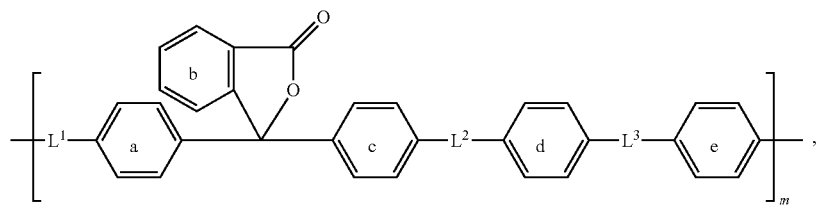
(XVI)

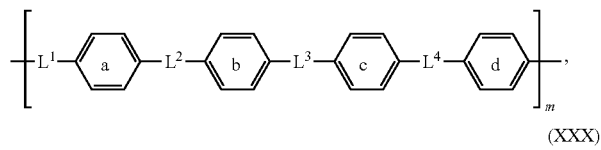
(XVII)

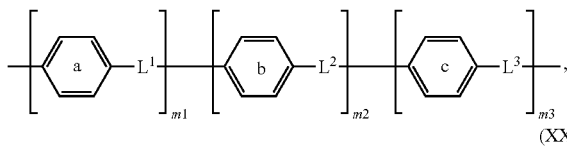
(XVIII)

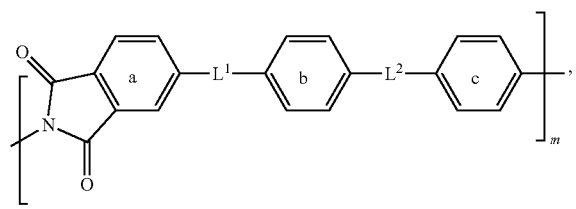
(XXX)

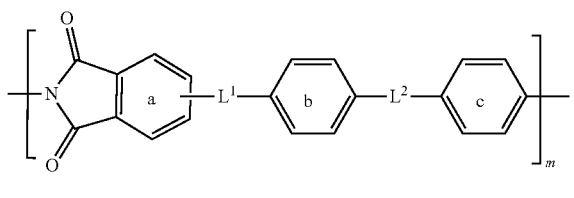
(XXXI)

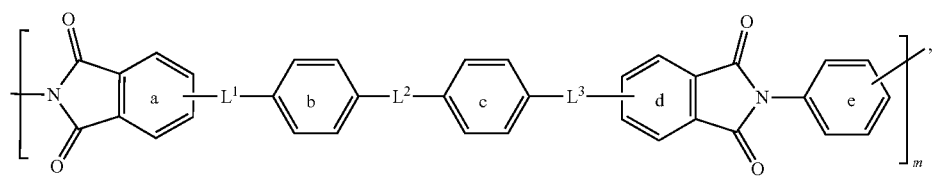
(XXXII)

or a salt thereof, where $R^1$ and $R^2$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or where $R^1$ and $R^2$ can be taken together to form an optionally substituted cyclic group and where at least one of $R^1$ or $R^2$ is an electron-withdrawing moiety; $R^3$ and $R^4$ each independently may be H, optionally substituted aliphatic, optionally substituted alkyl, optionally substituted heteroaliphatic, optionally substituted heteroalkyl, optionally substituted aromatic, optionally substituted aryl, or optionally substituted arylal- kylene, or where $R^3$ and $R^4$ can be taken together to form an optionally substituted cyclic group; $R^9$ and $R^{10}$ each independently may be an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene, wherein $R^9$ and $R^{10}$ can be taken together to form an optionally substituted cyclic group; each of $L^1$, $L^2$, $L^3$, and $L^4$ is independently a linking moiety; Ar includes or is an optionally substituted aromatic or optionally substituted arylene; n is an integer of 1 or more; each of m, m1, m2, and m3 is independently an integer of 1 or more;

q is an integer of 0, 1, or 2; and each of rings a-i may independently be optionally substituted; and where at least one of rings a-i, $R^1$, $R^2$, $R^3$, $R^4$, $R^9$ and $R^{10}$ is or includes an ionizable moiety or an ionic moiety.

In some embodiments, the ionomer has a structure of formula

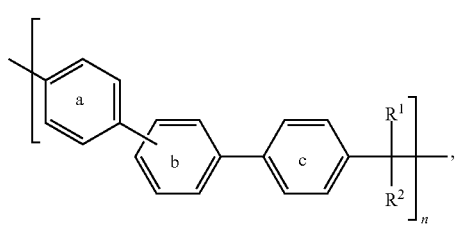

(IV)

and $R^1$ is haloalkyl.

In some embodiments, $R^1$ is trifluoromethyl and $R^2$ has a structure of formula —$(C(R^{11})_2)_rR^{12}$ (XXXIII), wherein each $R^{11}$ independently may be H, aliphatic, aralkyl, aryl, heteroaryl, alkoxy, aryloxy, thioalkyl, thioaralkyl, thioaryl, aminoalkyl, amino, aminoaryl, halo or hydroxyl; $R^{12}$ comprises amino, aryl, heterocyclyl, hydroxyl, dihydroxyl, sulfhydryl, sulfide, disulfide, sulfo, or thioester; and r is an integer of 1 to 30.

In some embodiments, $R^1$ is trifluoromethyl and $R^2$ has a structure of formula

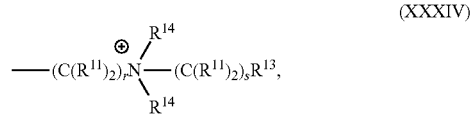

(XXXIV)

where each $R^{11}$ independently may be H, alkyl, aralkyl, aryl, heteroaryl, alkoxy, aryloxy, thioalkyl, thioaralkyl, thioaryl, aminoalkyl, amino, aminoaryl, halo or hydroxyl; $R^{13}$ comprises amino, aryl, heterocyclyl, hydroxyl, dihydroxyl, sulfhydryl, sulfide, disulfide, sulfo, or thioester; each $R^{14}$ is independently H or aliphatic; r is an integer of 1 to 30; and s is an integer of 1 to 10.

In some embodiments, the linker is polyethylenimine, 2-(dimethylamino)ethanethiol or a salt thereof.

In some embodiments, the metal nanoparticles on the carbon-containing support material have from about 10 percent to 50 percent by weight of metal.

In some embodiments, the metal nanoparticles have a particle size of from about 1 nm to 50 nm.

In some embodiments, the metal nanoparticles have a particle size of from about 5 nm to 10 nm.

In some embodiments, a ratio of the hydrophobic moiety to the metal nanoparticles on the carbon-containing support material is from about 0.1:1 to 8:1.

In a fifth aspect, the present disclosure encompasses a method of electrochemically reducing $CO_x$. In some embodiments, the method includes providing a carbon oxide to a $CO_x$ reduction reactor, and electrochemically reducing the carbon oxide at a cathode of a $CO_x$ electrolyzer to produce a carbon containing product, wherein the $CO_x$ reduction reactor comprises a membrane electrode assembly including a cathode catalyst layer, the cathode catalyst layer including metal nanoparticles having surfaces, the metal nanoparticles immobilized on a carbon-containing support material; and an anode catalyst layer; and a membrane disposed between the cathode catalyst layer and the anode catalyst layer; wherein the metal nanoparticles having surfaces are modified with at least one hydrophobic moiety, the hydrophobic moiety including a ligand, an ionomer or a combination thereof, and wherein the ligand or the ionomer is directly bonded to the surfaces of the metal nanoparticles or bonded to the surfaces of the metal nanoparticles through a linker.

In some embodiments, the membrane is a bipolar membrane or an anion exchange membrane.

In some embodiments, the carbon containing product is carbon monoxide, a hydrocarbon, formic acid, an alcohol or a combination thereof.

In some embodiments, the metal nanoparticles include gold, silver, palladium, copper or a combination thereof.

These and other aspects are described further below with reference to the drawings.

BRIEF DESCRIPTION OF THE DRAWINGS

FIG. 2A is an illustration of gold nanoparticles on a carbon-containing support material hydrophobically modified with directly bound ligands in accordance with certain disclosed embodiments.

FIG. 2B is an illustration of gold nanoparticles on a carbon-containing support material hydrophobically modified with ionomers bound through a linker in accordance with certain disclosed embodiments.

DETAILED DESCRIPTION

Figure 1:
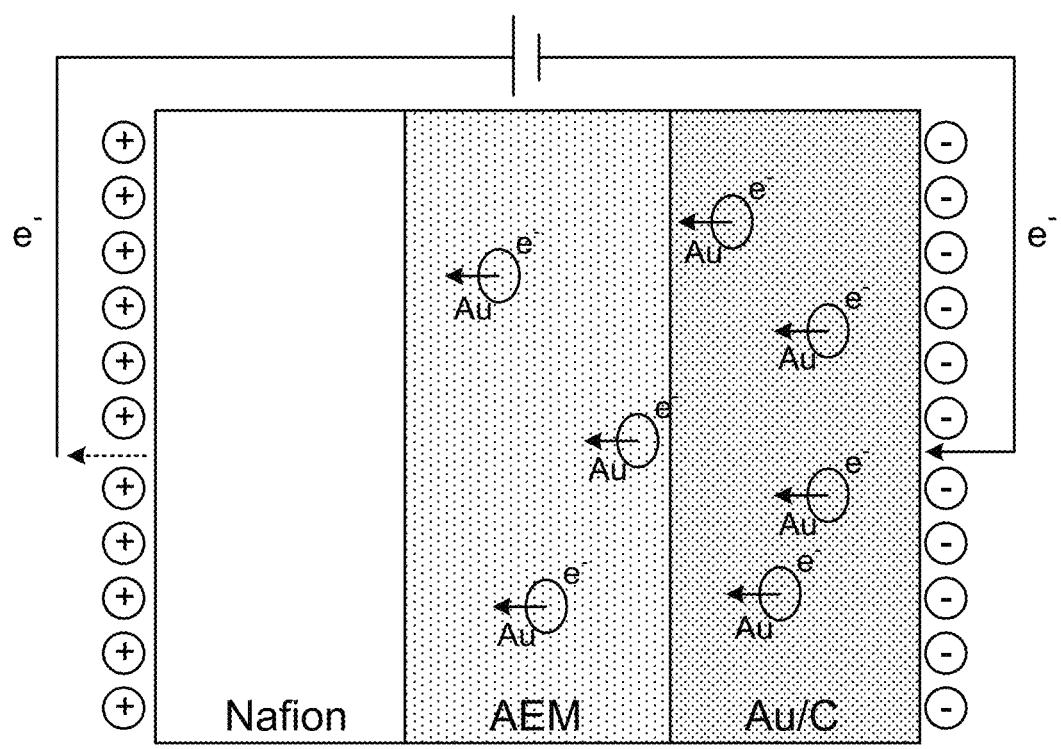
FIG. 1 is an illustration of gold migration on the cathodic side of an electrochemical cell in accordance with certain disclosed embodiments.

In the following description, numerous specific details are set forth to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

Definitions

As used herein, the term "about" is understood to account for minor increases and/or decreases beyond a recited value, which changes do not significantly impact the desired function of the parameter beyond the recited value(s). In some cases, "about" encompasses +/−10% of any recited value. As used herein, this term modifies any recited value, range of values, or endpoints of one or more ranges.

The term "acyl," or "alkanoyl," as used interchangeably herein, represents an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group. In particular embodiments, the alkanoyl group is —C(O)-Ak, in which Ak is an alkyl group, as defined herein.

By "aliphatic" is meant a hydrocarbon moiety having at least one carbon atom to 50 carbon atoms ($C_{1-50}$), such as one to 25 carbon atoms ($C_{1-25}$), or one to ten carbon atoms ($C_{1-10}$), and which includes saturated groups such as alkanes (or alkyl) and unsaturated groups such as alkenes (or alkenyl), alkynes (or alkynyl), and also includes cyclic versions thereof, and further including straight- and branched-chain arrangements, and all stereo and position isomers as well. Such a hydrocarbon can be unsubstituted or substituted with one or more groups, such as halogens or groups described herein for an alkyl group.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl. Non-limiting unsubstituted alkenyl groups include $C_{2-8}$ alkenyl, $C_{2-6}$ alkenyl, $C_{2-5}$ alkenyl, $C_{2-4}$ alkenyl, or $C_{2-3}$ alkenyl. Exemplary, non-limiting alkenyl groups include vinyl or ethenyl (—CH=CH$_2$), 1-propenyl (—CH=CHCH$_3$), allyl or 2-propenyl (—CH$_2$—CH=CH$_2$), 1-butenyl (—CH=CHCH$_2$CH$_3$), 2-butenyl (—CH$_2$CH=CHCH$_3$), 3-butenyl (e.g. —CH$_2$CH$_2$CH=CH$_2$), 2-butenylidene (e.g., =CH—CH=CHCH$_3$), and the like.

By "alkenylene" is meant a multivalent (e.g., bivalent) form of an alkenyl group, which is an optionally substituted $C_{2-24}$ alkyl group having one or more double bonds. The alkenylene group can be cyclic (e.g., $C_{3-24}$ cycloalkenyl) or acyclic. The alkenylene group can be substituted or unsubstituted. For example, the alkenylene group can be substituted with one or more substitution groups, as described herein for alkyl. Exemplary, non-limiting alkenylene groups include —CH=CH— or —CH=CHCH$_2$—.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkyl" and the prefix "alk" is meant a branched or unbranched saturated hydrocarbon group of 1 to 24 carbon atoms, such as methyl (Me), ethyl (Et), n-propyl (n-Pr or nPr), isopropyl (i-Pr or iPr), cyclopropyl, n-butyl (n-Bu or nBu), isobutyl (i-Bu or iBu), s-butyl (s-Bu or sBu), t-butyl (t-Bu or tBu), cyclobutyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can include haloalkyl, in which the alkyl group is substituted by one or more halo groups, as described herein. In another example, the alkyl group can be substituted with one, two, three or, in the case of alkyl groups of two carbons or more, four substituents independently selected from the group consisting of: (1) $C_{1-6}$ alkoxy (e.g., —O-Ak, wherein Ak is optionally substituted $C_{1-6}$ alkyl); (2) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (3) aryl; (4) arylalkoxy (e.g., —O-Lk-Ar, wherein Lk is a bivalent form of optionally substituted alkyl and Ar is optionally substituted aryl); (5) aryloyl (e.g., —C(O)—Ar, wherein Ar is optionally substituted aryl); (6) cyano (e.g., —CN); (7) carboxyaldehyde (e.g., —C(O)H); (8) carboxyl (e.g., —CO$_2$H); (9) $C_{3-8}$ cycloalkyl (e.g., a monovalent saturated or unsaturated non-aromatic cyclic $C_{3-8}$ hydrocarbon group); (10) halo (e.g., F, Cl, Br, or I); (11) heterocyclyl (e.g., a 3-, 4-, 5-, 6- or 7-membered ring, unless otherwise specified, containing one, two, three, or four non-carbon heteroatoms, such as nitrogen, oxygen, phosphorous, sulfur, or halo); (12) heterocyclyloxy (e.g., —O-Het, wherein Het is heterocyclyl, as described herein); (13) heterocyclyloyl (e.g., —C(O)—Het, wherein Het is heterocyclyl, as described herein); (14) hydroxyl (e.g., —OH); (15) N-protected amino; (16) nitro (e.g., —NO$_2$); (17) oxo (e.g., =O); (18) —CO$_2$R$^A$, where R$^A$ is selected from the group consisting of (a) $C_{1-6}$ alkyl, (b) $C_{4-18}$ aryl, and (c) ($C_{4-18}$ aryl) $C_{1-6}$ alkyl (e.g., -Lk-Ar, wherein Lk is a bivalent form of optionally substituted alkyl group and Ar is optionally substituted aryl); (19) —C(O)NR$^B$R$^C$, where each of R$^B$ and R$^C$ is, independently, selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -Lk-Ar, wherein Lk is a bivalent form of optionally substituted alkyl group and Ar is optionally substituted aryl); and (20) —NR$^G$R$^H$, where each of R$^G$ and R$^H$ is, independently, selected from the group consisting of (a) hydrogen, (b) an N-protecting group, (c) $C_{1-6}$ alkyl, (d) $C_{2-6}$ alkenyl (e.g., optionally substituted alkyl having one or more double bonds), (e) $C_{2-6}$ alkynyl (e.g., optionally substituted alkyl having one or more triple bonds), (f) $C_{4-18}$ aryl, (g) ($C_{4-18}$ aryl) $C_{1-6}$ alkyl (e.g., Lk-Ar, wherein Lk is a bivalent form of optionally substituted alkyl group and Ar is optionally substituted aryl), (h) $C_{3-8}$ cycloalkyl, and (i) ($C_{3-8}$ cycloalkyl) $C_{1-6}$ alkyl (e.g., -Lk-Cy, wherein Lk is a bivalent form of optionally substituted alkyl group and Cy is optionally substituted cycloalkyl, as described herein), wherein in one embodiment no two groups are bound to the nitrogen atom through a carbonyl group. The alkyl group can be a primary, secondary, or tertiary alkyl group substituted with one or more substituents (e.g., one or more halo or alkoxy). In some embodiments, the unsubstituted alkyl group is a $C_{1-2}$, $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkyl group.

By "alkylene" is meant a multivalent (e.g., bivalent) form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkylcarbonyl" is meant an alkyl group as previously defined appended to the parent molecular moiety through a carbonyl group. Exemplary, non-limiting alkylcarbonyl groups include methylcarbonyl, ethylcarbonyl, and isopropylcarbonyl among others.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl. Non-limiting unsubstituted alkynyl groups include $C_{2-8}$ alkynyl, $C_{2-6}$ alkynyl, $C_{2-5}$ alkynyl, $C_{2-4}$ alkynyl, or $C_{2-3}$ alkynyl. Exemplary, non-limiting alkynyl groups include ethynyl (—C≡CH), 1-propynyl (—C≡CCH$_3$), 2-propynyl or propargyl (—CH$_2$C≡CH), 1-butynyl (—C≡CCH$_2$CH$_3$), 2-butynyl (—CH$_2$C≡CCH$_3$), 3-butynyl (—CH$_2$CH$_2$C≡CH), and the like.

By "alkynylene" is meant a multivalent (e.g., bivalent) form of an alkynyl group, which is an optionally substituted $C_{2-24}$ alkyl group having one or more triple bonds. The alkynylene group can be cyclic or acyclic. The alkynylene group can be substituted or unsubstituted. For example, the alkynylene group can be substituted with one or more substitution groups, as described herein for alkyl. Exemplary, non-limiting alkynylene groups include —C≡C— or —C≡CCH$_2$—.

By "amido" is meant —N(R$^{N1}$)C(O)—, where R$^{N1}$ is H, optionally substituted alkyl, or optionally substituted aryl.

By "amino" is meant —NR$^{N1}$R$^{N2}$, where each of R$^{N1}$ and R$^{N2}$ is, independently, H, optionally substituted alkyl, or optionally substituted acyl, or optionally substituted aryl, or R$^{N1}$ and R$^{N2}$, taken together with the nitrogen atom to which each are attached, form a heterocyclyl group, as defined herein.

By "aminoalkyl" is meant an alkyl group, as defined herein, substituted by an amino group, as defined herein.

By "aminoaryl" is meant an aryl group, as defined herein, substituted by an amino group, as defined herein.

By "ammonium" is meant a group including a protonated nitrogen atom N$^+$. Exemplary ammonium groups include —N$^+$R$^{N1}$R$^{N2}$R$^{N3}$ where each of R$^{N1}$, R$^{N2}$, and R$^{N3}$ is, independently, H, optionally substituted alkyl, optionally substituted cycloalkyl, or optionally substituted aryl; or R$^{N1}$ and R$^{N2}$, taken together with the nitrogen atom to which each are attached, form an optionally substituted heterocyclyl group or heterocycle; or R$^{N1}$ and R$^{N2}$, taken together, form an optionally substituted alkylene or heteroalkylene (e.g., as described herein); or R$^{N1}$ and R$^{N2}$ and R$^{N3}$, taken together with the nitrogen atom to which each are attached, form an optionally substituted heterocyclyl group or heterocycle, such as a heterocyclic cation.

By "aromatic" is meant a cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Huckel rule (4n+2). The point of attachment to the parent structure typically is through an aromatic portion of the condensed ring system. Such an aromatic can be unsubstituted or substituted with one or more groups, such as groups described herein for an alkyl or aryl group. Yet other substitution groups can include aliphatic, haloaliphatic, halo, nitrate, cyano, sulfonate, sulfonyl, or others.

By "aryl" is meant a group that contains any carbon-based aromatic group including, but not limited to, phenyl, benzyl, anthracenyl, anthryl, benzocyclobutenyl, benzocyclooctenyl, biphenylyl, chrysenyl, dihydroindenyl, fluoranthenyl, indacenyl, indenyl, naphthyl, phenanthryl, phenoxybenzyl, picenyl, pyrenyl, terphenyl, and the like, including fused benzo-$C_{4-8}$ cycloalkyl radicals (e.g., as defined herein) such as, for instance, indanyl, tetrahydronaphthyl, fluorenyl, and the like. The term aryl also includes heteroaryl, which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term non-heteroaryl, which is also included in the term aryl, defines a group that contains an aromatic group that does not contain a heteroatom. The aryl group can be substituted or unsubstituted. The aryl group can be substituted with one, two, three, four, or five substituents, such as any described herein for alkyl.

By "arylalkoxy" is meant an arylalkylene group, as defined herein, attached to the parent molecular group through an oxygen atom. In some embodiments, the arylalkoxy group is —O-Ak-Ar, in which Ak is an optionally substituted alkylene, as defined herein, and Ar is an optionally substituted aryl, as defined herein.

By "(aryl)(alkyl)ene" is meant a bivalent form including an arylene group, as described herein, attached to an alkylene or a heteroalkylene group, as described herein. In some embodiments, the (aryl)(alkyl)ene group is -L-Ar- or -L-Ar-L- or -Ar-L-, in which Ar is an arylene group and each L is, independently, an optionally substituted alkylene group or an optionally substituted heteroalkylene group.

By "arylalkylene" is meant an aryl group, as defined herein, attached to the parent molecular group through an alkylene group, as defined herein. In some embodiments, the arylalkylene group is -Ak-Ar, in which Ak is an optionally substituted alkylene, as defined herein, and Ar is an optionally substituted aryl, as defined herein. The arylalkylene group can be substituted or unsubstituted. For example, the arylalkylene group can be substituted with one or more substitution groups, as described herein for aryl and/or alkyl. Exemplary unsubstituted arylalkylene groups are of from 7 to 16 carbons ($C_{7-16}$ arylalkylene), as well as those having an aryl group with 4 to 18 carbons and an alkylene group with 1 to 6 carbons (i.e., ($C_{4-18}$ aryl)$C_{1-6}$ alkylene).

By "arylene" is meant a multivalent (e.g., bivalent, trivalent, tetravalent, etc.) form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "aryloxy" is meant an aryl group, as defined herein, attached to the parent molecular group through an oxygen atom.

By "aryloyl" is meant an aryl group that is attached to the parent molecular group through a carbonyl group. In some embodiments, an unsubstituted aryloyl group is a $C_{7-11}$ aryloyl or $C_{5-19}$ aryloyl group. In particular embodiments, the aryloyl group is —C(O)—Ar, in which Ar is an aryl group, as defined herein.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

By "azido" is meant —$N_3$

By "boranyl" is meant a —$BR_2$ group, in which each R, independently, can be H, halo, or optionally substituted alkyl.

By "borono" is meant a —$BOH_2$ group.

By "branched alkenyl" is meant an isomer of a straight chain alkenyl compound; one having alkyl groups bonded to the main carbon chain.

By "carbonyl" is meant a —C(O)— group, which can also be represented as >C=O.

By "carboxyl" is meant a —$CO_2H$ group.

By "carboxylate anion" is meant a —$CO_2$ group.

By "covalent bond" is meant a covalent bonding interaction between two components. Non-limiting covalent bonds include a single bond, a double bond, a triple bond, or a spirocyclic bond, in which at least two molecular groups are bonded to the same carbon atom.

By "cyano" is meant —CN.

By "cyclic group" is used herein to refer to either aryl groups, non-aryl groups (e.g., cycloalkyl or heterocycloalkyl groups), or both. Cyclic groups have one or more ring systems that can be substituted or unsubstituted. A cyclic group can contain one or more aryl groups, one or more non-aryl groups, or one or more aryl groups and one or more non-aryl groups.

By "cycloalkyl" is meant a monovalent saturated or unsaturated non-aromatic or aromatic cyclic hydrocarbon group of from three to eight carbons, unless otherwise specified, and is exemplified by cyclopropyl, cyclobutyl, cyclopentyl, cyclopentadienyl, cyclohexyl, cycloheptyl, bicyclo[2.2.1.]heptyl, and the like. The cycloalkyl group can also be substituted or unsubstituted. For example, the cycloalkyl group can be substituted with one or more groups including those described herein for alkyl.

By "dicarbonyl" is meant any moiety or compound including two carbonyl groups, as defined herein. Non-limiting dicarbonyl moieties include 1,2-dicarbonyl (e.g., $R^{C1}$—C(O)—C(O)$R^{C2}$, in which each of $R^{C1}$ and $R^{C2}$ is, independently, optionally substituted alkyl, halo, optionally substituted alkoxy, hydroxyl, or a leaving group); 1,3-dicarbonyl (e.g., $R^{C1}$—C(O)—C($R^{1a}R^{2a}$)—C(O)$R^{C2}$, in which each of $R^{C1}$ and $R^{C2}$ is, independently, optionally substituted alkyl, halo, optionally substituted alkoxy, hydroxyl, or a leaving group and in which each of $R^{1a}$ and $R^{2a}$ is, independently, H or an optional substituent provided for alkyl, as defined herein); and 1,4-dicarbonyl (e.g., $R^{C1}$—C(O)—C($R^{1a}R^{2a}$)—C($R^{3a}R^{4a}$)—C(O)$R^{C2}$, in which each of $R^{C1}$ and $R^{C2}$ is, independently, optionally substituted alkyl, halo, optionally substituted alkoxy, hydroxyl, or a leaving group and in which each of $R^{1a}$, $R^{2a}$, $R^{3a}$ and $R^{4a}$ is, independently, H or an optional substituent provided for alkyl, as defined herein).

By "electron withdrawing moiety" is meant a moiety capable of donating at least a portion of its electron density into the ring or functional group to which it is directly attached, such as by resonance.

By "halo" is meant F, Cl, Br, or I.

By "halo containing substituent" is meant a group that contains a halo, such as a haloaliphatic or haloalkyl group.

By "haloaliphatic" is meant an aliphatic group, as defined herein, substituted with one or more halo.

By "haloalkenyl" is meant an alkenyl group, as defined herein, substituted with one or more halo.

By "haloalkynyl" is meant an alkynyl group, as defined herein, substituted with one or more halo.

By "haloalkyl" is meant an alkyl group, as defined herein, substituted with one or more halogen. Non-limiting unsubstituted haloalkyl groups include $C_{1-2}$ haloalkyl, $C_{1-3}$ haloalkyl, $C_{1-4}$ haloalkyl, $C_{1-5}$ haloalkyl, $C_{1-6}$ haloalkyl, $C_{2-3}$ haloalkyl, $C_{2-4}$ haloalkyl, Cis haloalkyl, $C_{2-6}$ haloalkyl, or $C_{3-6}$ haloalkyl. Other non-limiting haloalkyl groups include —$CX_yH_{3-y}$, wherein y is 1, 2, or 3, and wherein each X is, independently, halo (F, Cl, Br, or I); —$CX_zH_2CX_yH_{3-y}$, wherein z is 0, 1, or 2, wherein y is 0, 1, 2, or 3, and wherein each X is, independently, halo (F, Cl, Br, or I), in which at least one of z or y is not 0; —$CH_2CX_yH_{3-y}$, wherein y is 1, 2, or 3, and wherein each X is, independently, halo (F, Cl, Br, or I); —$CX_{z1}H_{2-z1}CX_{z2}H_{2-z2}CX_yH_{3-y}$, wherein each of z1 and z2 is, independently, 0, 1, or 2, wherein y is 0, 1, 2, or 3, and wherein each X is, independently, halo (F, Cl, Br, or I), in which at least one of z1, z2, or y is not 0; and —$CX_zH_{1-z}[CX_{y1}H_{3-y1}][CX_{y2}H_{3-y2}]$, wherein z is 0 or 1, wherein each of y1 and y2 is, independently, 0, 1, 2, or 3, and wherein each X is, independently, halo (F, Cl, Br, or I), in which at least one of z, y1, or y2 is not 0.

By "haloalkylene" is meant an alkylene group, as defined herein, substituted with one or more halo.

By "heteroaliphatic" is meant an aliphatic group, as defined herein, including at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group.

By "heteroalkyl" is meant an alkyl group, as defined herein, containing one, two, three, or four non-carbon heteroatoms (e.g., independently selected from the group consisting of nitrogen, oxygen, phosphorous, sulfur, selenium, or halo).

By "heteroalkylene" is meant an alkylene group, as defined herein, containing one, two, three, or four non-carbon heteroatoms (e.g., independently selected from the group consisting of nitrogen, oxygen, phosphorous, sulfur, selenium, or halo). The heteroalkylene group can be saturated or unsaturated (e.g., having one or more double bonds or triple bonds). The heteroalkylene group can be substituted or unsubstituted. For example, the heteroalkylene group can be substituted with one or more substitution groups, as described herein for alkyl.

By "heteroaryl" is meant a subset of heterocyclyl groups, as defined herein, which are aromatic, i.e., they contain 4n+2 pi electrons within the mono- or multicyclic ring system.

The term "heterocycloalkyl" is a type of cycloalkyl group as defined above where at least one of the carbon atoms and its attached hydrogen atoms, if any, are replaced by O, S, N, or NH. The heterocycloalkyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein.

By "heterocycle" is meant a compound having one or more heterocyclyl moieties. Non-limiting heterocycles include optionally substituted imidazole, optionally substituted triazole, optionally substituted tetrazole, optionally substituted pyrazole, optionally substituted imidazoline, optionally substituted pyrazoline, optionally substituted imidazolidine, optionally substituted pyrazolidine, optionally substituted pyrrole, optionally substituted pyrroline, optionally substituted pyrrolidine, optionally substituted tetrahydrofuran, optionally substituted furan, optionally substituted thiophene, optionally substituted oxazole, optionally substituted isoxazole, optionally substituted isothiazole, optionally substituted thiazole, optionally substituted oxathiolane, optionally substituted oxadiazole, optionally substituted thiadiazole, optionally substituted sulfolane, optionally substituted succinimide, optionally substituted thiazolidinedione, optionally substituted oxazolidone, optionally substituted hydantoin, optionally substituted pyridine, optionally substituted piperidine, optionally substituted pyridazine, optionally substituted piperazine, optionally substituted pyrimidine, optionally substituted pyrazine, optionally substituted triazine, optionally substituted pyran, optionally substituted pyrylium, optionally substituted tetrahydropyran, optionally substituted dioxine, optionally substituted dioxane, optionally substituted dithiane, optionally substituted trithiane, optionally substituted thiopyran, optionally substituted thiane, optionally substituted oxazine, optionally substituted morpholine, optionally substituted thiazine, optionally substituted thiomorpholine, optionally substituted cytosine, optionally substituted thymine, optionally substituted uracil, optionally substituted thiomorpholine dioxide, optionally substituted indene, optionally substituted indoline, optionally substituted indole, optionally substituted isoindole, optionally substituted indolizine, optionally substituted indazole, optionally substituted benzimidazole, optionally substituted azaindole, optionally substituted azaindazole, optionally substituted pyrazolopyrimidine, optionally substituted purine, optionally substituted benzofuran, optionally substituted isobenzofuran, optionally substituted benzothiophene, optionally substituted benzisoxazole, optionally substituted anthranil, optionally substituted benzisothiazole, optionally substituted benzoxazole, optionally substituted benzthiazole, optionally substituted benzthiadiazole, optionally substituted adenine, optionally substituted guanine, optionally substituted tetrahydroquinoline, optionally substituted dihydroquinoline, optionally substituted dihydroisoquinoline, optionally substituted quinoline, optionally substituted isoquinoline, optionally substituted quinolizine, optionally substituted quinoxaline, optionally substituted phthalazine, optionally substituted quinazoline, optionally substituted cinnoline, optionally substituted naphthyridine, optionally substituted pyridopyrimidine, optionally substituted pyridopyrazine, optionally substituted pteridine, optionally substituted chromene, optionally substituted isochromene, optionally substituted chromenone, optionally substituted benzoxazine, optionally substituted quinolinone, optionally substituted isoquinolinone, optionally substituted carbazole, optionally substituted dibenzofuran, optionally substituted acridine, optionally substituted phenazine, optionally substituted phenoxazine, optionally substituted phenothiazine, optionally substituted phenoxathiine, optionally substituted quinuclidine, optionally substituted azaadamantane, optionally substituted dihydroazepine, optionally substituted azepine, optionally substituted diazepine, optionally substituted oxepane, optionally substituted thiepine, optionally substituted thiazepine, optionally substituted azocane, optionally substituted azocine, optionally substituted thiocane, optionally substituted azonane, optionally substituted azecine, etc. Optional substitutions include any described herein for aryl. Heterocycles can also include cations and/or salts of any of these (e.g., any described herein, such as optionally substituted piperidinium, optionally substituted pyrrolidinium, optionally substituted pyrazolium, optionally substituted imidazolium, optionally substituted pyridinium, optionally substituted quinolinium, optionally substituted isoquinolinium, optionally substituted acridinium, optionally substituted phenanthridinium, optionally substituted pyridazinium, optionally substituted pyrimidinium, optionally substituted pyrazinium, optionally substituted phenazinium, or optionally substituted morpholinium).

By "heterocyclyl" is meant a 3-, 4-, 5-, 6- or 7-membered ring, unless otherwise specified, containing one, two, three, or four non-carbon heteroatoms (e.g., independently selected from the group consisting of nitrogen, oxygen, phosphorous, sulfur, selenium, or halo). The 3-membered ring has zero to one double bonds, the 4- and 5-membered ring has zero to two double bonds, and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include acridinyl, adenyl, alloxazinyl, azaadamantanyl, azabenzimidazolyl, azabicyclononyl, azacycloheptyl, azacyclooctyl, azacyclononyl, azahypoxanthinyl, azaindazolyl, azaindolyl, azecinyl, azepanyl, azepinyl, azetidinyl, azetyl, aziridinyl, azirinyl, azocanyl, azocinyl, azonanyl, benzimidazolyl, benzisothiazolyl, benzisoxazolyl, benzodiazepinyl, benzodiazocinyl, benzodihydrofuryl, benzodioxepinyl, benzodioxinyl, benzodioxanyl, benzodioxocinyl, benzodioxolyl, benzodithiepinyl, benzodithiinyl, benzodioxocinyl, benzofuranyl, benzophenazinyl, benzopyranonyl, benzopyranyl, benzopyrenyl, benzopyronyl, benzoquinolinyl, benzoquinolizinyl, benzothiadiazepinyl, benzothiadiazolyl, benzothiazepinyl, benzothiazocinyl, benzothiazolyl, benzothienyl, benzothiophenyl, benzothiazinonyl, benzothiazinyl, benzothiopyranyl, benzothiopyronyl, benzotriazepinyl, benzotriazinonyl, benzotriazinyl, benzotriazolyl, benzoxathiinyl, benzotrioxepinyl, benzoxadiazepinyl, benzoxathiazepinyl, benzoxathiepinyl, benzoxathiocinyl, benzoxazepinyl, benzoxazinyl, benzoxazocinyl, benzoxazolinonyl, benzoxazolinyl, benzoxazolyl, benzylsultamyl, benzylsultimyl, bipyrazinyl, bipyridinyl, carbazolyl (e.g., 4H-carbazolyl), carbolinyl (e.g., β-carbolinyl), chromanonyl, chromanyl, chromenyl, cinnolinyl, coumarinyl, cytdinyl, cytosinyl, decahydroisoquinolinyl, decahydroquinolinyl, diazabicyclooctyl, diazetyl, diaziridinethionyl, diaziridinonyl, diaziridinyl, diazirinyl, dibenzisoquinolinyl, dibenzoacridinyl, dibenzocarbazolyl, dibenzofuranyl, dibenzophenazinyl, dibenzopyranonyl, dibenzopyronyl (xanthonyl), dibenzoquinoxalinyl, dibenzothiazepinyl, dibenzothiepinyl, dibenzothiophenyl, dibenzoxepinyl, dihydroazepinyl, dihydroazetyl, dihydrofuranyl, dihydrofuryl, dihydroisoquinolinyl, dihydropyranyl, dihydropyridinyl, dihydroypyridyl, dihydroquinolinyl, dihydrothienyl, dihydroindolyl, dioxanyl, dioxazinyl, dioxindolyl, dioxiranyl, dioxenyl, dioxinyl, dioxobenzofuranyl, dioxolyl, dioxotetrahydrofuranyl, dioxothiomorpholinyl, dithianyl, dithiazolyl, dithienyl, dithiinyl, furanyl, furazanyl, furoyl, furyl, guaninyl, homopiperazinyl, homopiperidinyl, hypoxanthinyl, hydantoinyl, imidazolidinyl, imidazolinyl, imidazolyl, indazolyl (e.g., 1H-indazolyl), indolenyl, indolinyl, indolizinyl, indolyl (e.g., 1H-indolyl or 3H-indolyl), isatinyl, isatyl, isobenzofuranyl, isochromanyl, isochromenyl, isoindazoyl, isoindolinyl, isoindolyl, isopyrazolonyl, isopyrazolyl, isoxazolidiniyl, isoxazolyl, isoquinolinyl, isoquinolinyl, isothiazolidinyl, isothiazolyl, morpholinyl, naphthindazolyl, naphthindolyl, naphthiridinyl, naphthopyranyl, naphthothiazolyl, naphthothioxolyl, naphthotriazolyl, naphthoxindolyl, naphthyridinyl, octahydroisoquinolinyl, oxabicycloheptyl, oxauracil, oxadiazolyl, oxazinyl, oxaziridinyl, oxazolidinyl, oxazolidonyl, oxazolinyl, oxazolonyl, oxazolyl, oxepanyl, oxetanonyl, oxetanyl, oxetyl, oxtenayl, oxindolyl, oxiranyl, oxobenzoisothiazolyl, oxochromenyl, oxoisoquinolinyl, oxoquinolinyl, oxothiolanyl, phenanthridinyl, phenanthrolinyl, phenazinyl, phenothiazinyl, phenothienyl (benzothiofuranyl), phenoxathiinyl, phenoxazinyl, phthalazinyl, phthalazonyl, phthalidyl, phthalimidinyl, piperazinyl, piperidinyl, piperidonyl (e.g., 4-piperidonyl), pteridinyl, purinyl, pyranyl, pyrazinyl, pyrazolidinyl, pyrazolinyl, pyrazolopyrimidinyl, pyrazolyl, pyridazinyl, pyridinyl, pyridopyrazinyl, pyridopyrimidinyl, pyridyl, pyrimidinyl, pyrimidyl, pyronyl, pyrrolidinyl, pyrrolidonyl (e.g., 2-pyrrolidonyl), pyrrolinyl, pyrrolizidinyl, pyrrolyl (e.g., 2H-pyrrolyl), pyrylium, quinazolinyl, quinolinyl, quinolizinyl (e.g., 4H-quinolizinyl), quinoxalinyl, quinuclidinyl, selenazinyl, selenazolyl, selenophenyl, succinimidyl, sulfolanyl, tetrahydrofuranyl, tetrahydrofuryl, tetrahydroisoquinolinyl, tetrahydroisoquinolyl, tetrahydropyridinyl, tetrahydropyridyl (piperidyl), tetrahydropyranyl, tetrahydropyronyl, tetrahydroquinolinyl, tetrahydroquinolyl, tetrahydrothienyl, tetrahydrothiophenyl, tetrazinyl, tetrazolyl, thiadiazinyl (e.g., 6H-1,2,5-thiadiazinyl or 2H,6H-1,5,2-dithiazinyl), thiadiazolyl, thianthrenyl, thianyl, thianaphthenyl, thiazepinyl, thiazinyl, thiazolidinedionyl, thiazolidinyl, thiazolyl, thienyl, thiepanyl, thiepinyl, thietanyl, thietyl, thiiranyl, thiocanyl, thiochromanonyl, thiochromanyl, thiochromenyl, thiodiazinyl, thiodiazolyl, thioindoxyl, thiomorpholinyl, thiophenyl, thiopyranyl, thiopyronyl, thiotriazolyl, thiourazolyl, thioxanyl, thioxolyl, thymidinyl, thyminyl, triazinyl, triazolyl, trithianyl, urazinyl, urazolyl, uretidinyl, uretinyl, uricyl, uridinyl, xanthenyl, xanthinyl, xanthionyl, and the like, as well as modified forms thereof (e.g., including one or more oxo and/or amino) and salts thereof. The heterocyclyl group can be substituted or unsubstituted. For example, the heterocyclyl group can be substituted with one or more substitution groups, as described herein for aryl.

By "heterocyclyldiyl" is meant a bivalent form of a heterocyclyl group, as described herein. In one instance, the heterocyclyldiyl is formed by removing a hydrogen from a heterocyclyl group. Exemplary heterocyclyldiyl groups include piperdylidene, quinolinediyl, etc. The heterocyclyldiyl group can also be substituted or unsubstituted. For example, the heterocyclyldiyl group can be substituted with one or more substitution groups, as described herein for heterocyclyl.

By "hydroxyalkyl" is meant an alkyl group, as defined herein, substituted with one or more hydroxyl.

By "hydroxyalkylene" is meant an alkylene group, as defined herein, substituted with one or more hydroxy.

By "hydroxyl" is meant —OH.

By "imino" is meant —NR—, in which R can be H or optionally substituted alkyl.

By "isocyanato" is meant —NCO.

By "isothiocyanato" is meant —N=C=S.

By "leaving group" is meant an atom (or a group of atoms) with electron withdrawing ability that can be displaced as a stable species, taking with it the bonding electrons, or an atom (or a group of atoms) that can be replaced by a substitution reaction. Examples of suitable leaving groups include H, halides, and sulfonates including, but not limited to, triflate (—OTf), mesylate (—OMs), tosylate (—OTs), brosylate (—OBs), acetate, Cl, Br, and I.

By "nitro" is meant an —NO$_2$ group.

By "oxo" is meant an =O group.

By "oxy" is meant —O—.

By "phosphate" is meant a group derived from phosphoric acid. One example of phosphate includes a —O—P(=O)(OR$^{P1}$)(OR$^{P2}$) or —O—[P(=O)(OR$^{P1}$)—O]$_{P3}$—R$^{P2}$ group, where each of R$^{P1}$ and R$^{P2}$, is, independently, H, optionally substituted alkyl, optionally substituted alkenyl, optionally substituted aryl, or optionally substituted arylalkylene, and where P3 is an integer from 1 to 5. Yet other examples of phosphate include orthophosphoric acid, pyrophosphoric acid, tripolyphosphoric acid, tetrapolyphosphoric acid, trimetaphosphoric acid, and/or phosphoric anhydride, or combinations thereof.

By "phosphono" or "phosphonic acid" is meant a —P(O)(OH)$_2$ group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," *J. Pharm. Sci.* 1977 January; 66(1):1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, gluconate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other salts include ammonium, sulfonium, sulfoxonium, phosphonium, iminium, imidazolium, benzimidazolium, amidinium, guanidinium, phosphazinium, phosphazenium, pyridinium, etc., as well as other cationic groups described herein (e.g., optionally substituted isoxazolium, optionally substituted oxazolium, optionally substituted thiazolium, optionally substituted pyrrolium, optionally substituted furanium, optionally substituted thiophenium, optionally substituted imidazolium, optionally substituted pyrazolium, optionally substituted isothiazolium, optionally substituted triazolium, optionally substituted tetrazolium, optionally substituted furazanium, optionally substituted pyridinium, optionally substituted pyrimidinium, optionally substituted pyrazinium, optionally substituted triazinium, optionally substituted tetrazinium, optionally substituted pyridazinium, optionally substituted oxazinium, optionally substituted pyrrolidinium, optionally substituted pyrazolidinium, optionally substituted imidazolinium, optionally substituted isoxazolidinium, optionally substituted oxazolidinium, optionally substituted piperazinium, optionally substituted piperidinium, optionally substituted morpholinium, optionally substituted azepanium, optionally substituted azepinium, optionally substituted indolium, optionally substituted isoindolium, optionally substituted indolizinium, optionally substituted indazolium, optionally substituted benzimidazolium, optionally substituted isoquinolinum, optionally substituted quinolizinium, optionally substituted dehydroquinolizinium, optionally substituted quinolinium, optionally substituted isoindolinium, optionally substituted benzimidazolinium, and optionally substituted purinium). Yet other salts can include an anion, such as a halide (e.g., F⁻, Cl⁻, Br⁻, or I⁻), a hydroxide (e.g., OH⁻), a borate (e.g., tetrafluoroborate ($BF_4^-$)), a carbonate (e.g., $CO_3^{2-}$ or $HCO_3^-$), or a sulfate (e.g., $SO_4^{2-}$).

By "silyl" is meant a —$SiR^1R^2R^3$ or —$SiR^1R^2$— group. In some embodiments, each of $R^1$, $R^2$, and $R^3$ is, independently, H, optionally substituted aliphatic, optionally substituted heteroaliphatic, optionally substituted aromatic, optionally substituted heteroaromatic, or optionally substituted amino. In particular embodiments, each of $R^1$, $R^2$, and $R^3$ is, independently, H, optionally substituted alkyl, optionally substituted alkoxy, optionally substituted aryl, optionally substituted aryloxy, optionally substituted alkyl-aryl, optionally substituted aryl-alkyl, or optionally substituted amino. In other embodiments, the silyl group is —$Si(R)_a(OR)_b(NR_2)_c$, in which each R is, independently, H, optionally substituted aliphatic, optionally substituted heteroaliphatic, optionally substituted aromatic, or optionally substituted heteroaromatic; each of a, b, and c≥0; and a+b+c=3. In particular embodiments, each R is, independently, H, optionally substituted alkyl, optionally substituted aryl, optionally substituted alkyl-aryl, or optionally substituted aryl-alkyl.

By "spirocyclyl" is meant an alkylene diradical, both ends of which are bonded to the same carbon atom of the parent group to form a spirocyclyl group and also a heteroalkylene diradical, both ends of which are bonded to the same atom. Non-limiting alkylene and heteroalkylene groups for use within a spirocyclyl group includes $C_{2-12}$, $C_{2-11}$, $C_{2-10}$, $C_{2-9}$, $C_{2-8}$, $C_{2-7}$, $C_{2-6}$, $C_{2-5}$, $C_{2-4}$, or $C_{2-3}$ alkylene groups, as well as $C_{1-12}$, $C_{1-11}$, $C_{1-10}$, $C_{1-9}$, $C_{1-8}$, $C_{1-7}$, $C_{1-6}$, $C_{1-5}$, $C_{1-4}$, $C_{1-3}$, or $C_{1-2}$ heteroalkylene groups having one or more heteroatoms.

By "sulfate" is meant a group derived from sulfuric acid. One example of sulfate includes a —O—S(=O)$_2$(OR$^{S1}$) group, where $R^{S1}$ is H, optionally substituted alkyl, optionally substituted alkenyl, optionally substituted aryl, or optionally substituted arylalkylene.

By "sulfa" or "sulfonic acid" is meant an —S(O)$_2$OH group.

By "sulfonyl" is meant an —S(O)$_2$— or —S(O)$_2$R group, in which R can be H, optionally substituted alkyl, or optionally substituted aryl. Non-limiting sulfonyl groups can include a trifluoromethylsulfonyl group (—SO$_2$—CF$_3$ or Tf).

Use of the above terms is meant to encompass substituted and unsubstituted moieties. Substitution may be by one or more groups such as alcohols, ethers, esters, amides, sulfones, sulfides, hydroxyl, nitro, cyano, carboxy, amines, heteroatoms, lower alkyl, lower alkoxy, lower alkoxycarbonyl, alkoxyalkoxy, acyloxy, halogens, trifluoromethoxy, trifluoromethyl, alkyl, aralkyl, alkenyl, alkynyl, aryl, cyano, carboxy, carboalkoxy, carboxyalkyl, cycloalkyl, cycloalkylalkyl, heterocyclyl, alkylheterocyclyl, heterocyclylalkyl, oxo, arylsulfonyl and aralkyaminocarbonyl, or any of the substituents of the preceding paragraphs or any of those substituents either directly attached or by suitable linkers. The linkers are typically short chains of 1-3 atoms containing any combination of —C—, —C(O)—, —NH—, —S—, —S(O)—, —O—, —C(O)— or —S(O)O. Rings may be substituted multiple times.

The term "lower" modifying "alkyl", "alkenyl", "alkynyl", "alkoxy" or "alkoxycarbonyl" refers to a $C_1$-$C_6$ unit for a particular functionality. For example, "lower alkyl" means $C_1$-$C_6$ alkyl.

By "substituted" is meant having one or more substituent moieties whose presence does not interfere with the desired function or reactivity. Examples of substituents alkyl, alkenyl, alkynyl, cycloalkyl (non-aromatic ring), Si(alkyl)$_3$, Si(alkoxy)$_3$, alkoxy, amino, alkylamino, alkenylamino, amide, amidine, guanidine, hydroxyl, thioether, alkylcarbonyl, alkylcarbonyloxy, alkoxycarbonyloxy, carbonate, alkoxycarbonyl, aminocarbonyl, alkylthiocarbonyl, phosphate, phosphate ester, phosphonato, cyano, halo, acylamino, imino, sulfhydryl, alkylthio, thiocarboxylate, dithiocarboxylate, sulfate, sulfato, sulfonate, sulfamoyl, sulfonamide, nitro, nitrile, azido, heterocyclyl, ether, ester, silicon-containing moieties, thioester or a combination thereof. The substituents may themselves be substituted. For instance, an amino substituent may itself be mono or independently disubstituted by further substituents defined above, such as alkyl, alkenyl, alkynyl, and cycloalkyl (non-aromatic ring)

By "sulfide" is meant a thioether —S—R', where R' may be, but is not limited to, aliphatic groups.

By "sulfhydryl" is meant a thiol i.e. —SH.

By "thiocyanato" is meant —SCN.

By "thioester" is meant —SC(O)R', where R' may be, but is not limited to, aliphatic groups.

By "unsubstituted" is meant any open valence of an atom being occupied by hydrogen. Also, if an occupant of an open valence position on an atom is not specified, then it is hydrogen.

As used herein, the terms "top," "bottom," "upper," "lower," "above," and "below" are used to provide a relative relationship between structures. The use of these terms does not indicate or require that a particular structure must be located at a particular location in the apparatus.

By "unsaturated" is meant a moiety that contains double or triple carbon-carbon bonds.

By "unsaturated substituent" is meant a double or triple bond containing aliphatic chain, cyclic, aryl or heteroaryl group.

A person of ordinary skill in the art would recognize that the definitions provided above are not intended to include impermissible substitution patterns (e.g. methyl substituted with five substituents and the like). Such impermissible substitution patterns are easily recognized by a person of ordinary skill in the art. Any functional group disclosed herein and/or defined above can be substituted or unsubstituted, unless otherwise indicated herein.

Metal Cathode Catalysts
Metal Catalyst (Cathode Catalyst Layer)

A metal catalyst catalyzes the COx reduction reaction(s). The metal catalyst is typically in the form of nanoparticles, but larger particles, films, and nanostructured surfaces may be used in some embodiments. Nanoparticles are small objects in a nanoscale size, that behave as a whole unit in terms of transport and properties. They are particles of matter having at least one dimension less than 200 nanometers (nm). Nanoparticles may exhibit size-related properties that differ significantly from those observed in fine particles or bulk materials. The specific morphology of the nanoparticles may expose and stabilize active sites that have greater activity.

The metal catalyst is often composed of pure metals (e.g., Cu, Au, Pd or Ag), but specific alloys or other bimetallic systems may have high activity and be used for certain reactions. The choice of catalyst may be guided by the desired reaction. For example, for CO production, Au may be used; for methane and ethylene production, Cu may be used. Other metals including Ag, alloys, and bimetallic systems may be used. $CO_2$ reduction has a high overpotential compared to other well-known electrochemical reactions such as hydrogen evolution and oxygen evolution on known catalysts. Small amounts of contaminants can poison catalysts for $CO_2$ conversion. And as indicated above, metal catalysts such as Cu, Au, and Ag are less developed than catalysts such as platinum used in hydrogen fuel cells.

Different metal catalyst materials may be chosen at least in part based on the desired product and MEA operation. For example, a nanowire has a higher selectivity for ethylene production while triangular Cu nanoplates show higher selectivity for methane. Nanocubes show good selectivity for ethylene in an AEM MEA. Gold nanoparticles with a narrow size distribution (e.g., 2-6 nm) and uniform distribution on carbon surface resulted in higher current efficiency and durability.

Metal catalyst properties that affect the cathode catalyst layer performance include size, size distribution, uniformity of coverage on the support particles, shape, loading (characterized as weight of metal/weight of metal+weight of carbon or as mass of particles per geometric area of catalyst layer), surface area (actual metal catalyst surface area per volume of catalyst layer), purity, and the presence of poisoning surface ligands from synthesis.

Nanoparticles may be synthesized by any appropriate method, such as for example, described in Phan et al., "Role of Capping Agent in Wet Synthesis of Nanoparticles," J. Phys. Chem. A 2018, 121, 17, 3213-3219; Bakshi "How Surfactants Control Crystal Growth of Nanomaterials," Cryst. Growth Des. 2016, 16, 2, 1104-1133; and Morsy "Role of Surfactants in Nanotechnology and Their Applications," Int. J. Curr. Microbiol. App. Sci. 2014, 3, 5, 237-260, which are incorporated by reference herein.

The metal catalyst may be disposed on a carbon support in some embodiments. For CO production, examples include Premetek 20 wt % Au supported on Vulcan XC—72R carbon with 4-6 nm Au particle size and 30% Au/C supported on Vulcan XC—72R with 5-7 nm Au particle size.

Cathode Catalyst Layer Support

The support of the cathode catalyst layer has several functions. It stabilizes metal nanoparticles to prevent them from agglomerating and distributes the catalytic sites throughout the catalyst layer volume to spread out loss of reactants and formation of products. It also forms an electrically conductive pathway to metal nanoparticles. Carbon particles, for example, pack together such that contacting carbon particles provide the electrically conductive pathway. Void space between the particles forms a porous network that gas and liquids can travel through.

In some embodiments, carbon supports developed for fuel cells can be used. Many different types have been developed; these are typically 50 nm-500 nm in size, and can be obtained in different shapes (spheres, nanotubes, sheets (e.g., graphene)), porosities, surface area per volume, electrical conductivity, functional groups (N-doped, O-doped, etc).

The support may be hydrophobic and have affinity to the metal nanoparticle.

Examples of carbon blacks that can be used as carbon-containing support materials include:
Vulcan XC-72R— density of 256 mg/cm$^2$, 30-50 nm;
Ketjen Black-hollow structure, density of 100-120 mg/cm$^2$, 30-50 nm, having 40 weight percent;
Or Printex Carbon, 20-30 nm.

Metal Nanoparticles

The metal nanoparticles include, but are not limited to copper, gold, palladium or silver. They may be optionally immobilized on a support such as a carbon-containing support material. In some cases, the metal particles are gold nanoparticles. In other cases, the particles comprise a different metal such as a different noble metal (e.g., platinum) or a transition metal (e.g., copper). In some cases, metal catalyst nanoparticles comprise an alloy. In some embodiments, the metal nanoparticles are a component of a catalyst layer of an MEA. In some cases, the metal nanoparticles are a component of a mixture that serves as a precursor to a catalyst layer. For example, the metal nanoparticles may be provided as mixture containing substantially only metal nanoparticles. In some cases, the metal nanoparticles are provided with an electronically conductive support material such as carbon particles. In some cases, the metal nanoparticles are provided in a composition comprising an electronically conductive support material and an ionically conductive matrix such as an ionomer.

Gold Nanoparticles

The metal nanoparticles may be gold nanoparticles (AuNPs), which are versatile materials for a broad range of applications, with well-characterized electronic and physical properties.

Methods for the preparation of gold nanoparticles have previously been reported (for example, Zhao et al., *Coord. Chem. Rev.* 2013, vol. 257, 638-665; and De Souza et al., *J. Alloys and Compounds* 2019, vol. 798, 714-740.

Colloidal gold is often prepared using reducing agents such as sodium citrate or sodium borohydride. For example, gold halide monodispersed particles with a diameter of 10±60 nm may be formed by using sodium citrate for the reduction of $HAuCl_4$. Synthetic techniques have been developed to control the size, shape and surface functionality of AuNPs.

Gold hydrosol is a typical lyophobic colloid, the particles of which bear a large negative surface charge (the surface potential is ~50 mV) and, hence, it is stable only in very low-ionic-strength solutions. In lyophobic systems, the dispersion medium and the dispersed phase are substantially different in the chemical composition and the interface structure, as a result of which the surface forces at the interface are uncompensated. Therefore, these systems are thermodynamically unstable and require special stabilization.

Stabilizing gold nanoparticles involves consideration of the strong negative charge of the gold particle surface which leads to strong adsorption interactions with high-molecular-mass compounds.

Sulfur and gold atoms are known to form dative bonds. Alkane thiol linkers such as $HS(CH_2)_nR$, where R is COOH, OH or $SO_3H$; and n=11-22) are being used to achieve stronger attachment of certain biomolecules to gold particles. Interactions of these linkers with gold afford thiolates which form a monolayer on the particle surface.

Synthetic polymers, such as polyethylene glycol (PEG), polyethyleneimine, polyvinylpyrrolidone, poly(vinyl acetate), poly(amidoamine) dendrimer, chitosan, and the like, have found application in the synthesis of monodispersed colloidal gold (CG). Particles formed in the presence of these polymers are characterized by a higher size and shape uniformity. Applications for AuNPs include delivery of biomolecules, sensing and imaging. Yet there is still a need for more stable gold nanoparticles for use in applications such as for cathodic catalysts in electrochemical reactions.

Electrochemical cells may be used to produce carbon-containing products such as carbon monoxide may utilize carbon-supported gold catalysts at the cathode. In some embodiments of electrochemical cells, the cathodic side of the cell is prepared by depositing an anion exchange membrane (AEM) on a Nafion layer as a cation-exchange membrane (CEM). The AEM and CEM form a bipolar membrane (BPM). Then a catalyst layer (CL) is prepared by mixing the catalyst with some of the ionomer constituting the AEM and sprayed on it.

Gold nanoparticles and their uses in electrochemical cells are further described in U.S. application Ser. No. 18/053,945, filed on Nov. 9, 2022, entitled "Catalyst for Electrochemical Carbon Oxide Reduction" by Huo et al., which is hereby incorporated herein by reference in its entirety. A representation of the cathodic side of an exemplary electrochemical cell configured with a gold nanoparticle catalyst on a carbon-containing support is provided in FIG. 1. Such a cell may be utilized to produce carbon monoxide with a very high Faradaic efficiency (greater than 97%).

However, an electrochemical cell utilizing a gold catalyst may become inefficient over time because of a number of different factors including gold migration into the AEM due to coulombic forces, catalyst layer flooding and ionomer losses.

Gold Nanoparticles Hydrophobically Modified with Ligands

FIG. 1 illustrates how catalyst gold may accumulate at the interface between the CL and the AEM. This migration and resultant accumulation may be correlated with reduced performance. The migratory effect may not be pronounced when the electrochemical cell is operated at low current density (i.e. 300 mA $cm^{-2}$). However, at higher current densities (i. e. 600-800 mA $cm^{-2}$), the degree of migration of gold is magnified.

Hydrophobic modifications of a gold nanoparticle surface may be utilized in order to improve the efficiency of gold nanoparticle catalysts; avoiding the factors described above. FIG. 2A is an illustration of a gold nanoparticle catalyst immobilized on a carbon-containing support which has been hydrophobically modified by covalently binding a hydrophobic moiety, directly attaching it to the gold nanoparticle surface. As used herein, "hydrophobic moiety" refers to a molecule, functional group or substituent having a non-polar character such as a fat, an oil or an alkyl group. As used herein, "hydrophobically-modified" refers to a substance which has been transformed by the attachment of a hydrophobic moiety. The weight percentage of gold nanoparticles on the carbon-containing support may be from about 10 weight percent to about 75 weight percent in some embodiments. In other embodiments, the weight percentage of gold nanoparticles on the carbon-containing-support may be from 20 weight percent to 40 weight percent or about 25% to 30%.

The moiety may be a small molecule such as a ligand in certain embodiments. The direct attachment of a ligand to the gold nanoparticle surface may assist with impeding catalyst layer flooding during cell operation. Useful ligands have characteristics which can allow them to remain bound to the gold nanoparticle surface, and which can allow them to preferentially bind to the gold nanoparticle surface rather than to the carbon-containing support material. Examples of ligands include, but are not limited to, primary, secondary or tertiary amines such as oleylamine or 2-(dimethylamino) ethanethiol.

In some embodiments, the ligand-modified Au/C NPs were synthesized at gram scale in the following manner: 4.5 g of Au/C catalyst was introduced in a 250 mL round-bottom flask with different amounts of various ligands. The Au/C catalyst was a 30 weight percent of gold on Vulcan with gold nanoparticles of from about 5 to 10 nm. 170 mL of a solvent was added, the solvent selection depending upon the ligand utilized. For example, hexane was the solvent for OLA and water was the solvent for DMAET. The resulting hydrophobically modified NPs were washed 5 times with the same solvent, then centrifuged at 11000 rpm to remove unbound ligands. Finally, the modified Au/C NPs were dried at 60° C. under vacuum overnight.

In other embodiments, the ligand-modified Au/C NPs may be formed by first synthesizing Au nanoparticles with ligands, and then loading the ligand-capped nanoparticles onto the carbon support.

The Au/C NPs may be modified by ionomers, described in detail below. The ionomers may be directly bound to the nanoparticles or the ionomers may be bound to the nanoparticles through a linking group as shown in FIG. 2B.

Moreover, in some embodiments, the nanoparticles may be a combination or mixture of ligand-modified nanoparticles, ionomer-modified nanoparticles and/or ionomer-modified nanoparticles connected through a linking group.

Gold Nanoparticles Hydrophobically Modified with Ionomers

The moiety may also be an ionomer in certain embodiments. Ionomers are polymers composed of repeating units (structures) which are electrically neutral and ionized or ionizable moieties bonded to the polymer backbone as pendant groups. The ionized or ionizable structures constitute from about 1 to about 100 mole percent of the polymer. In some embodiments, the range is from about 1 to about 15 mole percent of the polymer; while in yet other embodiments the range is from about 5 to about 10 mole percent of the polymer. The polymers may have molecular weights of from about 500 to about 500,000.

In some embodiments, the ionomer comprises structures of formula

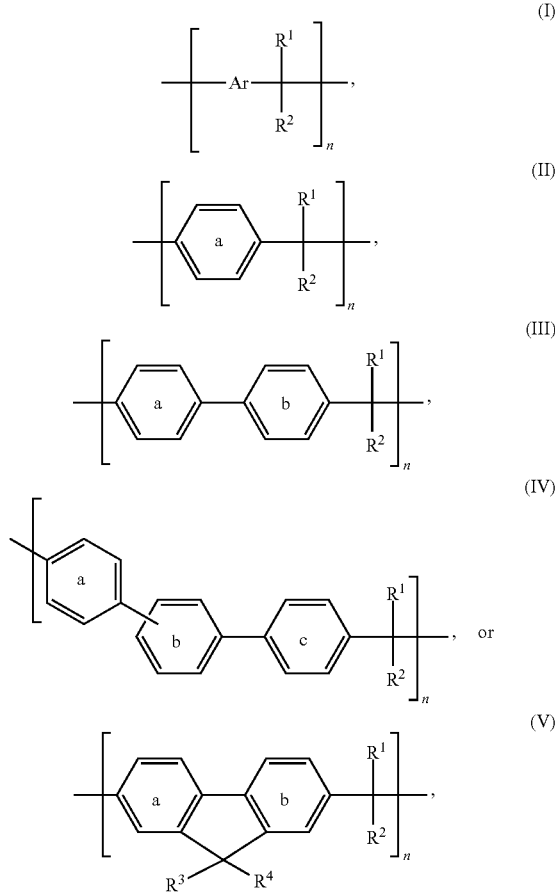

or a salt thereof, wherein $R^1$ and $R^2$ each independently may be an electron-withdrawing moiety, hydrogen (H), optionally substituted aliphatic, optionally substituted alkyl, optionally substituted heteroaliphatic, optionally substituted heteroalkyl, optionally substituted aromatic, optionally substituted aryl, or optionally substituted arylalkylene, or $R^1$ and $R^2$ can be taken together to form an optionally substituted cyclic group and at least one of $R^1$ or $R^2$ comprises an electron-withdrawing moiety; $R^3$ and $R^4$ each independently may be hydrogen (H), optionally substituted aliphatic, optionally substituted alkyl, optionally substituted heteroaliphatic, optionally substituted heteroalkyl, optionally substituted aromatic, optionally substituted aryl, or optionally substituted arylalkylene, or $R^3$ and $R^4$ can be taken together to form an optionally substituted cyclic group; Ar includes or is an optionally substituted aromatic or optionally substituted arylene; n is an integer of 1 or more to 1,000,000; and each of ring a, ring b, and ring c may independently be optionally substituted; and at least one of rings a-c, $R^1$, $R^2$, $R^3$, and $R^4$ is or includes an ionizable moiety or an ionic moiety. With regard to structure (IV), the a ring may be substituted on the b ring at the ortho, meta or para position of the b ring.

The ionomers described herein include one or more ionizable or ionic moieties. Such moieties can include an anionic or cationic charge, such as in an ionic moiety. Alternatively, an ionizable moiety includes a functional group that can be readily converted into an ionic moiety, such as an ionizable moiety of a carboxy group (—$CO_2H$) that can be readily deprotonated to form a carboxylate anion (—$CO_2^-$). As used herein, the terms "ionizable" and "ionic" are used interchangeably.

Ionizable or ionic moieties can be provided in the ionomer in any useful way. In one embodiment, at least one of the structures constituting the ionomer, independently, includes one or more ionizable/ionic moieties. In another embodiment, two or more different structures independently, include one or more ionizable/ionic moieties.

Moieties can be characterized as an acidic moiety (e.g., a moiety can be deprotonated or can carry a negative charge) or a basic moiety (e.g., a moiety that can be protonated or carry a positive charge). In particular embodiments, the moiety can be a multi-ionic moiety, which can include a plurality of acidic moieties, a plurality of basic moieties, or a combination thereof (e.g., such as in a zwitterionic moiety). Further moieties can include a zwitterionic moiety, such as those including an anionic moiety (e.g., hydroxyl or a deprotonated hydroxyl) and a cationic moiety (e.g., ammonium).

The ionic moieties herein can be connected to the parent structure (such as by connection to the polymer backbone) by way of one or more linking moieties. Furthermore, a single ionic moiety can be extended from a single linking moiety, or a plurality of ionic moieties can have one or more linking moieties therebetween.

For instance, the ionic moiety can have any of the following structures: -$L^A$-$X^A$ or -$L^A$-($L^{A'}$-$X^A$)$_{L2}$ or -$L^A$-($X^A$-$L^{A'}$-$X^{A'}$)$_{L2}$ or -$L^A$-$X^A$-$L^{A'}$ $X^{A'}$ $L^{A''}$ $X^{A''}$ in which each $L^A$, $L^{A'}$, and $L^{A''}$ is a linking moiety; each $X^A$, $X^{A'}$, and $X^{A''}$ includes, independently, an acidic moiety, a basic moiety, or a multi-ionic moiety; and L2 is an integer of 1, 2, 3, or more (e.g., from 1 to 20).

Non-limiting linking moieties (e.g., for $L^A$, $L^{A'}$, and $L^{A''}$) include a covalent bond, a spirocyclic bond, —O—, —$NR^{N1}$—, —$SO_2$—$NR^{N1}$-Ak-, —(O-Ak)$_{L1}$-$SO_2$—$NR^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, in which Ak is an optionally substituted alkylene or optionally substituted haloalkylene, $R^{N1}$ is H or optionally substituted alkyl, Ar is an optionally substituted arylene, and L1 is an integer from 1 to 3. In particular embodiments, $L^A$ is —(CH$_2$)$_{L1}$—, —O(CH$_2$)$_{L1}$—, —(CF$_2$)$_{L1}$—, —O(CF$_2$)$_{L1}$—, or —S(CF$_2$)$_{L1}$—, in which L1 is an integer from 1 to 3.

In some instances, a linker is attached to two or more ionic moieties. In some embodiments, the ionic moiety can be -$L^A$-($L^{A'}$-$X^A$)$_{L2}$, in which $L^A$ and $L^{A'}$ are linking moieties and $X^A$ is an acidic moiety, a basic moiety, or a multi-ionic moiety. In one instance, $L^A$ provides one, two, or three linkages. Non-limiting $L^A$ can be —$CX_2$($CX_2$—), —$CX$($CX_2$—)$_2$, or —C($CX_2$—)$_3$, in which X is H, alkyl, or halo. $L^{A'}$ can then provide an attachment point to the ionic moiety.

For instance, $L^{A1'}$ can be $—(CH_2)_{L1}—$, $—O(CH_2)_{L1}—$, $—(CF_2)_{L1}—$, $—O(CF_2)_{L1}—$, or $—S(CF_2)_{L1}—$, in which L1 is an integer from 1 to 3; and $X^A$ is any ionizable or ionic moiety described herein.

Non-limiting ionic moieties include carboxy ($—CO_2H$), carboxylate anion ($—CO_2^-$), a guanidinium cation (e.g., $—NR^{N1}—C(=NR^{N2}R^{N3})(NR^{N4}R^{N5})$ or $>N=C(NR^{N2}R^{N3})(NR^{N4}R^{N5}))$ or a salt form thereof. Non-limiting examples of each of $R^{N1}$, $R^{N2}$, $R^{N3}$, $R^{N4}$ and $R^{N5}$ is, independently, H, optionally substituted alkyl, optionally substituted aryl, or optionally substituted amino; or $R^{N1}$ and $R^{N2}$, $R^{N2}$ and $R^{N3}R^{N3}$ and $R^{N4}R^{N1}$ and $R^{N2}$, or $R^{N1}$ and $R^{N4}$ taken together with the nitrogen atom to which each are attached, form an optionally substituted heterocyclyl, heterocycle, or heterocyclic cation, as defined herein.

Some ionic moieties can include one or more sulfur atoms. Non-limiting sulfur-containing moieties include sulfo ($—SO_2OH$), sulfonate anion ($—SO_2O^-$), sulfonium cation (e.g., $—SR^{S1}R^{S2}$), sulfate (e.g., $—O—S(=O)_2(OR^{S1}))$, sulfate anion ($—O—S(=O)_2O^-$), or a salt form thereof. Non-limiting examples of each of $R^{Si}$ and $R^{S2}$ is, independently, H, optionally substituted alkyl, optionally substituted aryl, or optionally substituted amino; or $R^{S1}$ and $R^{S2}$, taken together with the sulfur atom to which each are attached, form an optionally substituted heterocyclyl, heterocycle, or heterocyclic cation, as defined herein; or $R^{Si}$ and $R^{S2}$, taken together, form an optionally substituted alkylene or heteroalkylene (e.g., as described herein).

Other ionic moieties can include one or more phosphorous atoms. Non-limiting phosphorous-containing moieties include phosphono (e.g., $—P(=O)(OH)_2$), phosphonate anion (e.g., $—P(=O)(O^-)z$ or $—P(=O)(OH)(O^-)$), phosphate (e.g., $—O—P(=O)(OR^{P1})(OR^{P2})$ or $—O—[P(=O)(OR^{P1})—O]_{P3}—R^{P2}$), phosphate anion (e.g., $—O—P(=O)(OR^{P1})(O^-)$ or phosphonium cation (e.g., $—P^+R^{P1}R^{P2}R^{P3}$), phosphazenium cation (e.g., $—P^+(=NR^{N1}R^{N2})R^{P1}R^{P2}$, in which each of $R^{N1}$ and $R^{N2}$ is, independently, optionally substituted alkyl or optionally substituted aryl), or a salt form thereof. Non-limiting examples of each of $R^{P1}$, $R^{P2}$, and $R^{P3}$ is, independently, H, optionally substituted alkyl, optionally substituted aryl, or optionally substituted amino; or $R^{P1}$ and $R^{P2}$, taken together with the phosphorous atom to which each are attached, form an optionally substituted heterocyclyl, heterocycle, or heterocyclic cation, as defined herein; or $R^{P1}$ and $R^{P2}$ and $R^{P3}$, taken together with the phosphorous atom to which each are attached, form an optionally substituted heterocyclyl, heterocycle, or heterocyclic cation, as defined herein; or a single, double, or non-localized pi bond, provided that a combination of bonds result in a tetravalent phosphorous; or wherein two of $R^{P1}$, $R^{P2}$, and $R^3$, taken together, form an optionally substituted alkylene or heteroalkylene (e.g., as described herein).

Yet other ionic moieties can include one or more nitrogen atoms. Non-limiting nitrogen-containing moieties include amino (e.g., $—NR^{N1}R^{N2}$), ammonium cation (e.g., $—N^+R^{N1}R^{N2}R^{N3}$ or $—N^+R^{N1}R^{N2}—$), heterocyclic cation (e.g., piperidinium, 1,1-dialkyl-piperidinium, pyrrolidinium, 1,1-dialkyl-pyrrolidinium, pyridinium, 1-alkylpyridinum, (1,4-diazabicyclo[2.2.2]octan-1-yl) (DABCO), 4-alkyl-(1,4-diazabicyclo[2.2.2]octan-1-yl), etc.), or a salt form thereof. Non-limiting examples of each of $R^{N1}$, $R^{N2}$, and $R^{N3}$ is, independently, H, optionally substituted alkyl, optionally substituted cycloalkyl, or optionally substituted aryl; or $R^{N1}$ and $R^{N2}$, taken together with the nitrogen atom to which each are attached, form an optionally substituted heterocyclyl, heterocycle, or heterocyclic cation, as defined herein; or $R^{N1}$ and $R^{N2}$ and $R^{N3}$, taken together with the nitrogen atom to which each are attached, form an optionally substituted heterocyclyl, heterocycle, or heterocyclic cation, as defined herein; or wherein two of $R^{N1}$, $R^{N2}$, and $R^{N3}$, taken together, form an optionally substituted alkylene or heteroalkylene (e.g., as described herein); or a single, double, or non-localized pi bond, provided that a combination of bonds result in a tetravalent nitrogen.

Yet other heterocyclic cations include piperidinium cations, such as dimethyl piperidinium, methyl piperidinium (e.g., 1-methyl-piperidinium-1-yl), ethylmethyl piperidinium, ethyl piperidinium (e.g., 1-ethyl-piperidinium-1-yl), propylmethyl piperidinium, propyl piperidinium (e.g., 1-propyl-piperidinium-1-yl), butylmethyl piperidinium, butyl piperidinium (e.g., 1-butyl-piperidinium-1-yl), diethyl piperidinium, propylethyl piperidinium, butylethyl piperidinium, butylpropyl piperidinium, or spiro-1,1'-bipiperidinium; pyrrolidinium cations, such as dimethyl pyrrolidinium, ethylmethyl pyrrolidinium, propylmethyl pyrrolidinium, butylmethyl pyrrolidinium, diethyl pyrrolidinium, propylethyl pyrrolidinium, butylethyl pyrrolidinium, butylpropyl pyrrolidinium, spiro-1,1'-bipyrrolidinium, spiro-1-pyrrolidinium-1'-piperidinium, or spiro-1-pyrrolidinium-1'-morpholinium; pyrazolium cations, such as dimethyl pyrazolium, ethylmethyl pyrazolium, or butylmethyl pyrazolium; imidazolium cations, such as 3-alkyl imidazolium, 1,2-dialkylimidazolium, such as 1,2-dimethyl-1H-imidazol-3-ium; those having one nitrogen and five or six carbon ring members, such as pyridinium, 2-methylpyridinium, 3-methylpyridinium, 4-methylpyridinium, 2,6-dimethylpyridinium, quinolinium, isoquinolinium, acridinium, or phenanthridinium; those having two nitrogen and four carbon ring members, such as pyridazinium, pyrimidinium, pyrazinium or phenazinium; or those having one nitrogen and one oxygen ring member, such as morpholinium, 2-methyl morpholinium, or 3-methyl morpholinium.

Any of the heterocyclic cations can be attached to the polymer either directly or indirectly (e.g., by way of a linker or a linking moiety). Furthermore, any atom within the heterocyclic cation (e.g., within the ring of the heterocyclic cation) can be attached to the polymer. For instance, taking piperidinium as the non-limiting heterocyclic cation, such a cation can be attached to the polymer by way of the cationic center or by way of an atom within the ring, and such attachments can be direct by way of a covalent bond or indirect by way of $L^A$ (a linking moiety, such as any described herein):

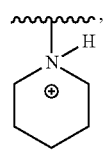

(piperidin-1-ium-1-yl)

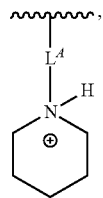

(piperidin-1-ium-1-yl attached by way of $L^A$)

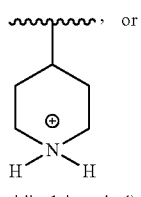

(piperidin-1-ium-4-yl)

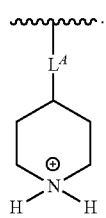

(piperidin-1-ium-4-yl attached by way of $L^A$)

In addition to attachment at the 1- or 4-position of piperidin-1-ium, other attachment sites can be implemented at any point on the ring.

In some embodiments, the heterocyclic cations is or comprises a piperidinium cation or an azepanium cation. In one embodiment, the heterocyclic cation includes the following structure:

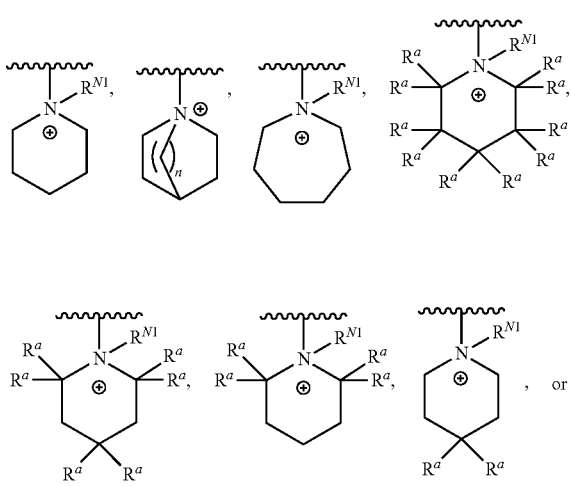

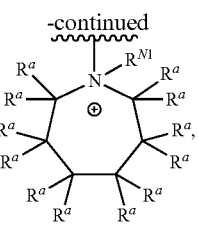

wherein:
$R^{N1}$ is H, optionally substituted aliphatic, optionally substituted alkyl, optionally substituted heteroaliphatic, optionally substituted heteroalkyl, optionally substituted aromatic, or optionally substituted aryl;

n is 1, 2, 3, 4, or 5; and each Ra is, independently, H, optionally substituted aliphatic, optionally substituted alkyl, optionally substituted heteroaliphatic, optionally substituted heteroalkyl, optionally substituted aromatic, optionally substituted aryl, an ionizable moiety, or an ionic moiety;

wherein $R^{N1}$ and at least one Ra can be taken together to form an optionally substituted cyclic group or an optionally substituted heterocyclic group, and/or wherein at least two $R^a$ groups can be taken together to form an optionally substituted cyclic group or an optionally substituted heterocyclic group.

In one instance, $R^{N1}$ and $R^a$ can be taken together to form an optionally substituted alkylene group or an optionally substituted heteroalkylene group. In particular embodiments, the alkylene or heteroalkylene group is substituted, independently, with one or more ionizable moieties or ionic moieties (e.g., any described herein).

In another instance, at least one Ra is optionally substituted aliphatic or optionally substituted alkyl. Non-limiting examples of Ra include methyl, ethyl, n-propyl, isopropyl, n-butyl, sec-butyl, isobutyl, tert-butyl, n-pentyl, sec-pentyl, isopentyl, tert-pentyl, neopentyl, 3-pentyl, sec-isopentyl, and the like. In other embodiments, the heterocyclic cation has a ring having one, two, three, four, five, or six $R^a$ groups that is not H. In yet other embodiments, the heterocyclic cation has a ring having one, two, three, four, five, or six Ra groups that is, independently, optionally substituted aliphatic or optionally substituted alkyl. Without wishing to be limited by mechanism, the presence of bulky substituents may provide more stable cations. In other embodiments, any ionizable moiety or ionic moiety herein can be substituted with one or more Ra groups.

Yet other non-limiting piperidinium cations or azepanium cations include any of the following

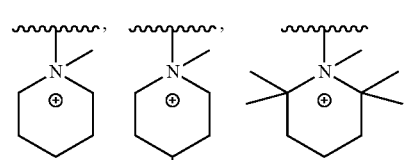

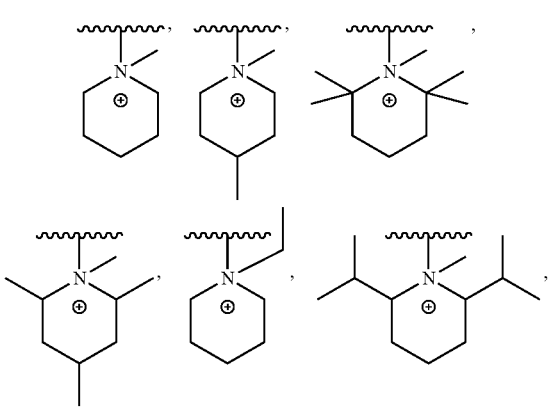

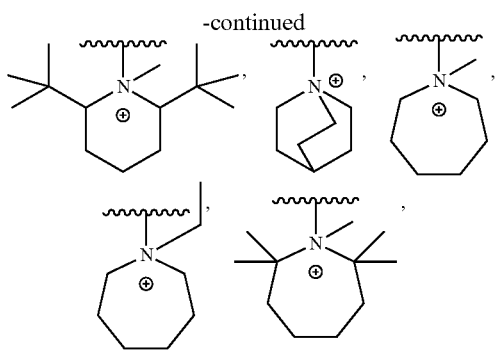

and the like.

Other moieties can include $-L^A-L^{A'}-X^A$, in which $L^A$ is or includes optionally substituted aromatic, optionally substituted arylene, optionally substituted heterocycle, or optionally substituted heterocyclyl (e.g., optionally substituted phenylene or optionally substituted aryleneoxy); $L^{A'}$ is or includes optionally substituted aliphatic, optionally substituted alkylene, optionally substituted heteroaliphatic, or optionally substituted heteroalkylene (e.g., optionally substituted $C_{1-6}$ alkylene or optionally substituted $C_{1-6}$ heteroalkylene); and $X^A$ is or includes an ionic moiety including one or more nitrogen atoms. Non-limiting ionic moieties include pyridinium (e.g., pyridinum-1-yl, Pyrd; alkylpyridinium, such as 2-methylpyridinum-1-yl, 2MPyrd; or aromatic pyridinium, such as 1-benzylpyridinium-4-yl), imidazolium (e.g., 1,2-dialkylimidazolium-3-yl, including 1,2-dimethylimidazolium-3-yl (1,2-DMim)), 4-aza-1-azoniabicyclo[2.2.2]octan-1-yl (or 1,4-diazabicyclo[2.2.2]octane (DABCO) cation), 4-alkyl-1,4-diazoniabicyclo[2.2.2]octan-1-yl (e.g., 4-methyl-1,4-diazoniabicyclo[2.2.2]octan-1-yl (MAABCO) cation), 4-benzyl-1,4-diazoniabicyclo[2.2.2]octan-1-yl (or 1-benzyl-1,4-diazoniabicyclo[2.2.2]octane (BABCO) cation), aliphatic ammonium (e.g., hexyldimethylammonium-1-yl (DMHA), dicyclohexylmethylammonium-1-yl (MCH), methyldi-n-propylammonium-1-yl (MnPr), trimethylammonium-1-yl (TMA), or triethylammonium-1-yl (TEA)), aromatic ammonium (e.g., dialkylbenzylammonium, such as benzyldimethylammonium-1-yl, benzyldiethylammonium-1-yl, benzylhexylmethylammonium-1-yl, benzyldi-n-propylammonium-1-yl, benzylmethyl-n-propylammonium-1-yl, benzyldicyclohexylammonium-1-yl, benzylcyclohexylmethylammonium-1-yl, (3-nitrobenzyl)dimethylammonium-1-yl, or (3-methoxybenzyl)dimethylammonium-1-yl; or dialkyl(phenylalkyl)ammonium, such as dimethyl(phenylhexyl)ammonium-1-yl), and piperidinium (e.g., aliphatic piperidinium, such as 1-methyl-piperidinium-1-yl (Mepip), 1,2-dialkyl-piperidinium, or 1,2-dimethyl-piperidinium-4-yl (DMP); or aromatic piperidinium, such as or 1-benzyl-1-methyl-piperidinium-4-yl (BMP), as well as any piperidinium cation described herein).

Yet other moieties can include $-L^A-X^A$, in which $L^A$ is a covalent bond (including a spirocyclic bond), optionally substituted aliphatic, optionally substituted alkylene, optionally substituted heteroaliphatic, optionally substituted heteroalkylene, optionally substituted aromatic, optionally substituted arylene, optionally substituted heterocycle, or optionally substituted heterocyclyl (e.g., optionally substituted $C_{1-6}$ alkylene, optionally substituted $C_{1-6}$ heteroalkylene, optionally substituted phenylene, or optionally substituted aryleneoxy); and $X^A$ is or includes an ionic moiety including one or more nitrogen atoms. Non-limiting ionic moieties include pyridinium (e.g., pyridinum-1-yl, Pyrd; alkylpyridinium, such as 2-methylpyridinum-1-yl, 2MPyrd; or aromatic pyridinium, such as 1-benzylpyridinium-4-yl), imidazolium (e.g., 1,2-dialkylimidazolium-3-yl, including 1,2-dimethylimidazolium-3-yl (1,2-DMim)), 4-aza-1-azoniabicyclo[2.2.2]octan-1-yl (or 1,4-diazabicyclo[2.2.2]octane (DABCO) cation), 4-alkyl-1,4-diazoniabicyclo[2.2.2]octan-1-yl (e.g., 4-methyl-1,4-diazoniabicyclo[2.2.2]octan-1-yl (MAABCO) cation), 4-benzyl-1,4-diazoniabicyclo[2.2.2]octan-1-yl (or 1-benzyl-1,4-diazoniabicyclo[2.2.2]octane (BABCO) cation), aliphatic ammonium (e.g., hexyldimethylammonium-1-yl (DMHA), dicyclohexylmethylammonium-1-yl (MCH), methyldi-n-propylammonium-1-yl (MnPr), trimethylammonium-1-yl (TMA), or triethylammonium-1-yl (TEA)), aromatic ammonium (e.g., dialkylbenzylammonium, such as benzyldimethylammonium-1-yl, benzyldiethylammonium-1-yl, benzylhexylmethylammonium-1-yl, benzyldi-n-propylammonium-1-yl, benzylmethyl-n-propylammonium-1-yl, benzyldicyclohexylammonium-1-yl, benzylcyclohexylmethylammonium-1-yl, (3-nitrobenzyl)dimethylammonium-1-yl, or (3-methoxybenzyl)dimethylammonium-1-yl; or dialkyl(phenylalkyl)ammonium, such as dimethyl(phenylhexyl)ammonium-1-yl), and piperidinium (e.g., aliphatic piperidinium, such as 1-methyl-piperidinium-1-yl, 1,2-dialkyl-piperidinium, or 1,2-dimethyl-piperidinium-4-yl (DMP); or aromatic piperidinium, such as or 1-benzyl-1-methyl-piperidinium-4-yl (BMP), as well as any piperidinium cation described herein).

Such moieties can be associated with one or more counterions. For instance, a cationic moiety can be associated with one or more anionic counterions, and an anionic moiety can be associated with one or more cationic counterions.

Particular moieties herein (e.g., polymeric units, linking moieties, and others) can include an optionally substituted arylene. Such arylene groups include any multivalent (e.g., bivalent, trivalent, tetravalent, etc.) groups having one or more aromatic groups, which can include heteroaromatic groups. Non-limiting aromatic groups can include any of the following:

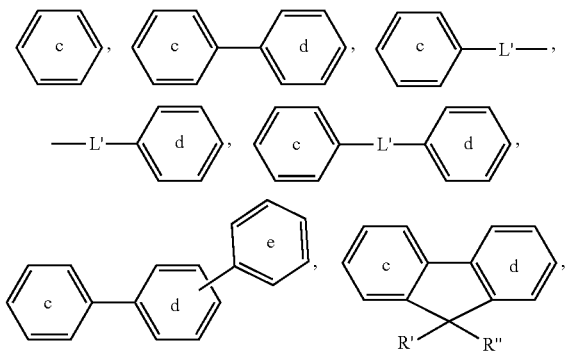

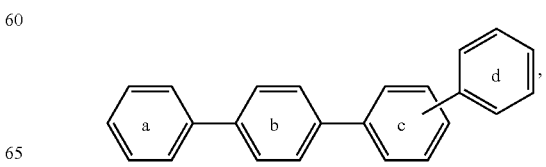

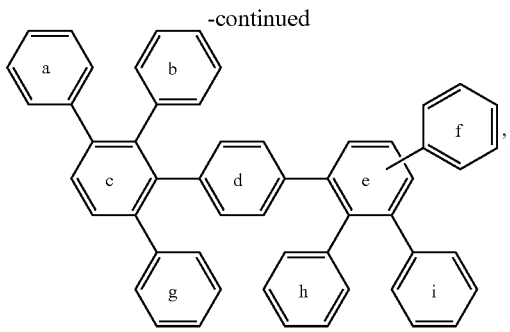

in which each of rings a-i can be optionally substituted in each of rings a-i can be optionally substituted (e.g., with any optional substituents described herein for alkyl or aryl; or with any ionic moiety described herein); L' is a linking moiety (e.g., any described herein); and each of R' and $R^{11}$ is, independently, H, optionally substituted alkyl, optionally substituted aryl, or an ionic moiety, as described herein. Non-limiting substituents for rings a-i include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl. In some embodiments, L' is a covalent bond, —O—, —$NR^{N1}$—, —C(O)—, optionally substituted alkylene, optionally substituted heteroalkylene, or optionally substituted arylene.

Yet other non-limiting arylene can include phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), 9,10-anthracene, naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like.

Non-limiting examples of linking moieties for arylene include any herein. In some embodiments, L' is substituted one or more ionizable or ionic moieties described herein. In particular embodiments, L' is optionally substituted alkylene. Non-limiting substitutions for L' can include -$L^A$-$X^A$, in which $L^A$ is a linking moiety (e.g., any described herein, such as, -Ak-, —O-Ak-, -Ak-O—, —Ar—, —O—Ar—, or —Ar—O—, in which Ak is optionally substituted alkylene and Ar is optionally substituted arylene), and $X^A$ is an acidic moiety, a basic moiety, or a multi-ionic moiety.

Particular chemical functionalities herein can include a linking moiety, either between the parent structure and another moiety (e.g., an ionic moiety) or between two (or more) other moieties. Linking moieties (e.g., L, $L^1$, $L^2$, $L^3$, $L^4$, $L^A$, $L^{A'}$, $L^{A''}$, $L^{B'}$, $L^{B''}$, $L^{8A}$, and others) can be any useful multivalent group, such as multivalent forms of optionally substituted aliphatic, optionally substituted heteroaliphatic, optionally substituted aromatic, or optionally substituted heteroaromatic.

Non-limiting linking moieties (e.g., L) include a covalent bond, a spirocyclic bond, —O—, —$NR^{N1}$—, —C(O)—, —C(O)O—, —OC(O)—, —$SO_2$—, optionally substituted alkylene, optionally substituted alkyleneoxy, optionally substituted haloalkylene, optionally substituted heteroalkylene, optionally substituted arylene, optionally substituted aryleneoxy, optionally substituted heterocyclyldiyl, —$SO_2$—$NR^{N1}$-Ak-, —(O-Ak)L1—$SO_2$—$NR^{N1}$-Ak-, -Ak-, -Ak-(O-Ak)$_L$1-, —(O-Ak)$_L$1-, -(Ak-O)$_L$1—, —C(O)O-Ak-, —Ar—, or —Ar—O—, as well as combinations thereof. In particular embodiments, Ak is an optionally substituted aliphatic, optionally substituted alkylene, or optionally substituted haloalkylene; $R^{N1}$ is H or optionally substituted alkyl or optionally substituted aryl; Ar is an optionally substituted aromatic or optionally substituted arylene; and L1 is an integer from 1 to 3.

In some embodiments, the linking moiety is —$(CH_2)_L1$—, —$O(CH_2)_L1$—, —$(CF_2)_L1$—, —$O(CF_2)_L1$—, or —$S(CF_2)_L1$— in which L1 is an integer from 1 to 3. In other embodiments, the linking moiety is -Ak-O-Ar-Ak-O-Ak- or -Ak-O-Ar-, in which Ak is optionally substituted alkylene or optionally substituted haloalkylene, and Ar is an optionally substituted arylene. Non-limiting substituted for Ar includes —$SO_2$-Ph, in which Ph can be unsubstituted or substituted with one or more halo.

In certain embodiments, the ionomer has an aromatic backbone, and may be a structure of formula

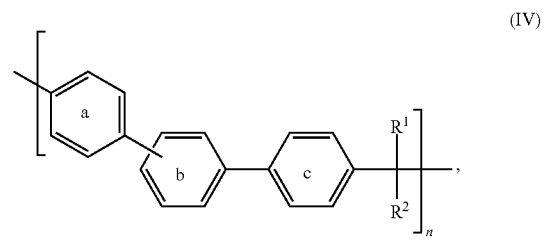

and $R^1$ may be a haloalkyl group, n is an integer of 4 or more and $R^2$ may be an optionally substituted aliphatic group. In some embodiments, n is an integer of 4 to 10,000.

In some embodiments, the structure of formula (IV) has a trifluoromethyl for $R^1$ and a structure of formula —(C$(R^{11})_2)_rR^{12}$ (XXXIII) for $R^2$, where each $R^{11}$ independently may be H, aliphatic, aralkyl, aryl, heteroaryl, alkoxy, aryloxy, thioalkyl, thioaralkyl, thioaryl, aminoalkyl, amino, aminoaryl, halo or hydroxyl; $R^{12}$ may be amino, aryl, heterocyclyl, hydroxyl, dihydroxyl, sulfhydryl, sulfide, disulfide, sulfo, or thioester; and r is an integer of 1 to 10.

In other embodiments, the structure of formula (IV) has a trifluoromethyl for $R^1$ and $R^2$ comprises a structure of formula

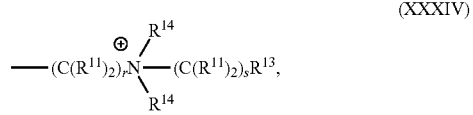

where each $R^{11}$ independently may be H, alkyl, aralkyl, aryl, heteroaryl, alkoxy, aryloxy, thioalkyl, thioaralkkyl, thioaryl, aminoalkyl, amino, aminoaryl, halo or hydroxyl; $R^{13}$ may be amino, aryl, heterocyclyl, hydroxyl, dihydroxyl, sulfhydryl, sulfide, disulfide, sulfo, or thioester; each $R^{14}$ independently may be H or aliphatic; r is an integer of 1 to 10; and s is an integer of 1 to 6.

Figure 3A:
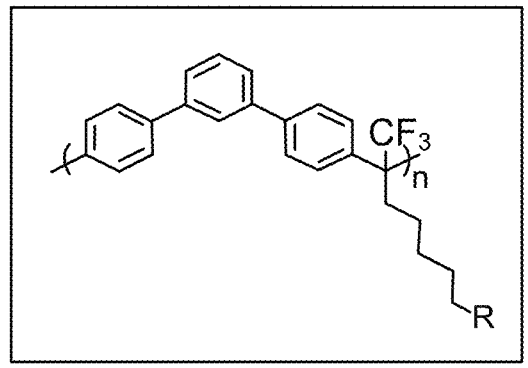
FIG. 3A is an illustration of an ionomer structure in accordance with certain disclosed embodiments.
Figure 3B:
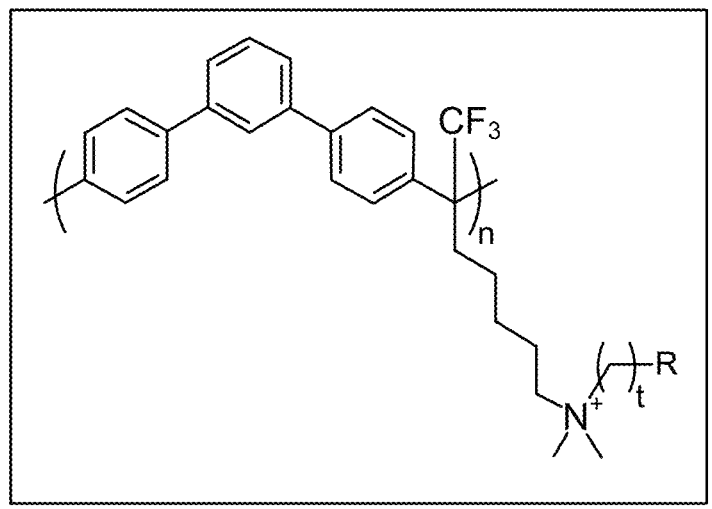
FIG. 3B is an illustration of another ionomer structure in accordance with certain disclosed embodiments.

FIG. 3A provides a formula for an ionomer in accordance with some embodiments. In the ionomer, an aromatic polymer backbone (of structure (IV)) has a pentyl substituent further substituted by an R group and an electron-withdrawing group substituent. The ionized or ionizable group is provided by the R group for the FIG. 3A ionomer. FIG. 3B provides a formula for another ionomer in accordance with some embodiments. The number of repeat units in the polymer backbone is represented by n, where n in the FIG.

3A or 3B structures may from about 5 to about 10,000. This ionomer also has an aromatic polymer backbone (of structure (IV)) including an electron-withdrawing group substituent and a pentyl ammonium pendant group. For the FIG. 3B ionomer, the alkylammonium group is the ionized moiety, further substituted by an R group. In some embodiments, one or more —$CH_2$— linking groups may be present, where the number of linking —$CH_2$— groups as represented by tin the FIG. 3B structure is from about 1 to 30.

Figure 4:
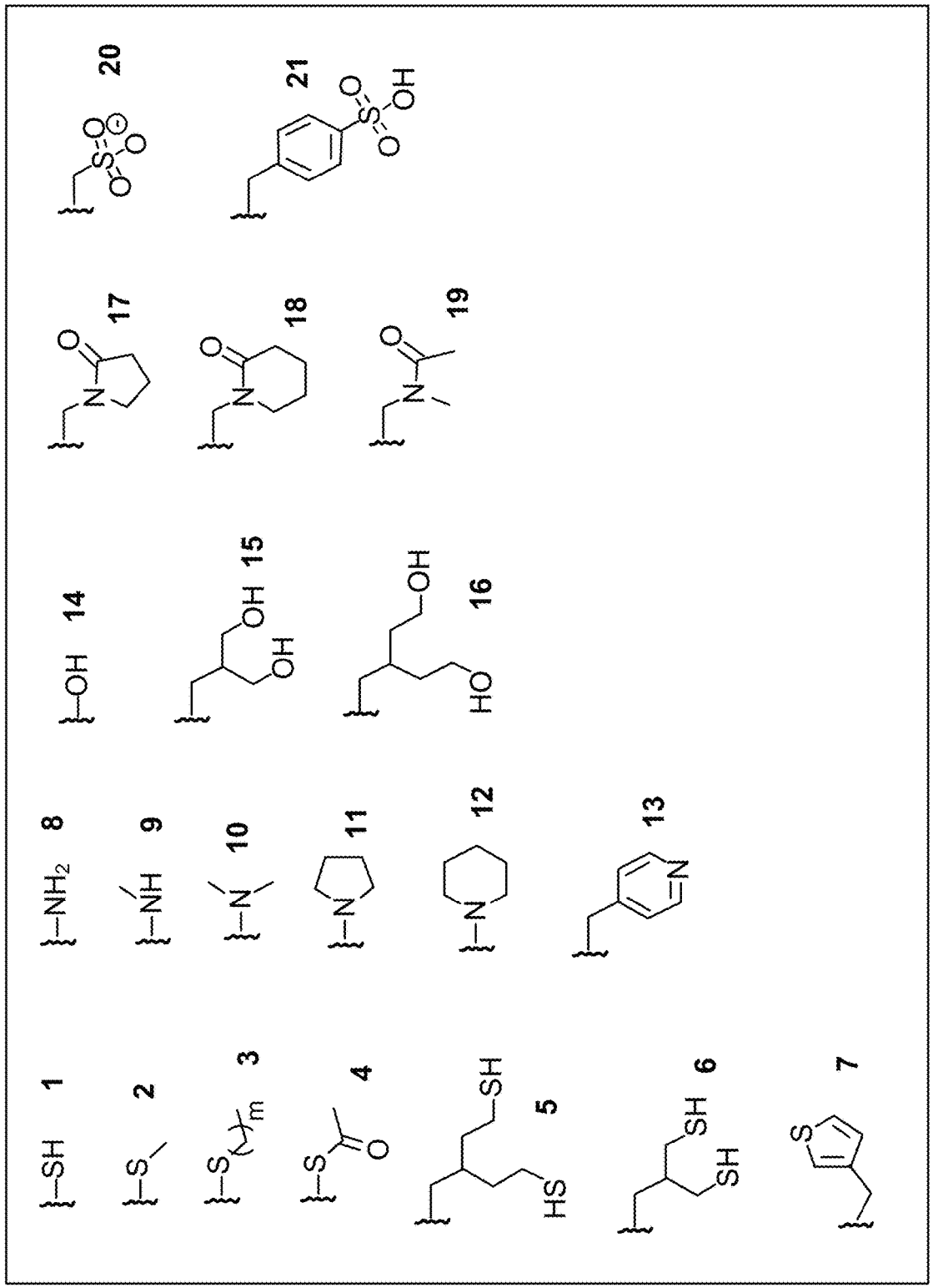
FIG. 4 is an illustration of substituents for ionomer structures of FIGS. 3A and 3B in accordance with certain disclosed embodiments.

FIG. 4 provides examples of R substituents for the ionomers depicted in FIGS. 3A and 3B. The ionomers may be bound to the gold nanoparticles on carbon-containing support material by simply mixing them together in certain embodiments. R substituents include, but are not limited to, sulfhydryl (1); sulfides (2) and (3) where m is an integer of 1 to 30 for (3); thioesters (4); disulfides (5) and (6); heterocycles (7), (11)-(13), (17), and (18); amino groups (8)-(10) and (19); hydroxyl (14); dihydroxyl (15) and (16); sulfo (20) and aryl (21).

Ionomers and routes for their synthesis are described in U.S. patent application Ser. No. 17/451,628; filed Oct. 20, 2021, published as U.S. Pat. Pub. No. 2022-0119641, by Wang et al., entitled "Ionic Polymers and Copolymers"; incorporated herein by reference in its entirety.

Figure 5A:
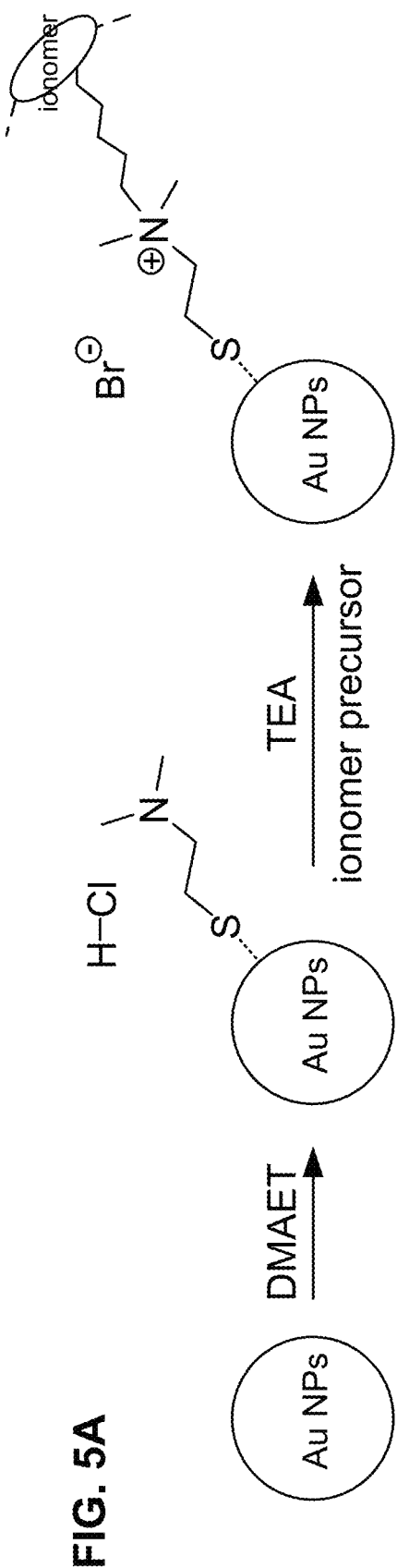
FIG. 5A illustrates a synthetic scheme for hydrophobic modification of the surface of a gold nanoparticle with an ionomer bound to the nanoparticle through a 2-(dimethylamino)ethane thiol hydrochloride (DMAET) linker in accordance with certain disclosed embodiments.
Figure 5B:
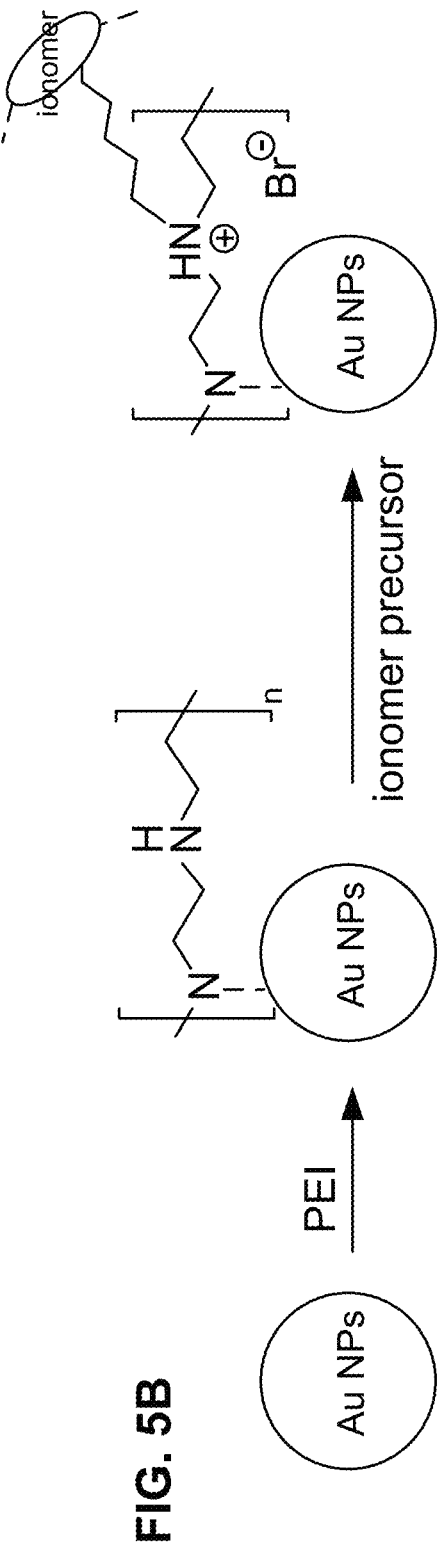
FIG. 5B illustrates a synthetic scheme for hydrophobic modification of the surface of a gold nanoparticle with an ionomer bound to the nanoparticle through a polyethylenimine (PEI) linker in accordance with certain disclosed embodiments.

Gold Nanoparticles Hydrophobically Modified with Ionomers Bonded Through Linkers The ionomers as described above may be attached to the gold nanoparticles by covalently bonding them through a linker in some embodiments. Without wishing to be bound by theory, this technique may help limit ionomer losses during electrochemical reactions. The ionomer may be anchored on the gold surface as illustrated in FIGS. 5A and 5B using a linker which has a functional group at each facilitating binding to the gold nanoparticle surface at one end and binding to an ionomer at the other end. In some embodiments, the functional group at one end of the linker for binding to the gold nanoparticle surface is sulfur-containing, such as a thiol. Suitable linkers are bifunctional, where the two functional groups may be the same or different. In some embodiments when the functional groups are the same, the linker may be a diol such as the substituents 15 and 16 shown in FIG. 4, or a dithiol such as the substituents 5 and 6 shown in FIG. 4.

In the schematic illustration FIG. 5A, the linker is DMAET, which is initially clicked on the Au/C to form a modified gold nanoparticle catalyst on a carbon-containing support material. Then the modified catalyst was reacted with ionomer in the presence of triethylamine in order to complete the linkage. The mass ratio of linker to gold in some embodiments is from about 1:10 to about 10:1.

In one embodiment of a clicking reaction, 100 mg of ionomer was diluted in dichloromethane (DCM). 100 mg of modified-Au/C (the 2:1 DMAET:Au/C or the 0.1:1 PEI: Au/C catalysts) was added to the mixture and stirred at RT for 3 days. The Au/C catalyst was a 30 weight percent of gold on Vulcan with gold nanoparticles of from about 5 to 10 nm. When DMAET-modified Au/C nanoparticles were used, 10 equivalents of the thiol in triethylamine (TEA) were introduced. Then, the nanoparticles were washed 5 times with dichloromethane, and centrifuged at 11000 rpm to remove unbound free ionomers. Finally, the modified Au/C NPs were dried at 60° C. under vacuum overnight. The gram-scale synthesis followed the same procedure using 4.3 g of modified Au/Cl, 4.3 g of ionomer, 10 eq of the thiol in TEA and 250 mL of DCM.

In the schematic illustration FIG. 5B, the linker is PEI, and the attachment can be performed in a similar manner as described above.

In any of the above-described hydrophobic modifications of gold nanoparticles (directly binding either a ligand or an ionomer; or indirectly anchoring an ionomer to the nanoparticle through a linker), an advantage of this method for making a modified catalyst is that the hydrophobic moiety can be introduced to gold nanoparticles in situ, when they are already affixed to a carbon-containing support. Further advantages of the method include higher activity and longer lifetime for catalysts so modified.

Apparatus

The hydrophobically-modified gold nanoparticles can be employed within a device or apparatus, such as an electrochemical cell. In one embodiment, the electrochemical cell includes an anode, a cathode, and a polymer electrolyte membrane (PEM) disposed between the anode and the cathode.

The hydrophobic ally-modified gold nanoparticles described herein can be employed as a component for a membrane electrode assembly (MEA). A non-limiting MEA can include a cathode layer having a reduction catalyst and a first ion-conducting polymer; an anode layer having an oxidation catalyst and a second ion-conducting polymer; a membrane layer having a third ion-conducting polymer between the anode layer and the cathode layer; and a cathode buffer layer having a fourth ion-conducting polymer between the cathode layer and the membrane layer. The membrane layer (e.g., PEM) can provide ionic communication between the cathode layer and the anode layer or can conductively connect the cathode layer and the anode layer. The cathode buffer layer can conductively connect the cathode layer and the membrane layer.

In some embodiments, the cathode buffer layer has a first porosity between about 0.01 and 95 percent by volume (e.g., wherein the first porosity is formed by the inert filler particles, such as diamond particles, boron-doped diamond particles, polyvinylidene difluoride (PVDF) particles, and polytetrafluoroethylene (PTFE) particles).

The hydrophobically-modified gold nanoparticles described herein can be employed in a reactor. Non-limiting reactors include an electrolyzer, a carbon dioxide reduction electrolyzer, an electrochemical reactor, a water electrolyzer, a gas-phase polymer-electrolyte membrane electrolyzer, but can additionally or alternatively include any other suitable reactors. The reactor may include one or more: electrodes (e.g., anode, cathode), catalysts (e.g., within and/or adjacent the cathode and/or anode), gas diffusion layers (e.g., adjacent the cathode and/or anode), and/or flow fields (e.g., defined within and/or adjacent the electrodes and/or gas diffusion layers, such as one or more channels defined opposing the cathode across the gas diffusion layer). In some embodiments, the reactor includes a membrane stack or membrane electrode assembly (MEA) having one or more polymer electrolyte membranes (PEMs), providing ionic communication between the anode and cathode of the reactor. In certain embodiments, the reactor includes a membrane stack including: a cathode layer including a reduction catalyst and an ion-conducting polymer; a PEM membrane (e.g., bipolar membrane, monopolar membrane, etc.; membrane including one or more anion conductors such as anion exchange membranes (AEMs), proton and/or cation conductors such as proton exchange membranes, and/or any other suitable ion-conducting polymers; membrane including one or more buffer layers; etc.); and an anode layer including an oxidation catalyst and an ion-conducting polymer. The ion-conducting polymers of each layer can be the same or different ion-conducting polymers.

In one embodiment, a water electrolyzer includes a membrane electrode assembly (MEA). The MEA used for water electrolysis can include a cathode and an anode separated by an ion-conducting polymer layer that provides a path for ions to travel between the cathode and the anode. The cathode and the anode each contain ion-conducting polymer and catalyst particles. One or both may also include electronically conductive catalyst support. The ion-conducting polymer in the cathode, anode, and ion-conducting polymer layer may be either all cation-conductors or all anion-conductors.

In one embodiment, the carbon dioxide reduction electrolyzer includes a membrane electrode assembly (MEA). The MEA can include one or more ion-conducting polymer layers and a hydrophobically-modified cathode catalyst for facilitating chemical reduction of carbon dioxide to carbon monoxide.

In some configurations, the MEA may be a bipolar MEA which has the following stacked arrangement: cathode layer/cathode buffer layer (an anion-conducting layer)/cation-conducting layer (with may be a PEM)/anode layer. In some implementations, the bipolar MEA has a cathode layer containing an anion-conducting polymer and/or an anode layer containing a cation-conducting layer. In some implementations, the bipolar MEA has an anode buffer layer, which may contain a cation-conducting material, between the cation-conducting layer and the anode layer.

In some configurations, a bipolar MEA has the following stacked arrangement: cathode layer/cation-conducting layer (with may be a PEM)/anion-conducting layer/anode layer. In some applications, a bipolar MEA having this arrangement is configured in a system for reducing a carbonate and/or bicarbonate feedstock such as an aqueous solution of carbonate and/or bicarbonate.

In some configurations, an MEA has the following stacked arrangement: cathode layer/anion-conducting layer/bipolar interface/cation-conducting layer/anode layer. The bipolar interface can include, e.g., a cation-and-anion conducting polymer, a third polymer different from the polymers of the anion-conducting polymer layer and the cation-conducting polymer layer, a mixture of an anion-conducting polymer and a cation-conducting polymer, or a cross-linking of the cation-conducting polymer and anion-conducting polymer.

In some configurations, an MEA has the following stacked arrangement: cathode layer/anion-conducting layer/anode layer. In some implementations, this MEA has no cation-conducting layers between the cathode layer and the anode layer. In some applications, an MEA containing only anion-conducting material between the cathode and anode is configured in a system for reducing carbon monoxide feedstock.

A layer or a membrane can be formed in any useful manner. In one embodiment, a composition (e.g., an initial polymer or an ionic polymer) can be dissolved in a solvent (e.g., any described herein, such as an organic solvent, including methanol, ethanol, isopropanol, tetrahydrofuran, chloroform, toluene, o-dichlorobenzene, m-dichlorobenzene, p-dichlorobenzene, naphthalene, a-naphthol, or combinations thereof) to from a casting solution. The casting solution can be optionally filtered, applied to a substrate, and then dried to form a film. Application to a substrate can include doctor blade coating, solution casting, spraying, dip coating, spin coating, extrusion, melt casting, or a combination of any technique. The film can be optionally further treated, such as by immersion in any reagents herein (e.g., ionizable reagent, crosslinking reagent, counterion, solvent including water, etc., and combinations thereof).

Figure 6:
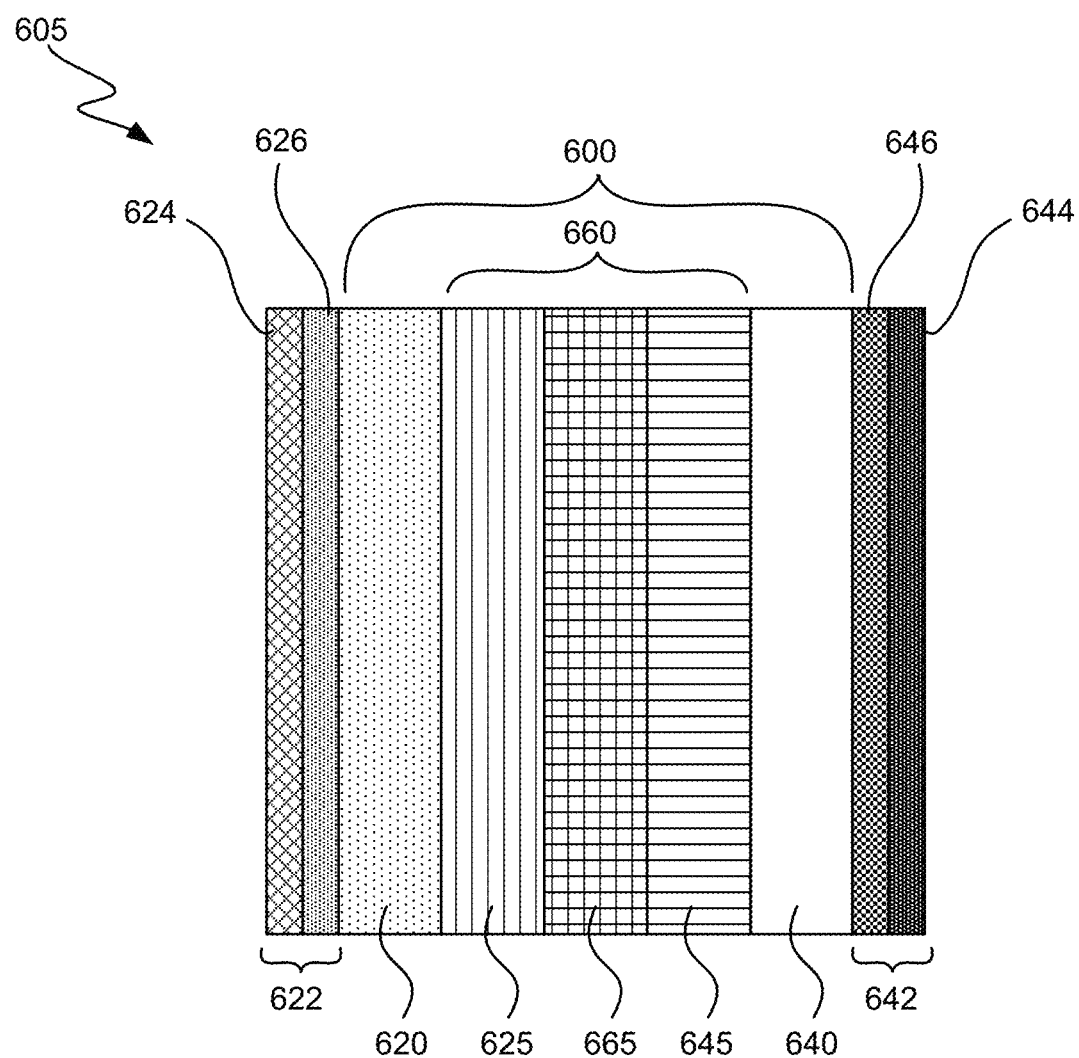
FIG. 6 is a schematic drawing that shows the major components of a $CO_x$ reduction reactor (CRR) in accordance with certain embodiments.

FIG. 6 is a schematic drawing that shows the major components of a $CO_x$ reduction reactor (CRR) 605, according to an embodiment of the invention.

The CRR 605 has a membrane electrode assembly 600 as described above. The membrane electrode assembly 600 has a cathode layer 620 and an anode layer 640, separated by an ion conducting polymer layer 660. The ion conducting polymer layer 660 can include three sublayers: a cathode buffer layer 625, a polymer electrolyte membrane 665, and an optional anode buffer layer 645. As discussed above, cathode buffer layer 625 may be omitted in some embodiments. In addition, the CRR 605 has a cathode support structure 622 adjacent to the cathode layer 620 and an anode support structure 642 adjacent to the anode layer 640.

In one embodiment, the cathode layer 620 contains an ion-conducting polymer, the anode layer 640 contains an ion-conducting polymer, and the polymer electrolyte membrane 665 contains an ion-conducting polymer. If present, in one arrangement, the cathode buffer layer 625 contains at least two ion-conducting polymers. In other arrangements, the cathode buffer layer 625 may contain one ion-conducting polymer.

The cathode support structure 622 has a cathode polar plate 624, e.g., made of graphite, to which a voltage can be applied. There can be flow field channels, such as serpentine channels, cut into the inside surfaces of the cathode polar plate 624. There is also a cathode gas diffusion layer 626 adjacent to the inside surface of the cathode polar plate 624. In some arrangements, there is more than one cathode gas diffusion layer (not shown). The cathode gas diffusion layer 626 facilitates the flow of gas into and out of the membrane electrode assembly 600. An example of a cathode gas diffusion layer 626 is a carbon paper that has a carbon microporous layer.

The anode support structure 642 has an anode polar plate 644, usually made of metal, to which a voltage can be applied. There can be flow field channels, such as serpentine channels, cut into the inside surfaces of the anode polar plate 644. There is also an anode gas diffusion layer 646 adjacent to the inside surface of the anode polar plate 644. In some arrangements, there is more than one anode gas diffusion layer (not shown). The anode gas diffusion layer 646 facilitates the flow of gas into and out of the membrane electrode assembly 600. An example of an anode gas diffusion layer 646 is a titanium mesh or titanium felt. In some arrangements, the gas diffusion layers 626 and 646 are microporous.

There are also inlets and outlets (not shown) associated with the support structures 622 and 642, which allow flow of reactants and products, respectively, to the membrane electrode assembly 600. There are also various gaskets (not shown) that prevent leakage of reactants and products from the cell.

In one embodiment, a direct current (DC) voltage is applied to the membrane electrode assembly 600 through the cathode polar plate 624 and the anode polar plate 642. Water is supplied to the anode 640 and is oxidized over an oxidation catalyst to form molecular oxygen ($O_2$), releasing protons ($H^+$) and electrons ($e^-$). The protons migrate through the ion conducting polymer layer 660 toward the cathode layer 620. The electrons flow through an external circuit (not shown). In one embodiment of the invention, the reaction is described as follows: $2H_2O \rightarrow 4H^+ + 4e^- + O_2$.

In other embodiments of the invention, other reactants can be supplied to the anode layer 640 and other reactions can occur.

Further uses, membranes, assemblies, and configurations are described in U.S. application Ser. No. 15/586,182, filed May 3, 2017, published as U.S. Pat. Pub. No. 2017-0321334, by Kuhl et al., entitled "Reactor with advanced architecture for the electrochemical reaction of $CO_2$, CO and other chemical compounds"; U.S. Appl. No. 63/060,583, filed Aug. 3, 2020, and International Appl. No. PCT/US2021/044378, filed Aug. 3, 2020, by Flanders et al., entitled "System and method for carbon dioxide reactor control"; and U.S. Appl. No. 62/939,960, filed Nov. 25, 2019, and International Publication No. WO 2021/108446, by Huo et al., entitled "Membrane electrode assembly for COx reduction," each of which are incorporated herein by reference in its entirety.

CONCLUSION

Although the foregoing embodiments have been described in some detail for purposes of clarity of understanding, it will be apparent that certain changes and modifications may be practiced within the scope of the appended claims. It should be noted that there are many alternative ways of implementing the processes, systems, and apparatus of the present embodiments. Accordingly, the present embodiments are to be considered as illustrative and not restrictive, and the embodiments are not to be limited to the details given herein.

What is claimed is:

1. A $CO_x$ reduction reactor comprising:
   a membrane electrode assembly comprising:
   a cathode catalyst layer, the cathode catalyst layer comprising metal nanoparticles having surfaces, the metal nanoparticles immobilized on a carbon-containing support material;
   an anode catalyst layer; and
   a membrane disposed between the cathode catalyst layer and the anode catalyst layer;
   wherein the metal nanoparticles in the presence of a bifunctional linker form a modified metal nanoparticle catalyst on the carbon-containing support material,
   wherein the bifunctional linker comprises at least one sulfur-containing group,
   wherein the modified metal nanoparticle catalyst in the presence of at least one hydrophobic moiety and an amine affixes the at least one hydrophobic moiety to the modified metal nanoparticle catalyst, and
   wherein the at least one hydrophobic moiety comprises an ionomer.

2. The $CO_x$ reduction reactor of claim 1, wherein the membrane comprises a bipolar membrane or an anion exchange membrane.

3. The $CO_x$ reduction reactor of claim 1, wherein the metal nanoparticles comprise gold, silver, palladium, copper or a combination thereof.

4. The $CO_x$ reduction reactor of claim 3, wherein the metal nanoparticles comprise gold.

5. The $CO_x$ reduction reactor of claim 1, wherein the at least one sulfur-containing group is bonded to the surfaces of the metal nanoparticles.

6. The $CO_x$ reduction reactor of claim 5, wherein the at least one sulfur-containing group comprises a thiol or a dithiol.

7. The $CO_x$ reduction reactor of claim 1, wherein the ionomer comprises a homopolymer or a copolymer, and wherein the homopolymer or copolymer has an aromatic backbone.

8. The $CO_x$ reduction reactor of claim 1, wherein the ionomer is bonded to the surfaces of the metal nanoparticles through the bifunctional linker.

9. The $CO_x$ reduction reactor of claim 8, wherein the bifunctional linker comprises 2-(dimethylamino)ethanethiol or a salt thereof.

10. The $CO_x$ reduction reactor of claim 1, wherein the metal nanoparticles on the carbon-containing support material comprise from about 10 percent to 50 percent by weight of metal.

11. The $CO_x$ reduction reactor of claim 1, wherein the metal nanoparticles have a particle size of from about 1 nm to 50 nm.

12. The $CO_x$ reduction reactor of claim 1, wherein the metal nanoparticles have a particle size of from about 5 nm to 10 nm.

13. The $CO_x$ reduction reactor of claim 1, wherein a ratio of the at least one hydrophobic moiety to the metal nanoparticles on the carbon-containing support material is from about 0.1:1 to about 8:1.

14. The $CO_x$ reduction reactor of claim 1, wherein a mass ratio of the bifunctional linker to the metal nanoparticles on the carbon-containing support material is from about 1:10 to about 10:1.

15. A method of electrochemically reducing $CO_x$ comprising:
   (a) providing a carbon oxide to a $CO_x$ reduction reactor, and
   (b) electrochemically reducing the carbon oxide at a cathode of a $CO_x$ electrolyzer to produce a carbon containing product,
   wherein the $CO_x$ reduction reactor comprises a membrane electrode assembly comprising:
   a cathode catalyst layer, the cathode catalyst layer comprising metal nanoparticles having surfaces, the metal nanoparticles immobilized on a carbon-containing support material;
   an anode catalyst layer; and
   a membrane disposed between the cathode catalyst layer and the anode catalyst layer;
   wherein the metal nanoparticles in the presence of a bifunctional linker form a modified metal nanoparticle catalyst on the carbon-containing support material,
   wherein the bifunctional linker comprises at least one sulfur-containing group,
   wherein the modified metal nanoparticle catalyst in the presence of at least one hydrophobic moiety and an amine affixes the at least one hydrophobic moiety to the modified metal nanoparticle catalyst, and
   wherein the at least one hydrophobic moiety comprises an ionomer.

16. The method of claim 15, wherein the membrane comprises a bipolar membrane or an anion exchange membrane.

17. The method of claim 15, wherein the carbon containing product comprises carbon monoxide, a hydrocarbon, formic acid, an alcohol or a combination thereof.

18. The method of claim 15, wherein the metal nanoparticles comprise gold, silver, palladium, copper or a combination thereof.

19. The method of claim 15, wherein a mass ratio of the bifunctional linker to the metal nanoparticles on the carbon-containing support material is from about 1:10 to about 10:1.

* * * * *